United States Patent

Blosser et al.

[11] Patent Number: 5,996,337
[45] Date of Patent: Dec. 7, 1999

[54] DYNAMIC CALORIMETRIC SENSOR SYSTEM

[75] Inventors: Patrick Wayne Blosser, East Windsor, N.J.; Jeffrey Donald Naber, Dearborn, Mich.; Gerald Stephen Koermer, Roseland, N.J.

[73] Assignees: Engelhard Corporation, Iselin, N.J.; Motorola, Inc., Schaumburg, Ill.

[21] Appl. No.: 09/075,798

[22] Filed: May 11, 1998

Related U.S. Application Data

[63] Continuation-in-part of application No. 09/019,085, Feb. 6, 1998.

[51] Int. Cl.[6] .................................................. F01N 3/00
[52] U.S. Cl. ........................... 60/274; 60/276; 60/285; 60/286; 60/277
[58] Field of Search ............................. 60/274, 276, 277, 60/285, 286, 278, 284, 300; 701/103, 108, 109

[56] References Cited

U.S. PATENT DOCUMENTS

| | | |
|---|---|---|
| 4,792,752 | 12/1988 | Schlechtriemem et al. . |
| 5,177,464 | 1/1993 | Hamburg . |
| 5,224,775 | 7/1993 | Reading et al. . |
| 5,257,496 | 11/1993 | Brown et al. . |
| 5,261,411 | 11/1993 | Hughes . |
| 5,306,411 | 4/1994 | Mazanec et al. . |
| 5,317,868 | 6/1994 | Blischke et al. ........................... 60/274 |
| 5,319,921 | 6/1994 | Gopp ........................................ 60/274 |
| 5,393,397 | 2/1995 | Fukaya et al. . |
| 5,408,215 | 4/1995 | Hamburg . |
| 5,426,934 | 6/1995 | Hunt et al. . |
| 5,431,012 | 7/1995 | Narula et al. . |
| 5,439,291 | 8/1995 | Reading . |

(List continued on next page.)

FOREIGN PATENT DOCUMENTS

WO 95/00235  1/1995  WIPO .

OTHER PUBLICATIONS

J.S. Hepburn and H.S. Gandhi, "The Relationship Between Catalyst Hydrocarbon Conversion Efficiency and Oxygen Storage Capacity", SAE paper #920831, Dated Feb. 24–28, 1992.

G.B. Fisher, J.R. Theis, M.V. Casarella, S.T. Mahan, "The Role of Ceria in Automotive Exhaust Catalysis and ORB–II Catalyst Monitoring", SAE paper #931034, Dated Mar. 1–5, 1993.

U.S. patent application S.N. 09/019,085, Filed Feb. 6, 1998, entitled "OBD Calorimetric Sensor System with Offset Error Correction" (attorney docket EnM–1069).

U.S. patent application S. N. 08/350,297, Filed Dec. 4, 1994, entitled "Close–coupled Catalyst" (attorney docket 3706) (WO 96/17671).

(List continued on next page.)

*Primary Examiner*—Edward K. Look
*Assistant Examiner*—Binh Tran
*Attorney, Agent, or Firm*—Frank J. Nawalanic; Richard A. Negin; J. William Dockrey

[57] ABSTRACT

A calorimetric sensor system requires a vehicle's internal combustion engine to cyclically operate between first and second conditions to repeatedly produce a varying exhaust gas composition which is consistent from cycle to cycle. The rate of change of the calorimetric sensor's signal as the engine cycles from one to the other condition is mathematically factored, after signal filtering at frequencies of the induced perturbation, to provide signals indicative of the emissions concentration in the exhaust gases, the air/fuel ratio of the engine and whether the engine is operating lean or rich. The signals can be used as fuel control engine signals as well as OBD signals. Additionally, the system can control industrial processes through small process perturbations affecting the compositions of process gases.

93 Claims, 25 Drawing Sheets

U.S. PATENT DOCUMENTS

| | | |
|---|---|---|
| 5,444,974 | 8/1995 | Beck et al. . |
| 5,478,444 | 12/1995 | Liu et al. . |
| 5,493,902 | 2/1996 | Glidewell et al. . |
| 5,499,538 | 3/1996 | Glidewell et al. . |
| 5,505,837 | 4/1996 | Friese et al. . |
| 5,557,929 | 9/1996 | Sato et al. . |
| 5,564,283 | 10/1996 | Yano et al. . |
| 5,570,673 | 11/1996 | Isobe . |
| 5,609,025 | 3/1997 | Abe . |
| 5,623,824 | 4/1997 | Yukawa et al. . |
| 5,667,652 | 9/1997 | Liu et al. . |
| 5,675,967 | 10/1997 | Ries-Mueller . |
| 5,706,652 | 1/1998 | Sultan . |
| 5,707,148 | 1/1998 | Visser et al. . |
| 5,708,585 | 1/1998 | Kushion ............................ 364/431.061 |
| 5,713,198 | 2/1998 | Aoki et al. . |
| 5,725,425 | 3/1998 | Rump et al. . |
| 5,787,705 | 8/1998 | Thoreson .................................. 60/274 |

OTHER PUBLICATIONS

U.S. patent application S. N. 08/970,259, Filed Nov. 14, 1997, entitled "Exhaust Gas Sensor" (attorney docket 7435–00010).

U.S. patent application S.N. 08/970,262, Filed Nov. 14, 1997, entitled "Apparatus and Method for Determining Catalytic Converter Operation" (attorney docket 7435–00009), U.S. patent application S.N. 08/970,837, Filed Nov. 14, 1997, entitled "Calorimetric Hydrocarbon Gas Sensor" (attorney docket APO–1701).

U.S. patent application S. N. 08/970,698, Filed Nov. 14, 1997, entitled "Sensor Housing for a Calorimetric Gas Sensor" (attorney docket APO 1727).

U.S. patent application S. N. 08/970,486, Filed Nov. 14, 1997, entitled "Method for Forming Porous Diffusion Barrier Layer" (attorney docket APO1733).

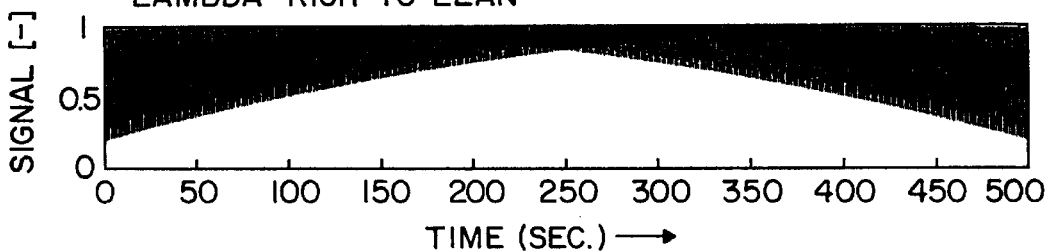
FIG. 12A1
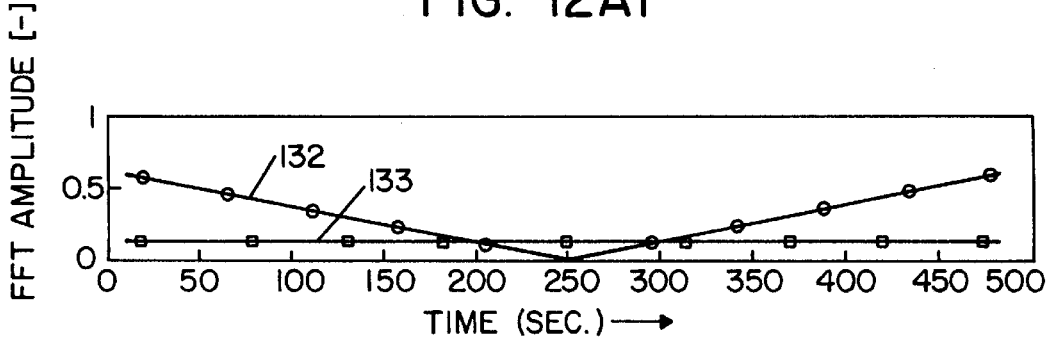
FIG. 12B1
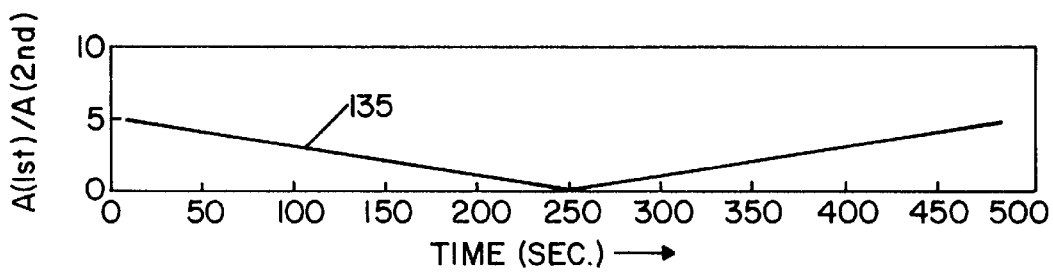
FIG. 12C1
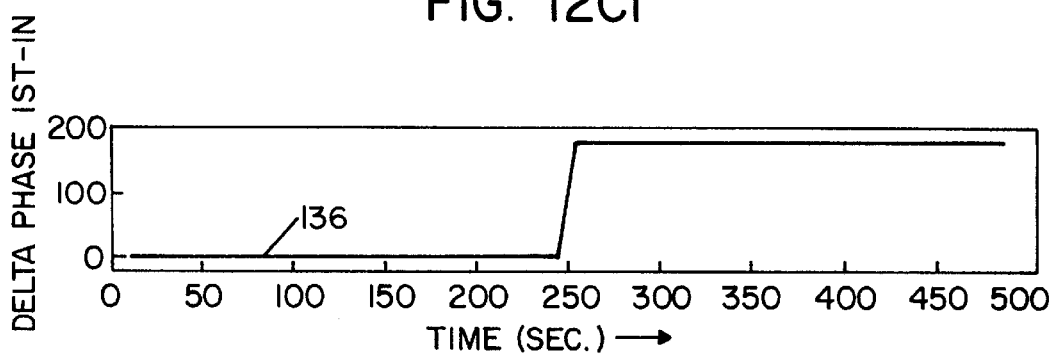
FIG. 12D1

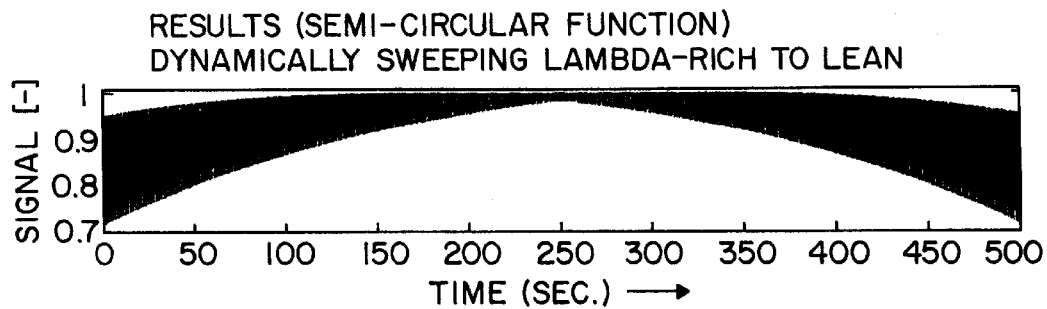
FIG. 12A2
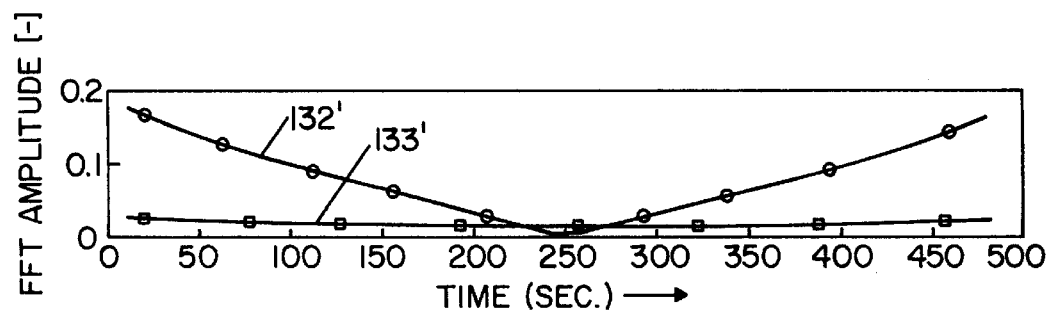
FIG. 12B2
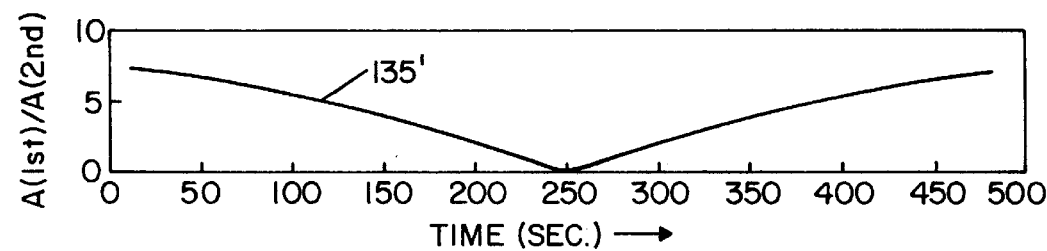
FIG. 12C2
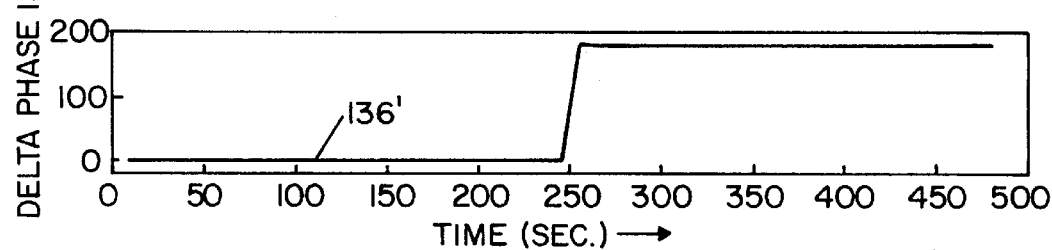
FIG. 12D2

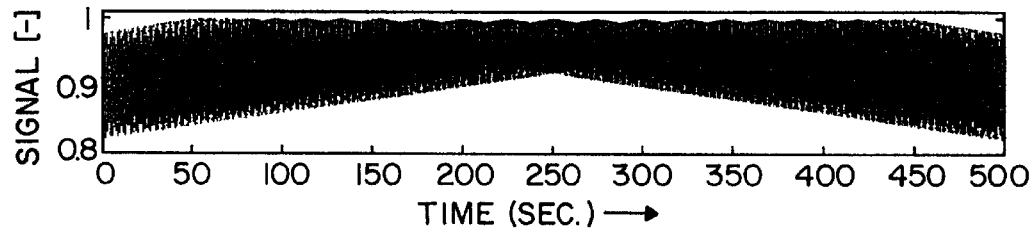
FIG. 12A3
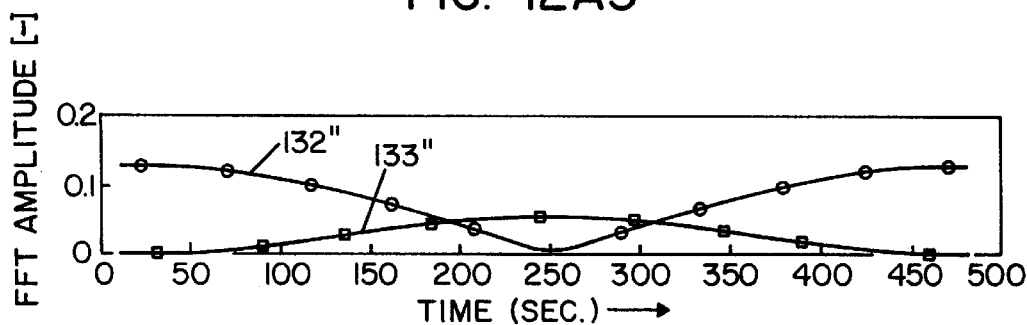
FIG. 12B3
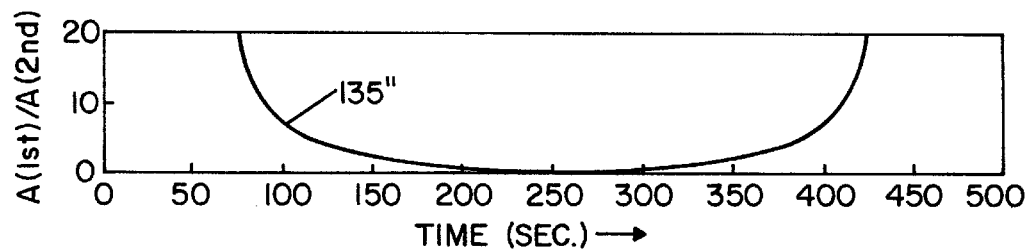
FIG. 12C3
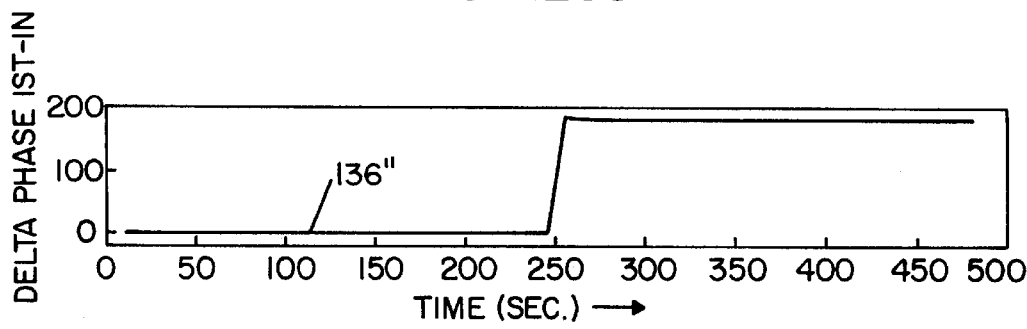
FIG. 12D3

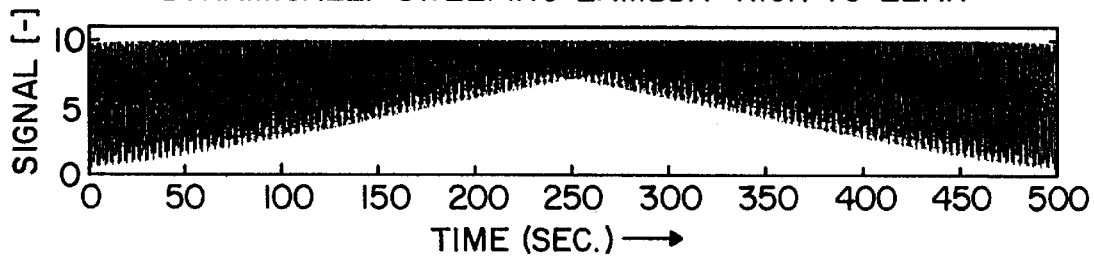
FIG. 12A4
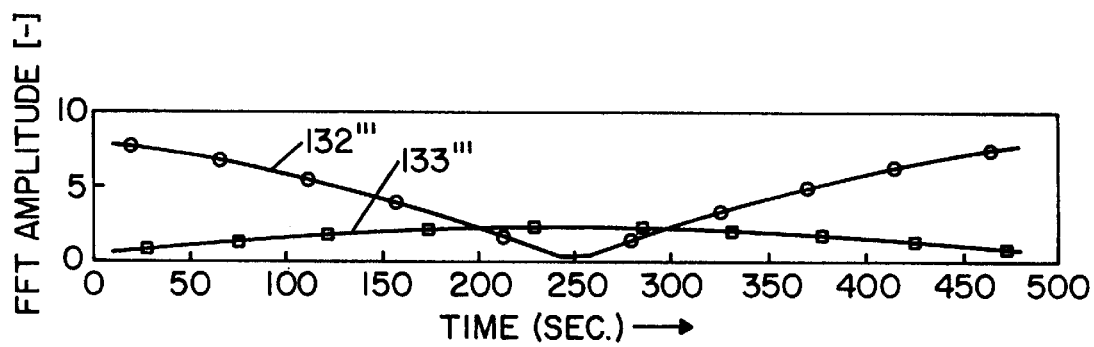
FIG. 12B4
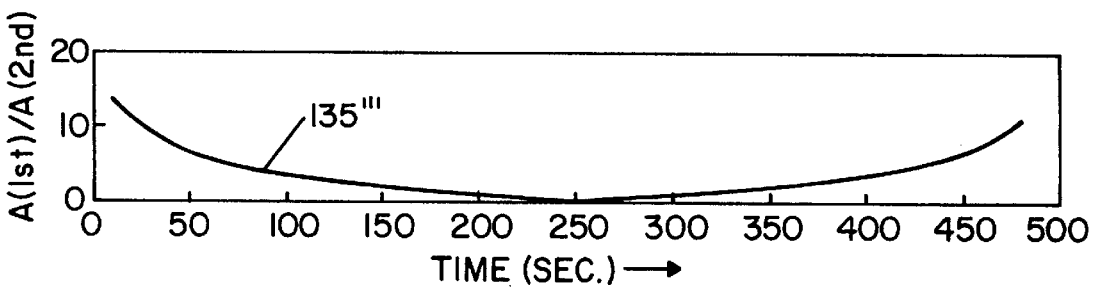
FIG. 12C4
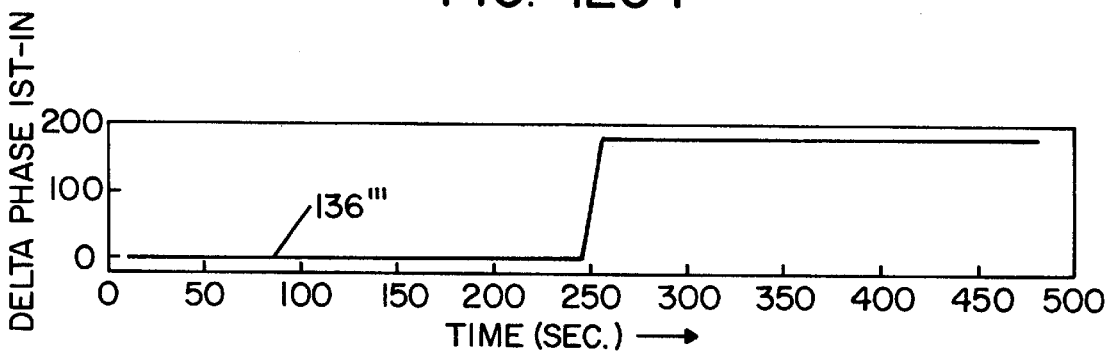
FIG. 12D4

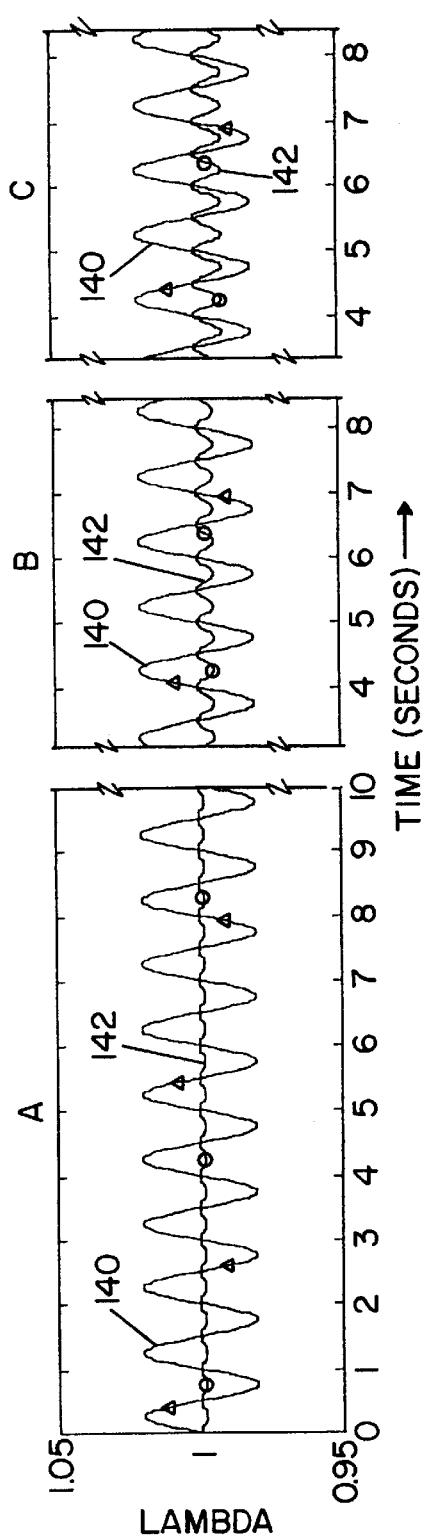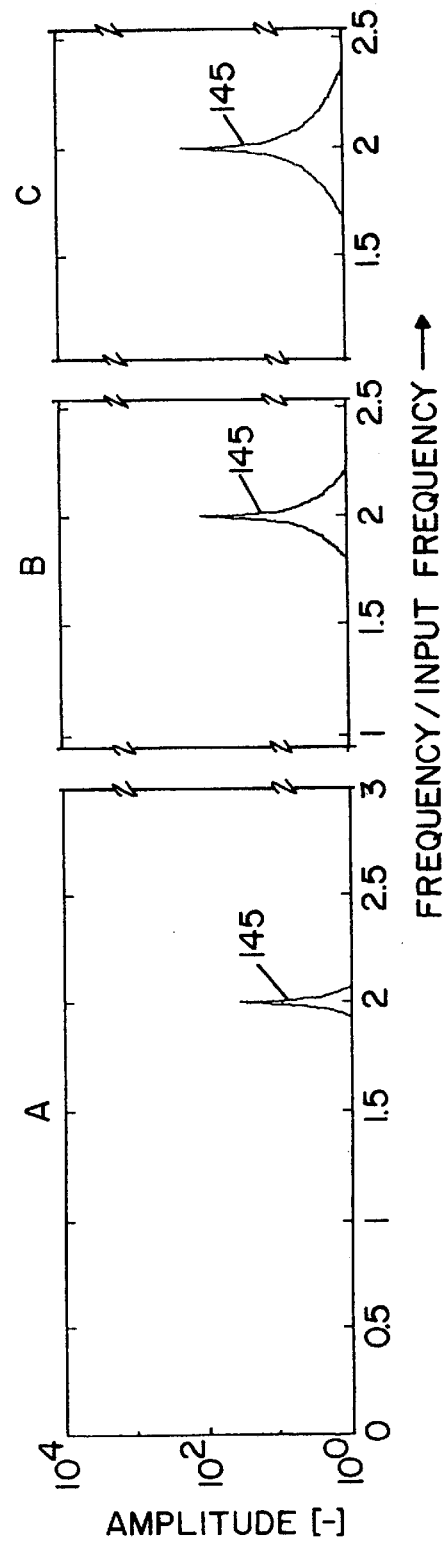

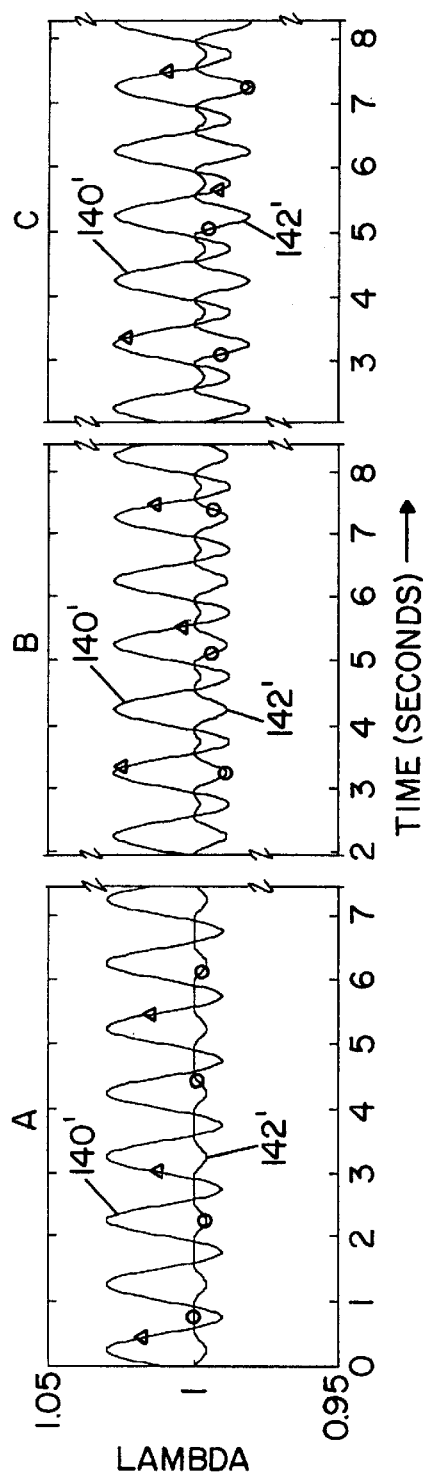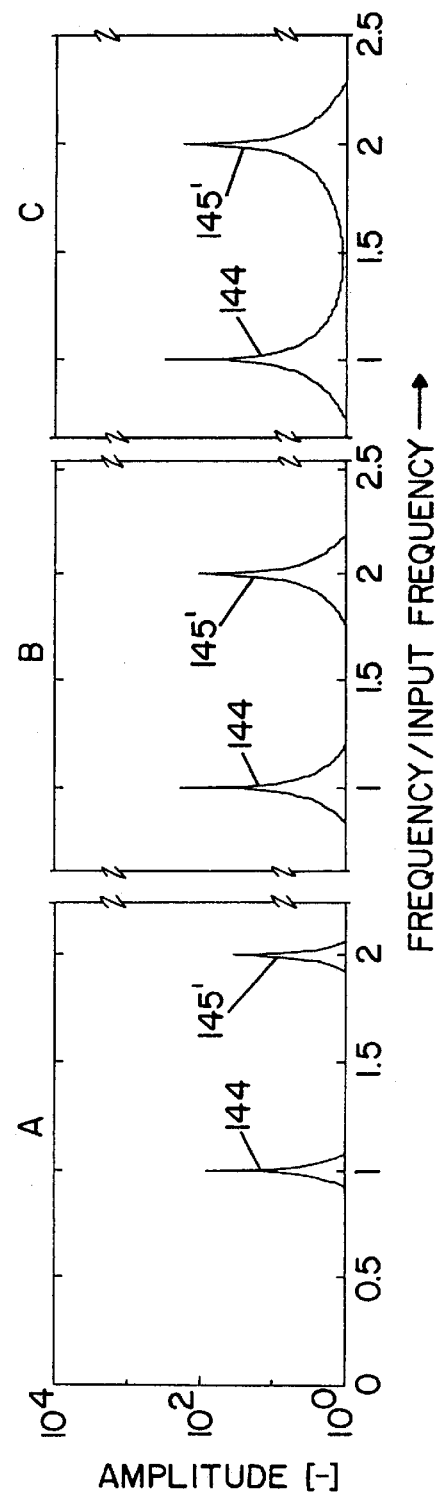

| CONFIGURATION | FUNCTIONS OF CALORIMETRIC SENSOR |
|---|---|
| UEGO OR HEGO — 195<br>CALORIMETRIC SENSOR + HEGO — 50<br>ENGINE — 10 → TWC W/OSC — 33<br>A | • LIGHT-OFF MEASUREMENT (OBD)<br>• FUELING CONTROL BEFORE CATALYST LIGHT-OFF |
| FRONT CALORIMETRIC SENSOR — 50<br>REAR CALORIMETRIC SENSOR — 50<br>ENGINE — 10 → TWC W/OSC — 33<br>B | FRONT SENSOR<br>• ENGINE FUELING CONTROL—NO NEED FOR FUEL TRIM<br>• OBD OF ENGINE COMPONENTS/SYSTEMS<br>REAR SENSOR<br>• LIGHT-OFF MEASUREMENT (OBD) |
| UEGO OR HEGO — 195<br>CALORIMETRIC SENSOR — 50<br>ENGINE — 10 → CC LIGHT-OFF W/O OSC — 32 → TWC W/OSC — 33<br>C | • LIGHT-OFF MEASUREMENT (OBD)<br>• FUEL TRIM FOR FRONT EGO<br>• HOT CATALYST MONITOR (OBD)<br>• FUELING CONTROL BEFORE CATALYST LIGHT-OFF<br>• OBD OF ENGINE COMPONENTS/SYSTEMS |
| CALORIMETRIC SENSOR — 50<br>ENGINE — 10 → CC LIGHT-OFF W/O OSC — 32 → TWC W/OSC — 33<br>D | • ENGINE FUELING CONTROL NO NEED FOR FUEL TRIM<br>• LIGHT-OFF MEASUREMENT (OBD)<br>• HOT CATALYST MONITOR (OBD)<br>• OBD OF ENGINE COMPONENTS/SYSTEMS |

FIG. 20

DYNAMIC CALORIMETRIC SENSOR SYSTEM

This is a Continuation-In-Part of Ser. No. 09/019,085, filed Feb. 6, 1998, entitled "OBD CALORIMETRIC SENSOR SYSTEM WITH OFFSET ERROR CORRECTION".

This invention relates generally to a control system monitoring any process which liberates or consumes energy and more particularly to a system monitoring exhaust gases for emission compliance and/or control of a vehicular internal combustion engine.

The invention is particularly applicable to vehicles having internal combustion engines and will be described with specific reference to a system which analyzes vehicular exhaust gases for OBD (on-board diagnostics) and/or engine control for vehicles classified as LEV (low emission vehicles) and ULEV (ultra low emission vehicles). However, those skilled in the art will recognize that the invention has a wide range of applications and can be used to control any type of process, such as industrial processes, which generate a product, such as gases, having a composition which can be varied in a repeatable manner through process control and which are analyzed by measuring energy which is liberated or consumed.

INCORPORATION BY REFERENCE

The following documents are incorporated herein by reference and made a part hereof so that the detailed description of this invention need not describe in detail that which is known to those skilled in the art as described in the incorporated documents:

1) The parent U.S. patent application Ser. No. 09/019,085, filed Feb. 6, 1998, entitled "OBD CALORIMETRIC SENSOR SYSTEM WITH OFFSET ERROR CORRECTION";
2) U.S. patent application Ser. No. 08/970,837, filed Nov. 14, 1997, entitled "CALORIMETRIC HYDROCARBON GAS SENSOR";
3) U.S. patent application Ser. No. 08/970,698, filed Nov. 14, 1997, entitled "SENSOR HOUSING FOR A CALORIMETRIC GAS SENSOR";
4) U.S. patent application Ser. No. 08/970,486, filed Nov. 14, 1997, entitled "METHOD FOR FORMING POROUS DIFFUSION BARRIER LAYER";
5) U.S. patent application Ser. No. 08/970,262, filed Nov. 14, 1997, entitled "APPARATUS AND METHOD FOR DETERMINING CATALYTIC CONVERTER OPERATION";
6) U.S. patent application Ser. No. 08/970,259, filed Nov. 14, 1997, entitled "EXHAUST GAS SENSOR";
7) U.S. patent application Ser. No. 08/350,297, filed Dec. 4, 1994, entitled "CLOSE COUPLED CATALYST" and published Jun. 13, 1996 under International Publication Number WO 96/17671;
8) U.S. Pat. No. 5,713,198, issued Feb. 3, 1998; U.S. Pat. No. 5,707,148, issued Jan. 13, 1998; U.S. Pat. No. 5,706,652, issued Jan. 13, 1998; U.S. Pat. No. 5,675,967, issued Oct. 14, 1997; U.S. Pat. No. 5,667,652, issued Sep. 16, 1997; U.S. Pat. No. 5,623,824, issued Apr. 29, 1997; U.S. Pat. No. 5,609,025, issued Mar. 11, 1997; U.S. Pat. No. 5,570,673, issued Nov. 5, 1996; U.S. Pat. No. 5,564,283, issued Oct. 15, 1996; U.S. Pat. No. 5,557,929, issued Sep. 24, 1996; U.S. Pat. No. 5,478,444, issued Dec. 26, 1995; U.S. Pat. No. 5,426,934, issued Jun. 27, 1995; U.S. Pat. No. 5,393,397, issued Feb. 28, 1995; U.S. Pat. No. 5,306,411, issued Apr. 26, 1994; and, U.S. Pat. No. 4,792,752 issued Dec. 20, 1988.

BACKGROUND OF THE INVENTION

Combustion within the combustion chambers of an internal combustion engine is controlled by precise amounts of combustion air and fuel metered at a set ratio into the combustion chamber. The ratio of air and fuel in the mixture is conventionally known as the air-to-fuel ratio (AFR) and expressed as lambda, with stoichiometric combustion having a lambda value of 1. Regulatory standards limit the concentrations of noxious gases allowed in the products of combustion or exhaust gases emanating from the vehicle. Regulated emissions are typically hydrocarbons (HC), carbon monoxide (CO), and nitrous oxides ($NO_x$). Vehicles are equipped with catalytic converters to transform the regulated or noxious emissions to harmless, gaseous emissions. The catalytic converter systems in use today typically include a three-way catalyst, a TWC catalyst, capable of converting CO, HC and $NO_x$.

Conventional TWCs work efficiently at or near stoichiometric conditions. When the engine runs rich, there is insufficient oxygen for CO and HC combustion. If the engine runs excessively lean, $NO_x$ concentrations in the exhaust gases increase and make it more difficult for the TWC to cleanse the NO emissions. To address this problem, TWCs are constructed with a composition (i.e., ceria) that can store oxygen when the engine runs lean and release the oxygen when the engine runs rich ("OSC"). With this capability added to the TWC, typical engine control strategies cycle the AFR about stoichiometric to provide alternating rich/lean exhaust gas mixtures. The engine control strategy prevents excessive $NO_x$ emissions from being produced during its "lean" condition while the oxygen stored during the "rich" operation is used in the "rich" mode to combust HC, CO and $H_2$.

As the catalytic converter ages, its ability to convert noxious emissions diminish. The prior art has recognized that concentrations of certain emissions within the products of combustion produced by the engine can be controlled by changing the operating conditions of the engine to adjust for the aging of the catalytic converter. In this manner the engine control strategy can insure, to some point, that the emissions from the vehicle continue to meet regulatory standards thus prolonging the life of the catalytic converter provided, of course, that the emissions can be accurately measured. Reference can be had to U.S. Pat. No. 5,609,025 to Abe and U.S. Pat. No. 5,557,929 to Saito et al., incorporated by reference herein, for techniques controlling the air-to-fuel ratio and reference can be had to U.S. Pat. No. 5,623,824 to Yukawa et al., incorporated by reference herein, for controlling the perturbation rate (frequency) as well as the air-to-fuel ratio. In addition, it is known that exhaust gas recirculation (EGR) can be controlled to limit $NO_x$ emissions. Reference can be had to U.S. Pat. No. 5,426,934 to Hunt et al.; U.S. Pat. No. 5,564,283 to Yano et al.; and U.S. Pat. No. 5,570,673 to Isobe, incorporated by reference herein, for various techniques controlling EGR as well as other vehicle operating conditions such as spark timing, mass air flow, etc. to produce products of combustion having certain emissions capable of being converted by the TWC.

Any engine control strategy can only be as good as the instruments used to measure the results achieved when the control strategy is implemented. Specifically, the engine control strategies discussed above are implemented with the intent to insure that the vehicle meets emission standards while maintaining vehicular driveability. If the emissions are accurately measured, then the engine control technique, any engine control technique, can be verified. Until this invention, there was no known, reliable, consistent and commercially feasible system which could be mounted in the vehicle for continuous monitoring of the emissions actually produced by the vehicle, let alone, function as a feedback control for regulating the engine operating condition.

Engine control strategies and catalytic monitoring systems in widespread use today sense the oxygen concentrations in the exhaust gases. The oxygen sensor readings are used to set the air-to fuel ratio and also to monitor the OSC of the TWC. Such systems are inherently defective for monitoring emissions because they are incapable of directly measuring the regulated emissions.

Current OBD methods based on OSC rely upon correlating the deterioration of OSC with the loss of EC efficiency. In fact, OSC of the TWC has been demonstrated to poorly correlate with hydrocarbon conversion efficiencies. See J. S. Hepburn and H. S. Gandhi, *The Relationship Between Catalyst Hydrocarbon Conversion Efficiency and Oxygen Storage Capacity*, SAE paper 920831, 1992 and G. B. Fischer, J. R. Theis, M. B. Casarella, and S. T. Mahan, *The Role of Ceria in Automotive Exhaust Catalysis and OBD-2 Catalyst Monitoring*, SAE paper 931034, 1993. As the allowable emission levels are reduced with increasingly more stringent regulations, the OSC correlation becomes highly unreliable. Specifically, existing techniques which compare AFR before and after a portion of the TWC (sometimes at known operating engine conditions) will not have the required sensitivity to meaningfully monitor the emissions.

Further, emission regulations now coming into effect require that the vehicle control the emissions when the engine is cold or on start-up and not only when the vehicle has reached its operating temperature. This requirement is met by the use of close-coupled, light/off catalytic converters, which may be void of rare-earth metal oxides, the major components of OSC. Such catalytic converters may lack significant oxygen storage function and cannot employ or use oxygen sensors to measure oxygen storage capacity. Thus, current dual EGO sensor methods are incapable of OBD of such close-coupled, light/off catalytic converters.

In addition to such fundamental considerations which strongly dictate that measuring OSC will not meet proposed regulated monitoring standards, there are other disadvantages to the current system. Currently, the catalytic converter design, itself, has to be structured to put OSC into the monolith at concentrations sufficient to allow the aforementioned correlation to take place and to continue to take place as the converter ages. Further, the addition of OSC promotes sintering of the catalytic converter at high temperatures. A more durable catalytic converter could be designed at less expense and with higher concentrations of catalysts to give better conversion efficiencies at a longer life if OSC was not present or present in minute concentrations.

Exhaust gas oxygen (EGO) sensors (usually either a heated EGO (HEGO) or a universal EGO (UEGO)) are typically placed upstream and downstream of the catalytic converter and primarily function for engine fueling control. They are also used to determine OSC of the TWC. Both sensor types possess a platinum based coating which combusts residual reductants and oxidants present in the gas stream. Only after substantially all residual gases are combusted, is the oxygen concentration remaining determined. For rich mixtures the sensor detects no residual oxygen. For lean mixtures the oxygen not consumed by the combustion on the platinum electrode surface is detected. Thus, it is fundamentally important to note that neither sensor can detect the actual level of emissions in the exhaust gas. To emphasize the point, the EGO sensors can not differentiate a gas mixture composed of 0 ppm HC at lambda=1 from a second gas mixture composed of 3000 ppm HC at lambda=1.

In addition to the primary functions of the EGO sensors for engine fueling control, comparison of the signals generated by the upstream and downstream sensor have been used to determine the oxygen storage capacity (OSC) of a three-way catalyst (TWC). If the engine is operating at an AFR cycling around lambda=1, and when a catalyst is fresh and OSC is fully functional, the front EGO sensor rapidly indicates the changing AFR. The downstream sensor signal, however, only periodically changes to indicate the changing AFR owning to the ability of the TWC to store oxygen during lean conditions and release oxygen to combust excess reductants (HC, CO, $H_2$) during rich conditions. As the TWC ages and OSC degrades, the signal generated from the downstream EGO begins to more closely resemble the upstream EGO. In the extreme case of complete loss of OSC functionality, the downstream EGO signal directly reflects the upstream EGO signal. Those skilled in the art realize that the above description is general, but establishes the basic principle behind two EGO sensors to determine OSC properties of a TWC.

Vehicle manufactures (OEMs) have successfully established correlations between OSC and the EC conversion efficiency of TWCs for vehicles with less stringent emissions requirements. However, for LEV (low emission vehicles) and ULEV (ultra-low emission vehicles) applications, the correlations are significantly more difficult to establish and are inherently unreliable. As a result, large error is associated with diagnosis and the OEMs must turn on a MIL often well before actual emissions are exceeded. Premature indication of failure is required owing to the large error in OBD to ensure that the MIL will be illuminated for all true failures. It is highly desirable to improve the catalytic converter OBD diagnostic resolution to avoid extreme premature indication while still complying with regulations.

The prior art has recognized the deficiencies in the oxygen sensing systems. Recent patents have correlated temperature changes in the catalytic converter to a catalytic converter efficiency measurement thus avoiding the usage of EGO sensors. For example, U.S. Pat. No. 5,675,967 to Ries-Mueller correlates the time it takes the catalytic converter to reach operating temperature to an efficiency and U.S. Pat. No. 5,706,652 to Sultan takes temperature measurements before and after the catalytic converter.

A viable approach, made possible by this invention, which does not rely on OSC to determine compliance with emission regulations is the use of a calorimetric sensor to determine the concentration of the regulated emissions. Reference can be had to U.S. Pat. No. 5,707,148 to Visser et al.; U.S. Pat. No. 5,431,012 to Zanini-Fischer; and, U.S. Pat. No. 5,505,837 to Friese et al., incorporated by reference herein, for calorimetric sensors specifically designed for use in automotive, exhaust gas monitoring applications. Reference can be had to U.S. Pat. No. 5,177,464 to Hamburg; U.S. Pat. No. 5,408,215 to Hamburg; and, U.S. Pat. No. 5,444,974 to Beck et al. for monitoring system applications using calorimetric sensors. In Beck, the vehicle is operated at steady state condition with a lean air/fuel ratio whereat signals from the sensor are collected, histogrammed and analyzed to arrive at a pass/fail ratio. In the Hamburg references, a sample of the gas stream is tapped and sent to a chamber where the gas sample can be analyzed vis-a-vis the calorimetric sensor. Before this invention, the prior art used the calorimetric sensor only to monitor the exhaust gases and the monitoring was not done during the full range of engine operation.

The parent invention overcame the deficiencies in the calorimetric sensor systems of the prior art.

One of the basic problems solved by the parent invention arises from the very low concentrations of noxious emissions now being regulated. The low level of emissions cause very minor energy signals. If the calorimetric sensor is used to continuously monitor the exhaust stream as in Beck or as suggested in the prior art calorimetric sensor patents, the system energy and more importantly, the variations in system energy, simply prevent an absolute measurement from being recorded by the calorimetric sensor. The small energy signals attributed to the presence of minor concentrations of gaseous emissions cannot be consistently distinguished from any of the other system energy fluxes which produce significant quantities of energy affecting the sensor energy signal. A breakthrough in the emission monitoring art was achieved in the invention disclosed in parent application, Ser. No. 09/019,085, filed Feb. 6, 1998, incorporated by reference herein, which cycles the operating conditions of the engine to produce corresponding cyclical calorimetric signals which are detrended at the limits of the cycle and subtracted from one another to produce a relative signal indicative of the energy content of combustible gases in the exhaust stream. By selecting which engine operating condition is cycled, concentrations of selective emissions are detected and comparison of the signals obtained at the steady state limits of the cycle produce a relative signal which does not have to be correlated to a "zero" reference point to obtain an absolute measure of the concentration of the selected emission. The parent invention thus provides an accurate system for directly monitoring the catalytic converter efficiency based upon the emissions actually produced (and not some expected correlation based on an indirect property) at the very low ppm levels now being legislated which cannot be measured with current systems. The parent invention functions as an emission monitoring/catalytic evaluation system only. This invention extends some of the concepts discussed in the parent patent to not only monitor the emissions but also control the combustion process of the engine by a different system and method from that disclosed in the parent invention.

Within the vehicular art, frequency analysis has been known to accomplish OBD of engine components. In U.S. Pat. No. 5,493,902 and U.S. Pat. No. 5,499,538 to Glidewell et al. pressure waves are utilized to determine if the fuel pump is functional. In U.S. Pat. No. 5,725,425 to Rump et al. a frequency analysis is performed by a heat sensor to determine the presence of pollutants in ambient air and control the ventilation mode of the vehicle. A spectrum analysis of flow temperature is disclosed in U.S. Pat. No. 5,257,496 to Fattori et al. for turbine engines to control the air to fuel ratio. The spectral analysis detects the presence of oxygen compounds.

Outside the vehicular art, U.S. Pat. No. 5,244,775 to Reading et al. and U.S. Pat. No. 5,439,291 to Reading utilize frequency measurement resulting from the application of heat to determine phase transition of materials. U.S. Pat. No. 5,261,411 to Hughes utilizes frequency measurements to monitor and control the temperatures of blood within the heart for surgical procedures.

Despite the wide application of sophisticated techniques utilizing heat, there are many industrial processes and applications wherein chemical transformations can be utilized for monitoring or controlling the process if the chemical transformation can be induced, detected and analyzed.

BRIEF SUMMARY OF THE INVENTION

Accordingly, it is a principle object of the present invention to provide a calorimetric sensor system in which sensor measurements are taken during induced process change conditions to ascertain not only a composition measurement but to also generate feedback measurements for process control.

This object, along with other features of the invention, is achieved in an on-board monitoring and/or control system for use and in combination with a vehicle having an internal combustion engine emitting, during operation, exhaust gases. The system includes a control arrangement causing the engine to cycle between first and second extreme operating conditions to produce an exhaust gas having generally, consistently varying concentrations of specific emissions during each cycle which are repeatedly reproduced from cycle to cycle. A sensor is provided for producing a continuous calorimetric signal indicative of the changes in the exhaust gas composition during each cycle. A computation mechanism generates a function signal by analyzing the changes in the calorimetric signal during each cycle and the function signal is applied to a control on the vehicle whereby any number of vehicular functions may be monitored and/or controlled.

In accordance with another feature of the invention, the calorimetric sensor has a reactor area continuously receiving a slip stream of the exhaust gas. The reactor area has a surface tending to promote processes wherein energy is liberated or consumed with the reactor area at temperatures higher than the exhaust gas temperature. This arrangement produces consistently valid calorimetric signals throughout the engine operating range.

In accordance with the broader aspects of the invention, the reaction area has a material coating promoting energy exchange. Energy exchange may occur, for example, through catalyst promoted combustion reactions or through material coatings which promote adsorption or desorption processes. In the specific inventive application of the preferred embodiment, a specific catalytic coating is applied to the reaction area to promote reactions of selected emissions such as HC, thereby providing direct emission measurements.

In accordance with an important feature of the invention the computational arrangement produces a calorimetric signal having a periodic wave form at frequencies correlated to that at which the engine is cycled and includes an interpolating arrangement for mathematically analyzing one or more wave characteristics of the periodic calorimetric signal selected from the group consisting of i) wave amplitude, ii) wave phase and iii) wave frequency component relationship to induced perturbations caused by the control arrangement whereby a large number of engine related functions can be monitored and/or controlled by selective combinations of components of one signal from one sensor.

Still further, in accordance with the unique vehicular application of the invention, the wave amplitude is correlated to the concentration of emissions sensed and is a relative measurement without having need for an absolute zero reference point and unaffected by changes in system energy fluxes. The wave phase measurement is indicative of the rich/lean determination made by conventional EGO sensors and the wave frequency component relationship is indicative of lambda and equivalent to a UEGO sensor, particularly near stoichiometry. Accordingly, in the unique application of the invention disclosed herein, the calorimetric sensor not only measures emission concentrations actually emitted but also provides substantially the same information recorded by the EGO sensors which are used as feedback signals to control engine operation.

In accordance with a specific but important feature of the invention, the computational arrangement includes an analog to digital converter changing the calorimetric analog signal to data signals and a digital signal processor for transforming the data into a frequency domain having a spectrum of wave frequency components. The interpolating mechanism within the digital signal processor selects frequency component(s) at multiples of the cycle frequency for processing. The computational arrangement lends itself to band pass filtering of not only the analog signal but also the data signals at defined frequencies to produce signals with excellent signal/noise ratios. Significantly, the data signals are processed over short cycle times further reducing noise otherwise present at steady state conditions.

In accordance with another feature of the invention, the operating conditions which are cycled under the control mechanism includes one or more of the following:

i) valve timing,
ii) spark timing,
iii) speed,
iv) exhaust gas recirculation,
v) injection timing,
vi) air to fuel ratio,
vii) mass air flow,
viii) manifold air pressure, and
ix) perturbation frequency.

In accordance with another feature of the invention, the vehicular function signal is one or more signals selected from the group including a) control feedback signal utilized by the vehicle's ECM to control set ratios of air to fuel metered to the combustion chambers of the engine, or EGR gases, or lambda, or spark, valve or injection timing, or mass air flow, or pressure, or perturbation frequency symmetry, or wave form; b) a trim signal for calibrating control devices on the vehicle when the engine is operating at or near lambda values of 1 or near the lean mixture limit of the engine; c) an emissions monitoring signal indicative of the concentration of one or more specific gaseous emissions; d) a catalytic converter efficiency signal for monitoring the efficiency of the catalytic converter; e) an OBD signal indicative of a failure of a pollution control system on the vehicle; and f) an emissions compliance storage signal for determining if the vehicle is in compliance with emission requirements specified during specific drive cycles.

In accordance with another specific but important feature of the invention, especially unique to internal combustion engine applications, is the calorimetric sensor system as described above with the operating conditions selected to cycle about or near stoichiometric conditions whereat measured energy attributed to oxidants and reductants cause differing reaction rates as the cycle approaches and recedes from a stoichiometric condition producing a calorimetric sensor signal comprised of first and second order components. By analyzing the signals mathematically in a frequency domain, such as by means of Fast Fourier Transform, the signal ratio between first and second order components is correlated to the air to fuel ratio supplied to the combustion chambers of the engine whereby the system can function as a UEGO sensor as well as a sensor indicative of the concentrations of specific emissions in the exhaust gas.

In accordance with yet another specific but important feature of the invention is the provision of a calorimetric sensor system as described which, near stoichiometry, develops a calorimetric signal that increases in phase with increasing $\lambda$ and decreases in phase with decreasing $\lambda$ when the air-fuel ratio is rich and which develops a calorimetric signal that decreases out-of-phase with increasing $\lambda$ and increases out-of-phase with decreasing $\lambda$ when the air-fuel ratio is lean. Thus, at conditions near stoichiometry, the calorimetric signal generated when analyzing a lean gas mixture is out-of-phase with the calorimetric signal generated when analyzing a rich gas mixture. Because the signal's phase difference is 180°, a clear demarcation is present between rich and lean engine operating conditions whereby the calorimetric sensor system of the invention can replace existing EGO and REGO sensors while also sensing concentrations of gaseous emissions.

In accordance with the broad method features of the invention, the invention can improve any process in which the composition of a fluid used in the process is varied as a function of a process parameter by performing the steps of: a) cyclically varying the parameter between two set limits during the process whereby the composition of selected components in the fluid is varied during each cycle; b) continuously passing a portion of the fluid over a reaction surface whereby an energy exchange resulting from transformation occurs with respect to selected components; c) sensing the reaction to develop an electrical sensor signal indicative of the reaction; and, d) interpolating the signal to monitor and/or control the process. The interpolating step further includes the steps of digitizing the electrical signal into a data signal; transforming the data signal into a frequency domain having a spectrum of frequency components; and analyzing at least one of the frequency components in the spectrum correlated to the cycle frequency to operate and/or control the system whereby numerous industrial processes can be more efficiently controlled and/or monitored.

It is thus another object of the invention to provide a calorimetric sensor system which is able to directly sense and distinguish small emission concentrations for LEV and ULEV applications.

Another object of the invention is to provide a calorimetric sensor system which is able to control the engine of a vehicle, specifically fuel control.

It is an object of the present invention to provide a calorimetric sensor based control system (method and apparatus) which accomplishes any one or more of the following functions:

1) control an internal combustion engine, particularly when operated near stoichiometric or when operated as approaching a lean mixture limit;
2) provide an on-board monitor of a catalytic converter;
3) provide an on-board monitor of other components of an engine;
4) accomplish items (1) through (3) above with a single calorimetric sensor positioned downstream of a light-off catalyst;
5) accomplish item (4) without the need for oxygen sensors, either HEGOs or UEGOs;

6) provide a fuel trim function for use by the engine's electronic control module by providing knowledge of lambda or by detecting unstable combustion;

7) control vehicle emissions through engine control which compensates for failing components; and, 8) control HC injection into diesel or lean-burn engines (including stationary engines).

It is another object of the invention to provide a system which is capable of controlling an internal combustion engine while simultaneously measuring gaseous emissions produced by the engine.

It is yet another object of the invention to provide an emissions monitoring system which directly senses gaseous emissions produced by the engine even though the engine cycles air to fuel ratios at relatively high frequencies, i.e., equal or greater than 1 Hz whereby driveability of the vehicle is improved.

Yet another important object of the invention is the provision of a calorimetric emission sensor system capable of detecting minute energy changes attributed to small gaseous concentrations in a high temperature environment caused by variable, high temperature system heat fluxes.

Still yet another important object of the invention is the provision of a calorimetric sensor based system which not only determines whether or not the vehicle meets emission standards but also generates "non-emission" signals which function to provide a systematic on-board diagnostic check of all engine emission systems and components to identify those engine systems or components causing or contributing to the excess emissions.

Yet another important object of the invention is to provide an emissions monitoring system which does not, in any way, rely on OSC so that less expensive and more efficient catalytic converters can be installed on the vehicle.

In conjunction with the immediately preceding object, yet a further object is to provide an emissions monitoring system which does not sense oxygen concentration, per se, so that catalytic converters with minimal OSC and having higher temperature resistance to sintering can be used.

Still yet another important object of the invention is simply the provision of an emission monitoring/control system which uses only one sensor, a calorimetric sensor, to generate from the same sample of exhaust gas not only an emission signal but also a lambda signal thereby removing any of the problems inherent in the prior art of attempting to correlate the lambda engine control signal with an emission signal.

Still yet another important object of the invention is to provide a vehicular emissions monitoring and/or engine control system using only relative measurements from one calorimetric sensor thereby alleviating sensor drift concerns resulting, for example, from sensor aging or deterioration.

Still yet another object of the invention is the provision of the aforementioned system which permits the design of the catalyst in the calorimetric sensor to utilize precious metal loading or concentrations increasing system sensitivity.

Another important object of the invention is the provision of a vehicular calorimetric sensor system as disclosed which permits or lends itself readily to emission monitoring and/or engine control of any of the following: i) cold start, ii) lean burn, and iii) $NO_x$ trap regeneration.

Another important object of the invention is to provide an improved method for sensing chemical reactions, specifically chemical transformations, to control industrial type processes.

A general object of the invention is to provide a calorimetric sensor system which is cost effective and less expensive than current systems which it will replace.

These and other features of the invention will become apparent to those skilled in the art upon reading and understanding the Detailed Description of the Invention set forth below taken in conjunction with the drawings hereof.

BRIEF DESCRIPTION OF THE DRAWINGS

The invention may take form in certain parts and an arrangement of parts taken together and in conjunction with the attached drawings which form a part hereof and wherein:

FIGS. 12A1, 12A2, 12A3 and 12A4 are constructed plots of a calorimetric signal output for a lambda sweep over a fixed time and correlate to FIGS. 11A, 11B, 11C and 11D, respectively;

FIGS. 12B1, 12B2, 12B3 and 12B4 show constructed first and second order plots of Fast Fourier Transforms for the sensor signals shown in FIG. 12A1, 12A2, 12A3 and 12A4, respectively;

FIGS. 12C1, 12C2, 12C3 and 12C4 are constructed graphs of the ratios of the first and second order Fast Fourier Transform signals of FIG. 12B1, 12B2, 12B3 and 12B4, respectively;

FIGS. 12D1, 12D2, 12D3 and 12D4 are constructed graphs showing the differences in phase relationship between lambda and the calorimetric sensor signal for the sensor signals developed during the lambda sweep shown in FIGS. 12A1, 12A2, 12A3 and 12A4, respectively;

FIG. 13A is a constructed plot of the sensor signal and a constructed plot of lambda induced cycling showing sensor signal change as the catalyst ages for cycling about lambda centered at 1 under fixed conditions;

FIG. 13B is a constructed plot of the frequency components of the FFT processed calorimetric sensor signal of FIG. 13A;

FIGS. 14A and 14B and 15A and 15B are graphs similar to FIGS. 13A and 13B respectively, but with lambda cycling for FIGS. 14A and 14B taken lean and lambda cycling for FIGS. 15A and 15B taken rich;

FIG. 20 is a chart representation depicting various placements of the calorimetric sensor in the system of the present invention;

DETAILED DESCRIPTION OF THE INVENTION

Figure 1:
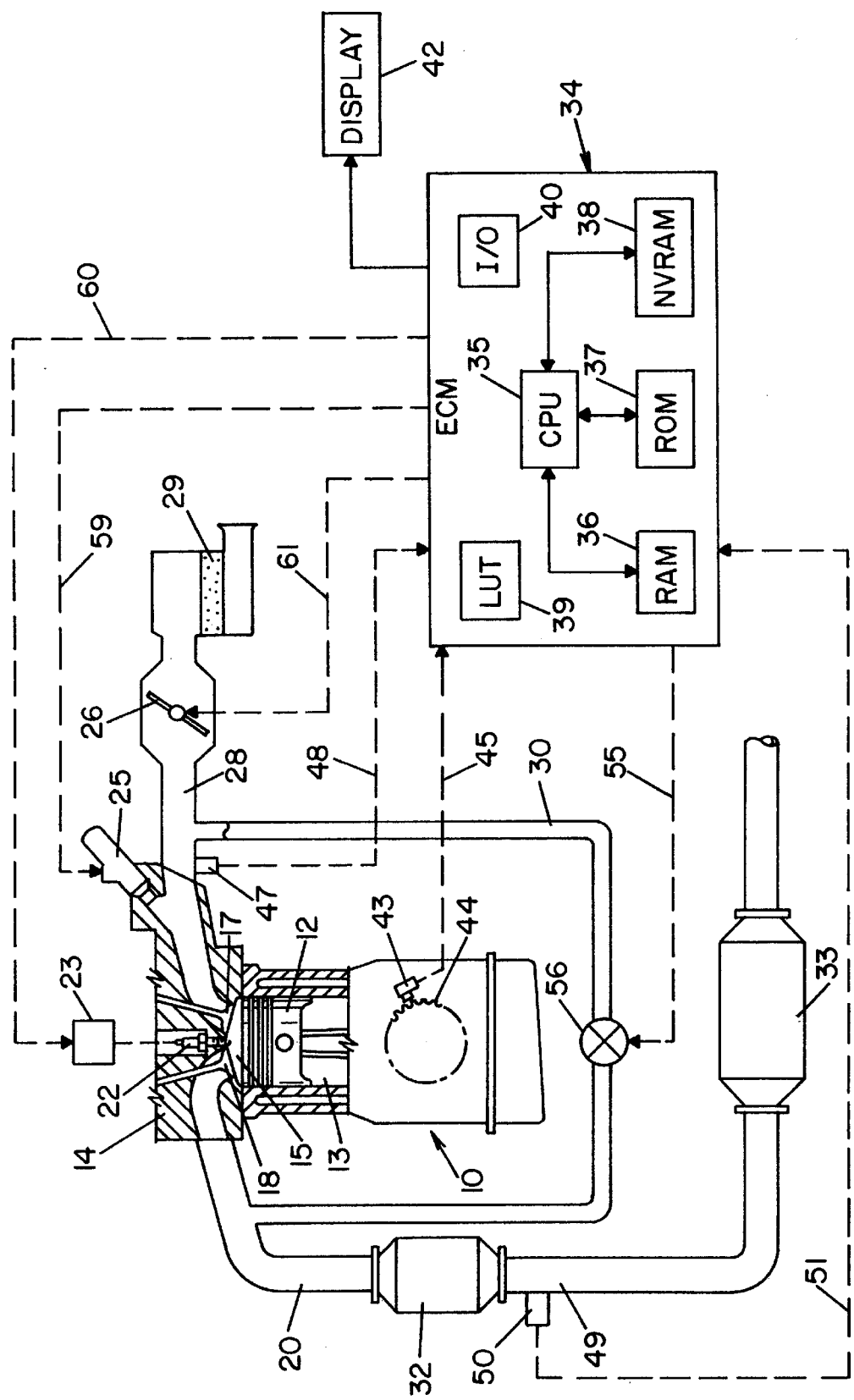
FIG. 1 is a general schematic of an internal combustion engine with several schematically depicted controls therefor.

Referring now to the drawings wherein the showings are for the purpose of illustrating a preferred embodiment and the invention only and not for the purpose of limiting the same, there is shown in FIG. 1 an internal combustion engine 10 for driving a vehicle.

THE SYSTEM

Engine 10 has one or more pistons 12 within a cylinder 13 which, in combination with the cylinder head 14, forms a combustion chamber 15. An intake valve 17 controls admission of fuel and air into combustion chamber 15 and an exhaust valve 18 controls the exhaust of products of combustion to an exhaust manifold 20. A spark plug 22 shown under control of a spark module 23 ignites the air-to-fuel mixture within combustion chamber 15 to produce products of combustion or exhaust gases or gaseous emissions vented through exhaust valve 18 to exhaust manifold 20.

A fuel injector 25 and an air throttle plate 26 control the fuel/air mixture admitted to combustion chamber through an intake passageway 28, in turn, connected to atmosphere through an air cleaner 29. Engine 10 is described only in its conventional, functional terms. For example, fuel injector 25 pulses metered quantities of fuel to combustion chamber 15 during each combustion cycle of engine 10. The time and rate at which injector 25 meters the fuel is typically referred to as the injector's pulse width and the quantity of fuel metered during the pulse is typically varied depending upon the manufacturer. For example, the fuel could be metered slowly upon actuation of fuel injector 25, build to a maximum value at some point in the pulse width and then diminish before fuel injector 25 closes. As used in this Description pulse width includes not only the duration of the pulse (and how the pulse may be varied during the duration it is on) but also the time at which the pulses are generated. Those skilled in the art understand how engine components work and they will not be described in detail herein since the invention contemplates application, in the preferred embodiment, to all typical engines and detailed explanations are not necessary for an understanding of the invention.

An exhaust gas recirculation loop, EGR 30, is provided for admitting a portion of the exhaust gas into intake passageway 28 for mixing with the fuel/air mixture injected to combustion chamber 15. Engine 10 is equipped with an exhaust system which includes, in the preferred embodiment, a light-off catalytic converter 32 adjacent exhaust manifold 20 and a three-way catalytic converter, TWC 33, downstream of light-off catalytic converter 32.

Engine 10 is conventionally under the control of an electronic control module or ECM 34 (controller or computer). ECM 34 is conventional and includes well known elements such as a central processing unit or CPU 35, RAM (Random Access Memory) 36, ROM (Read Only Memory) 37, and NVRAM (Non-Volatile Random Access Memory) 38. Also shown is a look-up table 39 separate and apart from ROM 37 (or alternatively, included as a component of ROM 37). Also shown is a conventional input/output (I/O) unit 40 for receiving and transmitting instructions from and to ECM 34. Insofar as one application of the invention is concerned, I/O unit 40 will transmit appropriate instructions to actuate a display failure light 42 situated in the vehicle. Alternatively or coincident with the actuation of display failure light 42 is the storage of a failure code in memory by CPU 35. Communication between ECM 34 and actuation units on the vehicle, including sensors associated therewith, is typically carried out by analog signals from the sensor digitized at the periphery of ECM 34 (by an appropriate A/D converter and an appropriate D/A converter sending back analog signals to actuation units), not shown. ECM 34 operates in a well known manner to control engine 10 and process engine control and diagnostic routines, such as stored by step-by-step instructions in ROM 37. As is well known, engineering operating parameters are read into ECM 34 as input signals which are then processed into output signals or control signals outputted from ECM 34 to actuators on the vehicle controlling vehicular operation, specifically, operation of engine 10. Insofar as the general operative concepts of the present invention is concerned, input signals are read into ECM 34, processed by RAM 36 and NVRAM 38 under the control of CPU 35 from algorithm routines stored in ROM 37. Data stored in memory including LUT 39 is then accessed by RAM 36 and NVRAM 38 through algorithms stored in ROM 37 under the control of CPU 35 to generate signals outputted by I/O unit 40. I/O unit 40 (which includes the D/A and A/D converters mentioned) send signals to the actuators on engine 10 including but not by anyway limited to actuating display 42 and/or storing codes, for example, in NVRAM 38. Those skilled in the art will recognize that the system of the present invention is illustrated for drawing convenience only as utilizing CPU 35 of ECM 34. While the calculations and process steps required by the inventive system could be performed by ECM 34, in practice the system of the present invention will utilize its own digital signal processor (DSP) which will interface with ECM 34. The DSP used by the system of the present invention will contain the same basic components as ECM 34 and operate in a known manner to perform the system routines. Accordingly, reference to ECM 34 herein means either ECM 34 or a separate DSP interfacing with ECM 34.

There are a number of sensors which generate engine operating information that is inputted to ECM 34 and used to control operation of engine 10. Several sensors are diagrammatically illustrated in FIG. 1 and include a timing pick-up unit 43 shown sensing rotation of engine fly wheel 44 and generating a timing signal on dash-line 45 to ECM 34. The input signal on timing signal line 45 can be viewed as an input sensor signal generating vehicular speed information, timing information whether for spark, fuel, or valve, or engine torque information. Additionally, an air flow sensor 47 senses mass air flow in intake passage 28 and generates an input signal on air sensor dash-line 48 to ECM 34. Air signal line 48 can also be viewed as carrying sensor information for manifold air pressure. In accordance with one of the preferred embodiments of the invention, a single, calorimetric sensor 50 generates a calorimetric sensor signal on calorimetric line 51 to ECM 34.

A number of actuators are employed on the vehicle for engine control and invariably the actuators themselves develop feedback signals to insure their settings. Actuators under the control of ECM 34 include, but are not limited to, several which are diagrammatically shown in FIG. 1 under the control of output signals generated by ECM 34. The output signals include but are not limited to an EGR control signal on EGR control line 55 regulating operation of an EGR solenoid valve 56. Additional output signals include a fuel injector signal on fuel injector dash line 59, a spark timing signal on spark timing line 60 utilized by spark module 23 to develop a signal for firing spark plug 22, and an air throttle signal on air throttle dash line 61 which can be viewed as setting mass air flow and/or manifold air pressure in intake passageway 28.

While the system as described thus far can be viewed as conventional in that all of the component parts shown in FIG. 1 are well known, it must be noted that in the embodiment of the invention illustrated in FIG. 1, there is only one exhaust sensor, specifically a calorimetric sensor 50, located downstream of light-off catalytic converter 32 and upstream of TWC 33. (Other system arrangements are diagrammatically illustrated in FIG. 20 and will be discussed later.)

Systems in use today conventionally use an exhaust gas oxygen sensor (EGO) upstream of the catalytic converter(s) and an EGO downstream of some portion of the catalytic converter(s). The upstream EGO functions as a feedback controller for engine fueling. Based upon the upstream EGO signal, the fuel injectors are controlled to provide the desired change in air-to-fuel ratio (AFR). Depending upon the placement of the upstream EGO and the operating condition of the engine, adjustments of AFR can be made at rates greater than 3 Hz. The upstream EGO is exposed to the harsh exhaust directly emitted from the engine. As a result of the location, the upstream EGO signal tends to change as the sensor ages, and a correction must be made to account for this signal change to ensure proper fueling as the vehicle ages. The downstream EGO is exposed to a significantly less harsh environment (less susceptible to aging) and is used to make this signal correction for the upstream EGO through a function referred to as "fuel trim". When intended to operate near stoichiometry (lambda=1) the upstream sensor may be providing a signal which indicates switching between rich and lean operating conditions. If the downstream EGO does not also indicate periodic switching, the fueling mixture may be biased to a lean or rich condition. In such instances, the upstream sensor may be biased and needs to be corrected to regain true stoichiometric control. The adjustment is made based upon the signals generated by the downstream EGO. The downstream EGO besides functioning as "fuel trim" for an aged upstream EGO, is also used, in addition to the upstream EGO, for control of the air-fuel bias. In a new UEGO there can be a considerable variance in the lambda=1 output. Using a second HEGO, the air-fuel bias can be more accurately controlled at stoichiometric conditions.

Two types of EGOs are typically employed, either a heated EGO (HEGO) or a universal EGO (UEGO). A HEGO provides a high voltage signal (typically ~800 mV) when the mixture is rich and a low voltage signal (typically ~100 mV) when the mixture is lean. Upon the gas mixture composition crossing stoichiometry, the HEGO signal quickly switches between the high and low voltage outputs. Hence, the sensors are commonly known as "switching sensors". A UEGO provides a voltage signal which directly correlates to the AFR over a wide range of values (typically lambda~0.7 to ~32). UEGOs are commonly referred to as "wide range oxygen sensors". The structure and method of operation of both HEGO and UEGO type sensors is well known to those skilled in the art and need not be reproduced herein.

In one simple form of fuel control, a prior art HEGO sensor upstream of light-off catalyst 32 would simply generate a signal to indicate whether the exhaust gas was rich or lean. If rich, ECM 34 decreased the pulse width of fuel injector 25 to make the mixture more lean. If lean, ECM 34 increased the pulse width of fuel injector 25 to make the air/fuel ratio more rich. In this manner, ECM 34 cycled the air/fuel mixture about stoichiometric, i.e., lambda equal to 1. A UEGO sensor upstream of light-off catalytic converter 32 is typically used to allow a measure of deviation from $\lambda=1$ to enable quicker fueling correction. Additionally, with a UEGO sensor, air/fuel can be controlled at desired values other than lambda equal to 1. It should also be noted that if HEGO sensors are used to control the engine at stoichiometric conditions, there will occur a hunting of the AFR and this will tend to occur at some natural or resonant frequency of the system. Thus the engine will always cycle about some variable conditions.

As discussed, typical arrangements placed EGO sensors upstream and downstream of the catalytic converter and use the downstream sensor signal (relative to the upstream sensor signal) to also determine OSC effectiveness. This is the basic approach used in the prior art to determine whether or not a vehicle had complied with emission standards. The prior art scheme never directly measured any emission such as HC, NO or CO. Also, the system of the present invention (while capable of being used in combination with an EGO sensor as described below) has a distinguishing feature, from a hardware point of view, in that only one calorimetric sensor 50 as shown in FIG. 1 can be used to accomplish both fuel control and emission compliance.

As noted above, catalytic converters can be designed with minimal oxygen storage components reducing the cost of the catalytic converter through minimal use of the oxygen storage components. Through eliminating OSC components, more stable, higher surface area supports for the precious metal can be utilized. This can result in reduced catalyst-monolith volume and overall precious metal content to accomplish the target conversion efficiencies. Preferably, the catalyst coating is palladium. Because use of oxygen storage components have been minimized, sintering temperature of the converter also increases. As noted, light-off catalytic converter 32 is exposed to gases and surroundings at high temperatures.

Close-coupled catalyst 32, when used as part of the exhaust emission system, is a relatively recent development and reference should be had to U.S. patent application Ser. No. 08/350,297 (WO96/17671) hereby incorporated by reference herein for a more detailed explanation of close-coupled catalyst 32 and a system for use therewith than that which will be discussed herein. As will be explained below, the invention specifically contemplates and is even designed for use with a close-coupled catalyst, particularly one lacking intentionally added OSC.

Close-coupled catalysts have been designed to reduce hydrocarbon emissions from gasoline engines during cold starts. More particularly, the close-coupled catalyst is designed to reduce pollutants in automotive engine exhaust gas streams at temperatures as low as 350° C., preferably as low as 300° C. and more preferably as low as 200° C. The close-coupled catalyst of the present invention comprises a close-coupled catalyst composition which catalyzes low temperature reactions. This is indicated by the light-off temperature. The light-off temperature for a specific gaseous component is the temperature at which 50% of that component reacts.

Close-coupled catalyst 32 is placed close to engine 10 to enable it to reach reaction temperatures as soon as possible. However, during steady state operation of the engine, the proximity of the close-coupled catalyst to engine 10, typically less than two feet, more typically less than one foot and commonly attached directly to the outlet of exhaust manifold 20 exposes the close-coupled catalyst composition to exhaust gases at very high temperatures of up to 1100° C. The close-coupled catalyst in the catalyst bed is heated to high temperature by heat from both the hot exhaust gas and by heat generated by the combustion of hydrocarbons and carbon monoxide present in the exhaust gas. In addition to being very reactive at low temperatures, the close-coupled catalyst composition should be stable at high temperatures during the operating life of the engine. TWC 33 downstream of the close-coupled catalyst can be an underfloor catalyst or a downstream catalyst. Close-coupled catalyst 32 increases the gas temperature through conversion of HC and CO which, in turn, enables the downstream catalyst, typically the underfloor three-way catalyst, TWC 33, to run more effectively at a higher temperature. The downstream or underfloor catalyst 33 typically includes an oxygen storage component and reference can be had to U.S. patent application Ser. No. 08/083,143, filed Jun. 25, 1993 (WO 95/00235) for a better description of such TWC catalyst than that shown herein. Publication WO 95/000235 discloses a layered TWC, and in accordance with concepts made possible by this invention the first and second layers of TWC 33 can be principally formed of palladium coating with minimal oxygen storing compositions utilized in the washcoat. Sintering resistance and improved performance will result.

Close-coupled catalyst 32 preferably is in the form of a carrier supported catalyst where the carrier comprises a honeycomb type carrier. Essentially, close-coupled catalyst has substantially no cerium oxide and praseodymium oxide. More particularly, the catalyst composition includes a support; a palladium component; optionally at least one alkaline metal oxide selected from the group consisting of strontium oxide, calcium oxide and barium oxide; optionally at least one platinum group metal component selected from the group consisting of platinum, rhodium, ruthenium and iridium components; and optionally a second zirconium oxide. Some close-coupled catalysts have also optionally included at least one rare earth oxide selected from the group consisting of neodymium oxide and lanthanum oxide. However, neither lanthanum or neodymium is necessary. More specifically, the preferred composition is from about 75 to 300 g/ft3 of the palladium components; from about 0.75 to about 2.02 g/in3 of activated alumina support; from about 0.05 g/in3 to about 0.4 g/in3 of strontium oxide; from about 0.05 to about 0.2 g/in3 of barium oxide; and from about 0.05 to about 0.5 g/in3 of the second zirconium oxide.

THE SENSOR

Figure 2:
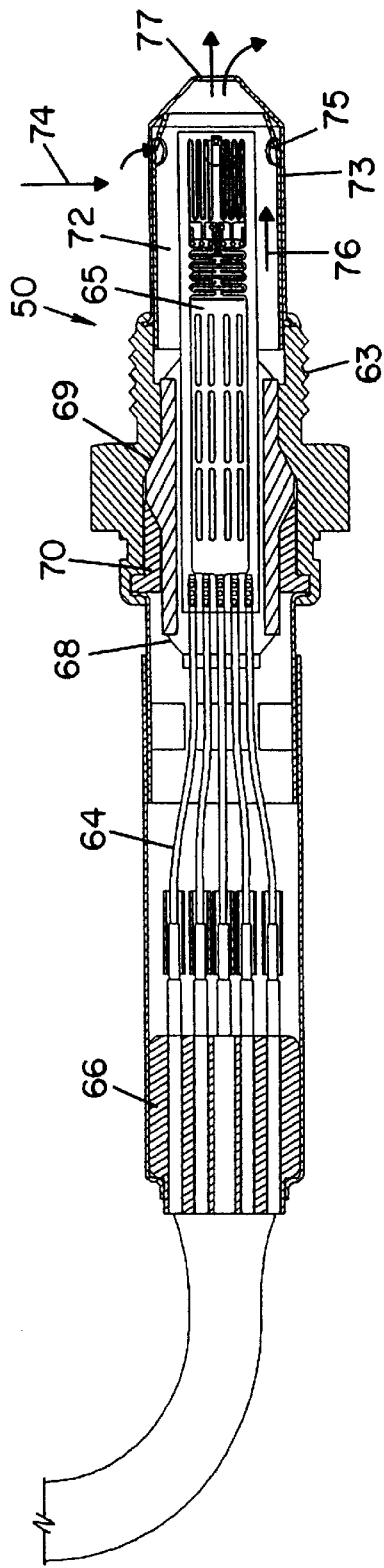
FIG. 2 is a sectioned longitudinal view of a calorimetric sensor used in the present invention.
Figure 3:
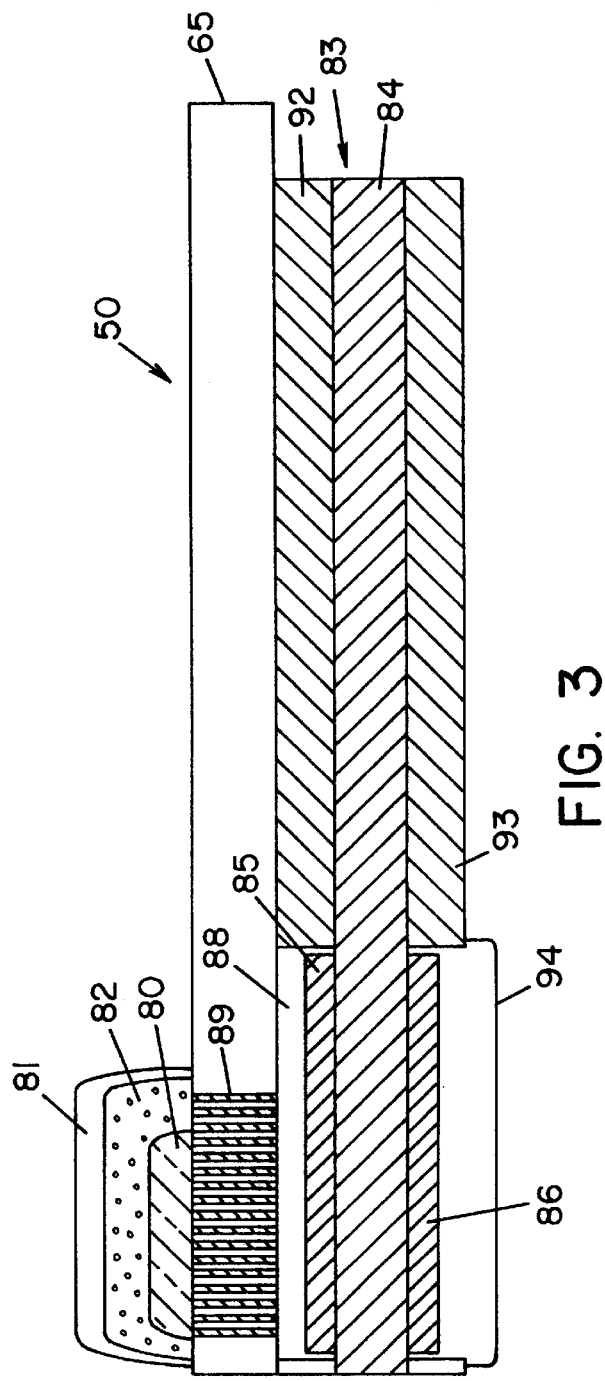
FIG. 3 is a schematic, sectioned, partial longitudinal view of a calorimetric sensor of an alternative design to that shown in FIG. 2.
Figure 4:
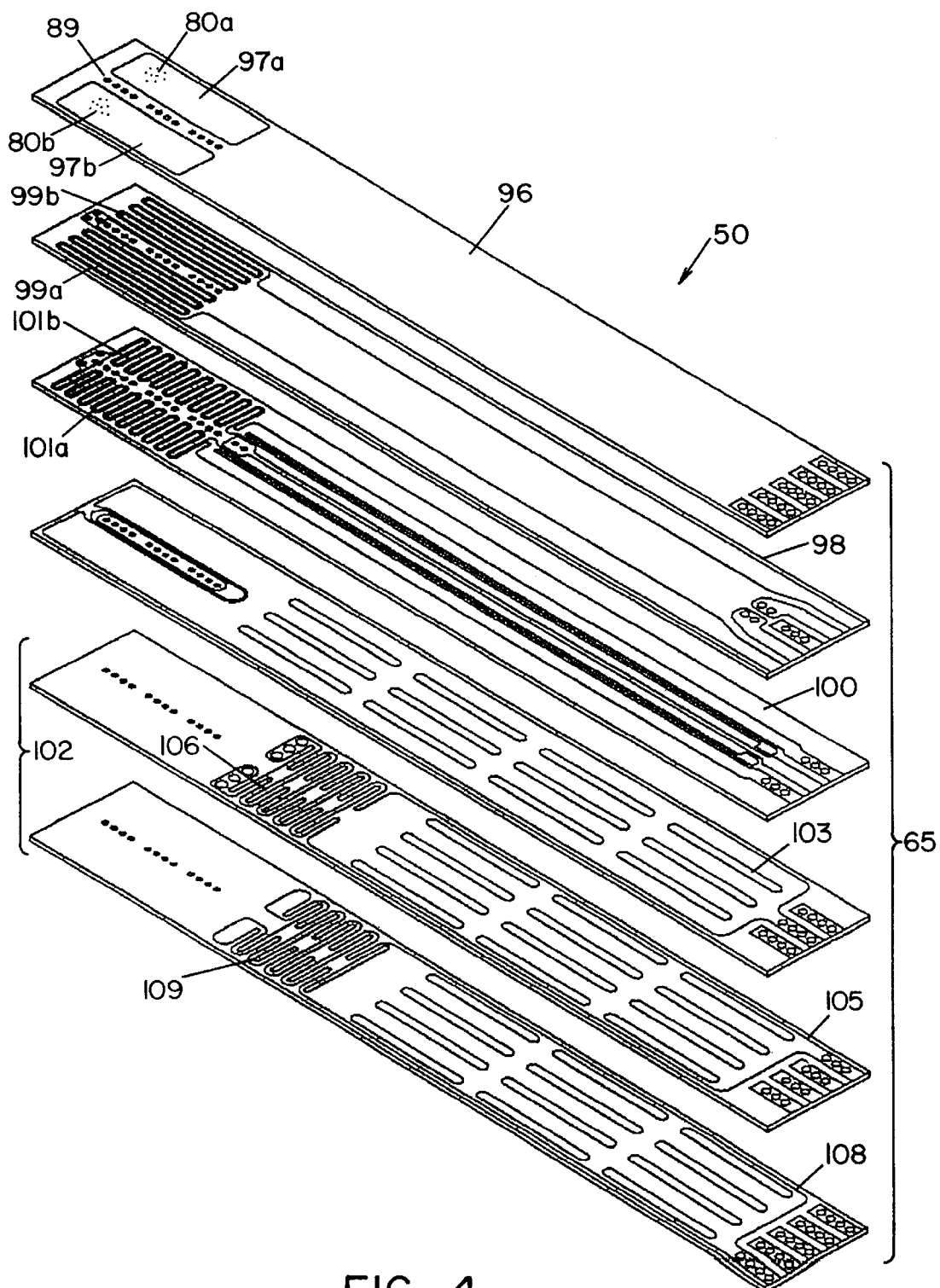
FIG. 4 is a perspective, overlay view of substrate components for the sensor shown in FIG. 3.

Calorimetric sensor 50 of a design typical of that used in the preferred embodiment of the invention is generally disclosed in FIGS. 2, 3 and 4. Reference should be had to U.S. patent applications Ser. Nos. 08/970,837; 08/970,698; 08/970,259; 08/970,262; and, 08/970,486, all filed on Nov. 14, 1997, each of which is incorporated herein by reference, for a more detailed description of calorimetric sensor 50 than that which will be set forth herein. Referring specifically to FIG. 2 which illustrates a cross-sectional view of calorimetric sensor 50, there is shown a threaded housing 63 by which calorimetric sensor 50 is mounted into a wall of exhaust pipe 49. Electrical conductors 64 extend from the sensor's substrate 65 and engage a cable harness 66. Substrate 65 is engaged by a mounting member 68 which has a flange 69 engaging on one side threaded housing 63 and on the other side the seal 70 which prevents exhaust gas from escaping from a gas chamber 72 formed at a tip end 73 of calorimetric sensor 50. Exhaust gas flowing past tip end 73 enters calorimetric sensor 50 through apertures 75 and flows through an annular passage (not shown in FIG. 2) towards the opposite end of calorimetric sensor 50 whereat it is reversed and travels in the direction of arrow 76 to an outlet opening 77 in tip 73. By sizing the annular passage in communication with aperture 75 and reversing the exhaust flow, any entrained particles are separated and turbulence of the gas stream is eliminated so that the sensing element of calorimetric sensor 50 sees only laminar flow. Reference can be had to U.S. patent application Ser. No. 08/970,698 for a further detailed discussion.

Referring now to FIG. 3, there is shown a longitudinally extending cross section schematic representation of the sensing portion of calorimetric sensor 50. The general components making up the sensing portion of calorimetric sensor 50 as shown in FIG. 3 include multi-layered substrate 65 on one side of which is coated a catalyst 80 which is surrounded by a diffusion membrane 81. Diffusion membrane 81 is described in some detail in U.S. patent application Ser. No, 08/970,486 and reference should be had to that application for a further discussion of the composition and function of diffusion membrane 81. For purposes of the present invention, diffusion membrane 81 limits the amount of exhaust gas sensed by substrate 65 but does not change the composition of the exhaust gas concentrations. It should, however, be noted that hydrogen ($H_2$) diffuses more rapidly through diffusion membrane 81 than other emission compounds. Interaction between the exhaust gas compound and catalyst 80 is shown by an interactive volumetric area designated by reference numeral 82 in FIG. 3. Also, an aperture (not shown) is provided in diffusion membrane 81 to assure egress of the diffused gases.

On the opposite side of multi-layer substrate 65 is an oxygen diffusion structure or an electrochemical "oxygen pump" 83. The calorimetric sensor 50 of the preferred embodiment does not use an electrochemical pump. It is shown in FIG. 3 only for purposes of discussing an alternative embodiment of calorimetric sensor 50.

Electrochemical pump 83 includes a solid electrolyte such as a body of yttrium stabilized zirconia 84 having inner and outer electrodes, 85, 86 respectively. As is conventionally known, when a voltage is placed across electrodes 85, 86, oxygen ions resulting from oxygen compounds in the exhaust gas travel across the electrodes to enter substrate configuration 65 and provide oxygen for exothermic oxidation reactions. More specifically, oxygen enters a space 88 beneath multi-layered substrate 65 and travels through vias 89 within multi-layered substrate 65 to provide oxygen for the oxidation reactions discussion. Upper and lower ceramic insulators 92, 93, respectively, and a protective membrane 94 which encases solid electrolyte 84, serve to mount the electrolyte to multi-layered substrate 65 and serve as a filter/protection mechanism for the electrolyte. Those skilled in the art will recognize that electrochemical pump 83 functionally resembles a universal exhaust gas oxygen sensor (UEGO). As will be explained later, an alternative embodiment of the invention contemplates the use of calorimetric sensor 50 with a UEGO sensor by packaging both sensors together in one housing. In accordance with that concept, it is possible to modify calorimetric sensor 50 so that electrochemical pump 83 can measure the oxygen content in the exhaust gas. The modification would be to provide fluid communication of space 88 through a tube extending out of calorimetric sensor 50 and open to atmosphere. This will provide reference gas pressure (and an additional source of oxygen for vials 89) allowing inner electrode 85 to function as a reference electrode so that the EMF between electrodes 85, 86 can be correlated to the Nernst equation to determine oxygen content in a well known manner. For example, reference can be had to U.S. Pat. No. 4,792,752 to Schlechtriemen et al. and U.S. Pat. No. 5,393,397 to Fukaya et al. for specific electrolyte compositions and coatings applied thereto which can be used in place of or as additional coatings applied to zirconia body 84 to permit electro chemical pump 83 to operate as a UEGO sensor. Again, the discussion of using electrochemical pump 83 for a function other than as an "oxygen pump" is only to show that it is conceptually possible to build into a calorimetric sensor, a UEGO sensor. The sensor modification discussed would, for several reasons, not be placed in commercial use. The commercial alternative embodiment of the invention would simply package a UEGO sensor in the calorimetric sensor housing.

Reference can now be had to FIG. 4 which is an overlay of various layers making up multi-layered substrate 65. Multi layered substrate 65 comprises a plurality of ceramic layers which, with the exception of a top layer 96, supports screen-printed metalization defined in different patterns to form the various functional elements necessary to measure and control temperature within calorimetric sensor 50. More specifically, top layer 96 is shown for discussion purposes only, to have two active regions 97a, 97b. In one embodiment of the invention and in one active region, a first catalyst 80a is disposed and in the other region, a second catalyst 80b is disposed. Between regions 97a and 97b is the plurality of vias 89 through which oxygen generated by the electrolyte discussed above diffuses. In the alternative embodiment, vias 89 are present in each one of the layers for oxygen flow to the catalysts. (In the preferred embodiment, vias 89 are not present. Instead, a slot is made between compensation heaters 101a and 101b and RTDs 99 as hereafter defined to provide a "tuning fork" designed sensor.) Immediately beneath top layer 96 is first intermediate layer 98 which has resistance temperature devices (RTDS) 99a, 99b underlying active regions 97b, 97a respectively. Underlying first intermediate layer 98 is a second intermediate layer 100 which contains resistance heating elements 101a, 101b underlying first and second active regions 97b, 97a, respectively; which will hereafter be termed compensation heater 102. A third intermediate spacer element 103 is provided and underneath third intermediate layer 103 there is a fourth intermediate layer 105 containing a primary heating element 106 and a fifth or bottom layer 108 also containing a primary heating element 109.

In operation, voltage is applied to primary heating elements 106, 109 and to compensation heaters 101a, 101b to bring calorimetric sensor 50 to a predetermined stable temperature as measured by RTDs 99a or 99b. As exothermic reactions develop on catalyst surfaces 80a, 80b different temperature rises occurring over regions 97a, 97b will be sensed by RTDs 99a, 99b. To compensate for the rises detected by RTD's 99a, 99b, the applied voltage will be reduced for compensation heaters 101a, 101b to maintain RTD readings at calibrated set points. This power adjustment necessary to maintain RTDs 99a, 99b at their set points is proportional to the difference in the energy generated by the reactions promoted vis-a-vis catalysts 80a, 80b. Reference should be had to U.S. patent application Ser. No. 08/970,837, Filed Nov. 14, 1997, entitled "Calorimetric Hydrocarbon Gas Sensor" (incorporated herein by reference) for a detailed description and showing of the specific circuitry utilized to raise the temperature to bring active regions 97a, 97b into balance at their set operating temperatures.

Standard practice is to apply a catalytically inactive material to one of the active regions 97a, 97b and which functions as a reference signal while an active catalyst is applied to the other active region 97a or 97b. As to the composition of the catalyst for first and second catalyst 80a, 80b, reference should be had to U.S. patent application Ser. No. 08/970,259, filed Nov. 14, 1997, entitled "Exhaust Gas Sensor" (incorporated by reference) which defines a number of catalyst compositions which can be utilized to promote the selected exothermic oxidation reactions defined herein.

As explained in greater detail in parent application Ser. No. 09/019,085, filed Feb. 6, 1998, calorimetric sensor could simply have a catalyst containing rhodium and bismuth on ceria zirconia to make it selective to sense only CO (and $H_2$)

emissions in which case only one area 80a or 80b would be coated. Alternatively, one area 80a or 80b could be coated with a COS (carbon monoxide selective) selective catalyst and the other area 80b or 80a could be coated with a catalyst capable of sensing all combustibles (HC, CO, $H_2$) such as a platinum rhodium catalyst impregnated into a prestabilized alumina. Subtracting the total combustibles signal from the COS catalyst signal yields an EC signal.

In accordance with the broader aspects of the invention any coating can be provided to area 97 such that energy reactions selective to certain emissions can be detected. In accordance with the specific embodiments of the invention disclosed, the coatings take the form of catalysts and, include but are not limited to catalyst coatings promoting reactions of all combustibles (HC, CO, $H_2$) or promoting reactions with selective combustibles such as COS catalysts (CO, $H_2$).

Insofar as the total combustibles catalyst is concerned, a catalyst 80 applied to active region 97 comprises active metal components such as one or more of the following elements: platinum, rhodium, palladium, iridium, and ruthenium. Generally, platinum, rhodium and palladium are preferred. These active metals are preferably supported on a stable refractory support such as alumina, zirconia, titania, silica, silica alumina or other similar ceramic materials. High surface area materials such as gamma alumina are preferred. Optionally, an oxygen storage material such as ceria may be added to the catalyst formulation. However, this material is not essential for utility in a sensor where there is sufficient oxidizing agent present in the environment or where an oxidizing agent, such as air or oxygen, is provided by external means. Thus, even more preferred are refractory materials that are especially stabilized by thermal, geothermal or chemical means, such as precalcined alumina and ceria stabilized zirconia. The particle size of the catalyst should be such that a binder can be used to adhere the catalyst formulation. In addition, the particle size and uniformity of the catalyst should be such that the processes for catalyst deposition, such as screen printing, are feasible. In general, the mean particle size of the catalyst material should be less than ten microns in diameter with a more or less normal distribution about that mean. More preferred is a mean particle size of approximately 5 microns in diameter.

A specific example of how a total combustible catalyst is prepared as follows:

100 grams of gamma alumina is calcined in a furnace at 850° C. for thirty minutes. 50 g of the calcined alumina is then impregnated to incipient wetness with 14.4 g of an aqueous solution (18.0% Pt) of a platinum amine hydroxide salt diluted with 11 g of water. Then 1.5 ml of acetic acid is mixed into the impregnated alumina. The remaining 50 g of calcined alumina is impregnated with 0.2 g of rhodium nitrate solution (10.37% Rh) diluted with 20 g of water. Then 1.3 ml of monoethanolamine is mixed into the rhodium impregnated alumina. Both impregnated aluminas are placed into a jar mill and then enough water is added to give a slurry of about 40% solids. Grinding media is added and the slurry is milled until a median particle size of about 5 microns is obtained. The slurry is removed from the jar and the water is removed using a rotary evaporator. The remaining solids are dried at 120° C. The catalyst can be calcined at 550° C. in preparation for deposition onto a sensor.

Insofar as the COS catalyst is concerned, region 80 would include a catalyst composition having a rhodium component and a bismuth component on a refractory oxide support. The rhodium and bismuth are combined as a solution of soluble salts, e.g., nitrates, sulfates, etc., at very low pH so that bismuth sub-oxide does not precipitate from the solution. Alternately, any method that intimately contacts the rhodium and bismuth can be used to synthesize the catalyst. This includes but is not limited to the inclusion of materials such as fluxes and low melting frits. The atomic ratio of bismuth to rhodium can vary over a wide range but the preferred ratio is in the range of 0.5–3.0. The most preferred ratio tends to be 1.0 to 2.5 depending on the exact materials and the exact procedure used to synthesize the catalyst.

A solution of the bismuth and rhodium salts is impregnated onto a refractory support such as zirconia or ceria stabilized zirconia. Other supports are suitable in this application, but may affect the selectivity of the catalyst under certain circumstances. For example, the selectivity of a catalyst prepared using high surface area alumina is believed to be inferior to a catalyst prepared using ceria stabilized zirconia.

Following impregnation of the refractory support with the rhodium/bismuth solution, the catalyst is dried and then calcined at a sufficiently high temperature for obtaining optimal performance. As presently preferred, calcination of the catalyst should be carried out at 850° C. for approximately ten (10) to fifteen (15) minutes. While it is likely that these time and temperature parameters can be varied significantly without affecting the performance of the reference catalyst, it is believed that calcination at a temperature less than 550° C. gives inferior results. The resulting catalyst powder is typically coated on a small ceramic honeycomb monolith for catalytic evaluation. More specifically, approximately 4.0 grams of catalyst is combined with sufficient water to make a 45% solid slurry. The resulting slurry is homogenized with a magnetic stirrer. The slurry is transferred to a 30 ml plastic vial fitted with a snap cap. A weighed ceramic monolith in the shape of a cylinder having dimensions approximately 25 mm high by 19 mm diameter and a cell density of approximately sixty (60) cells per $cm^2$ is placed into the plastic vial. The vial is inverted several times to ensure that slurry passes through all the monolith channels. The monolith is removed from the vial and excess slurry is removed with an air knife. The monolith is weighed to determine if the appropriate amount of coating has been applied. After the coating is acceptable, the monolith is dried at 120° C. Then the monolith is placed in a crucible and the crucible is placed into a furnace. The temperature of the furnace is raised to 550° C. and held at that temperature for approximately ten (10) minutes and the temperature is then raised to approximately 850° C. for ten (10) to fifteen (15) minutes. The crucible is removed from the furnace and cooled to room temperature. The monolith is weighed to determine the weight of the dry coating by subtracting the weight of the uncoated monolith from the weight of the coated monolith. Typical catalyst coatings on the monolith are approximately 0.6 grams with a density of approximately 0.2 grams per $cm^3$ of monolith.

Rhodium is the presently preferred metal for the COS catalyst. While platinum, palladium or iridium may be substituted for rhodium in the standard catalytic preparation, it is believed that such combinations would necessarily require optimization for these other elements. Furthermore, it is anticipated that other modifiers for rhodium, besides or in addition to bismuth, may be added to the catalyst composition.

A specific example of COS selective catalyst containing rhodium and bismuth on ceria zirconia is prepared in accordance with the following procedure. 36.6 grams of bismuth nitrate pentahydrate is dissolved into 58.0 grams of rhodium nitrate solution (10.37% Rh). This precious metal solution is slowly added to 40.0 g ceria stabilized zirconia and stirred until incipient wetness is achieved which may not require all of the precious metal solution. This impregnated material is then dried at approximately 120° C. As needed, the previous two steps are repeated until all of the precious metal solution has been used. The impregnated material is slurried to approximately 50% solids in water. 2.4 g of zirconium hydroxide paste (50% solids) are added to the slurry and the mixture is placed into a jar with a suitable grinding media and milled until a median particle size of approximately 5 microns is achieved. A rotary evaporator removes water from the slurry which is subsequently oven dried at 120° C. 4.0 g of catalyst is slurried to 45% solid with water in preparation for coating onto the sensor using the coating procedure described above.

There are some modifications to calorimetric sensor 50 which can be made when used in this invention. As will be explained below, a changing or relative signal is used in the invention. Thus, there is no need for a reference catalyst developing a variable signal indicative of an absolute reference point or a zero. When calorimetric sensor 50 is used in its simplest form, only one catalyst surface 80a or 80b is used. (This allows utilization of a larger catalyst surface area within the space confines of the sensor and a more responsive signal. The substrate shown in FIG. 2 is figuratively split down the middle reducing the "wire count" of the device.) Then, the signal developed by maintaining the power suppled to a single compensation heater required to maintain the single RTD at a set point is used for exhaust gas measurements.

Conceptually, any balancing circuit can be used to ascertain the temperature rise sensed by RTD 99 and adjust the power supplied to compensation heater 102 to return RTD 99 to its original setting. For example, a Wheatstone bridge could functionally measure resistance change in RTD 99 with the bridge's output signal used to adjust compensation heater 102. In practice, specific resistance circuits and a controller is used to power compensation heater 102 and simultaneously develop the sensor signal used in the invention as shown in FIG. 18.

Figure 5A:
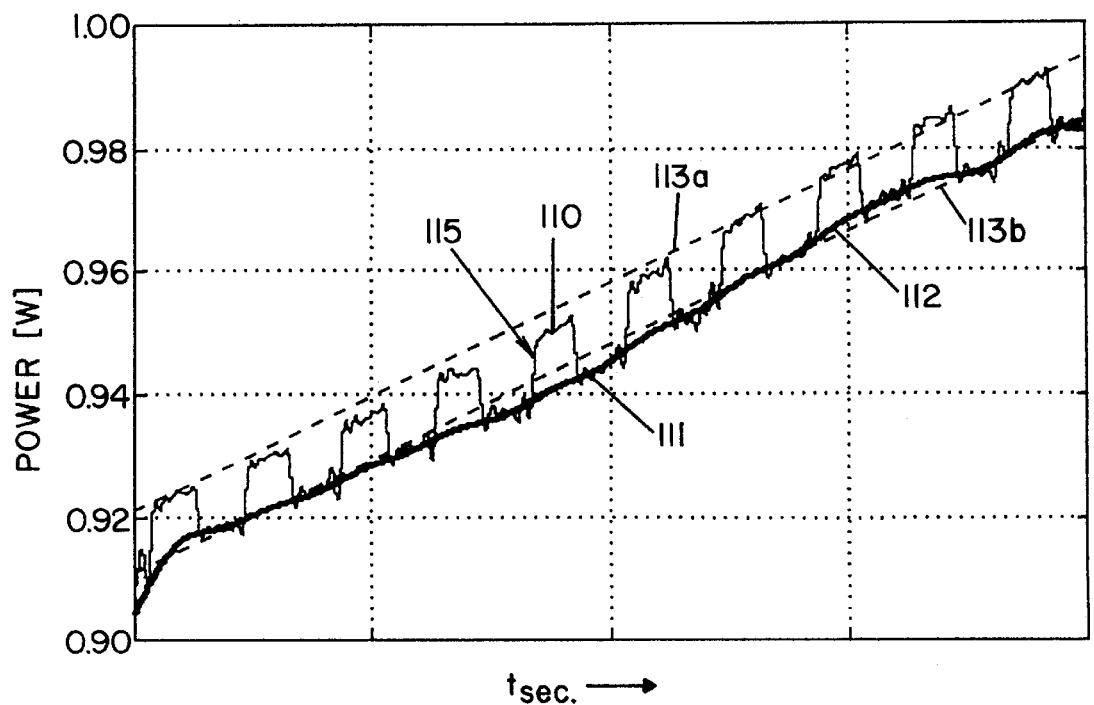
FIG. 5A is a first trace of the output signal of the calorimetric sensor of FIG. 2 and is a duplicate of FIG. 5A of the parent patent application, Ser. No. 09/019,085.
Figure 18:
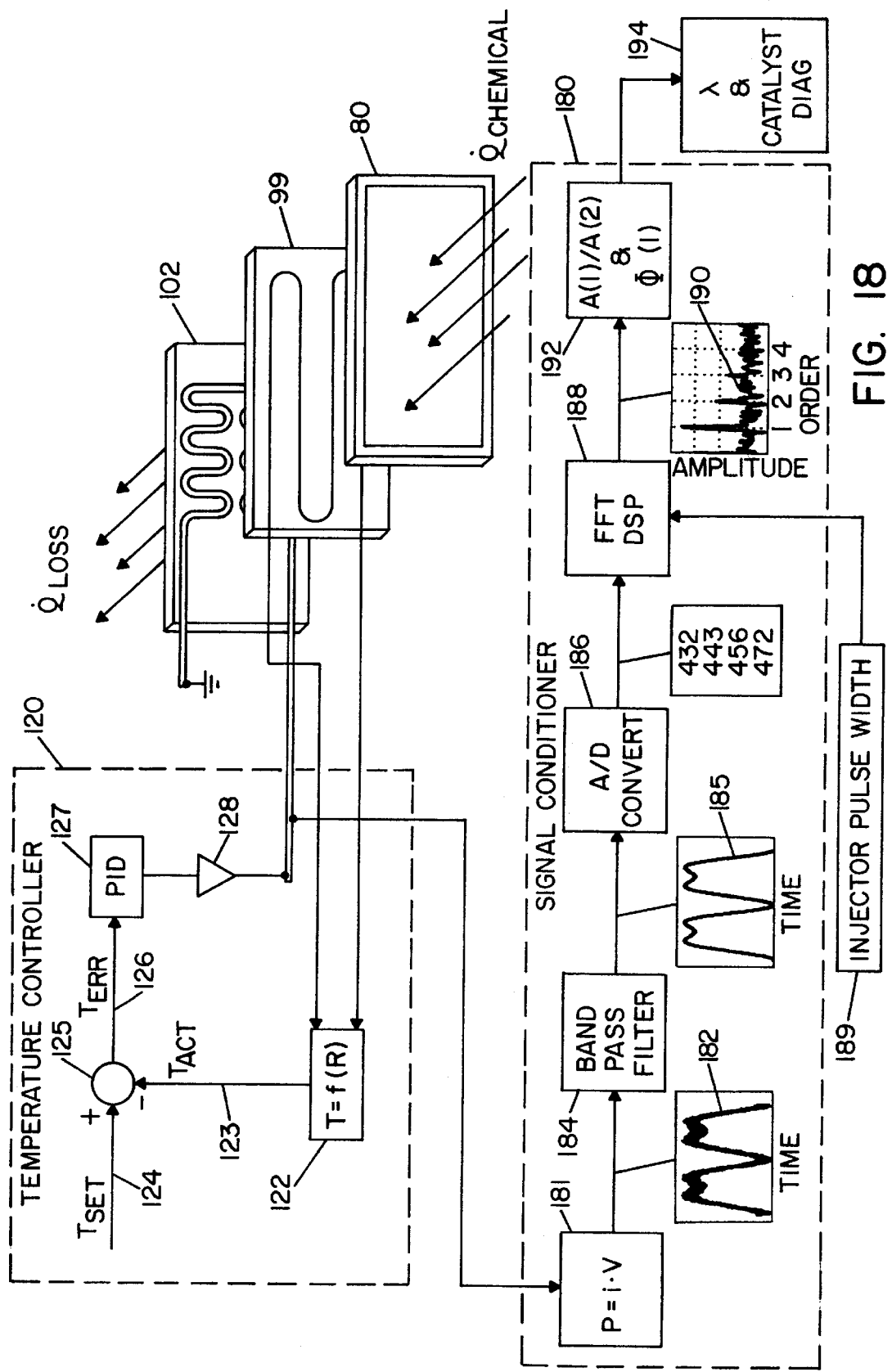
FIG. 18 is a schematic representation of the signal processing system utilized in the present invention.

FIG. 18 schematically shows the principle components of sensor 50 whereby emission reactions are chemically promoted at reaction area 97 by the catalyst coating 80, as described, to liberate energy (Q chemical heat) because the emission reactions are principally exothermic. At the same time, system heat (temperature of the exhaust gas, temperature of the engine and components) is also present and sensed by calorimetric sensor 50. While the system heat is significantly greater than the energy liberated by the emission reactions, the rate of change of the system heat is, generally speaking, less than the rate of change of the energy liberation caused by the emission cycling such as shown in FIG. 5A. Generally, calorimetric sensor 50 and specifically RTD 99 which senses the system heat and the heat resulting from liberated emission energy will be at higher temperature than the surroundings of calorimetric sensor 50 resulting in a heat release from calorimetric sensor 50 shown as Q loss. Q loss changes randomly depending upon system heat flux to the sensor. RTD 99 generates an electrical resistance signal indicative of the temperature at RTD 99. The RTD signal is read by a temperature controller 120 which adjusts the power to compensation heater 102 to cause RTD 99 to generate a resistance signal equal to its calibrated resistance setting. The power to compensation heater may vary randomly to offset the random changes to Q loss. The power to compensation heater 102 will vary systemically to maintain RTD 99 at the calibrated setting to offset the systemic variation in Q chemical heat liberated on surface 97 resulting from systemic engine cycles which includes systemic changes in the gas composition. Thus, the power signal plotted for the exotherms resulting from energy liberation attributed to the chemical reaction of emissions sensed by calorimetric sensor 50 is negative. Importantly, calorimetric sensor 50 is able to differentiate between system heat and chemical heat resulting from reaction from gaseous emissions on surface 97 and generate a signal indicative of emission concentrations without reference to a zero measurement which is adversely affected by system heat considerations.

Temperature controller 120 functionally includes a resistance circuit 122 (IC or otherwise). Resistance circuit 122 applies a current to the leads of RTD 99 and measures the voltage change attributed to the change in resistance caused by the temperature sensed by RTD 99 to develop an analog signal, indicative of the actual instantaneous temperature, on line 123. The actual temperature is compared with the set point temperature on line 124 (the calibrated temperature signature) at summing junction 125 to produce an error signal on line 126. The error signal is inputted to a conventional PID controller 127 which has circuits or control loops that perform conventional mathematical routines (Proportional, Integral, Differential) to produce a control signal. The control signal is sent to an operational amplifier or driver 128 which sets the gain signal for powering the resistance heater elements of compensation heater 102. The gain signal, a power signal for powering compensation heater 102, is also the calorimetric sensor signal which will be subsequently processed in a manner described below. While it is preferred that the calorimetric sensor signal be initially developed as an analog signal such as by circuitry generally illustrated in FIG. 18, those skilled in the art will understand that digital techniques could be alternatively employed.

Inventive Theory

A number of terms will be used throughout the Detailed Description. In order to avoid ambiguities, the following terms will have the following meanings which may be slightly tailored from their classic definition to apply to this invention.

"Oxidant" means a substance which accepts electrons during a chemical reaction.

"Reductant" means a substance that chemically reduces another element by donating an electron(s).

"Oxidation-reduction" refers to a chemical reaction in which one chemical substance is oxidized and one chemical substance is reduced.

"Lambda" or "λ" means an AFR divided by that AFR necessary to support stoichiometric combustion. A lambda of about 1 means an AFR which produces stoichiometric combustion.

"Lambda bias" is used to refer to how far the midpoint of a cyclical lambda wave is displaced from a lambda value of 1. In this invention, lambda is periodically cycled (preferably as a sinusoid) between 2 conditions which, on transformation, will produce a sinusoidal wave and the displacement of the center of the wave from a lambda value of 1 is its bias.

"Lambda perturbation amplitude" is the total amplitude of the lambda sine wave, from peak to trough to trough.

"Steady-state" means a constant non-changing, level of sustained combustion at a fixed operating condition.

"Order" is a frequency component of the frequency spectrum resulting from the Fourier Transform of the calorimetric sensor signal related to the forcing function and "First Order" refers to the frequency component of the Fourier Transform at the primary frequency of the forcing function, i.e., the input frequency at which the engine cycles or oscillates between two extreme conditions.

"Lean burn" means an operating condition of the engine whereat the engine is operated within a AFR range extending from lambda greater than one up to misfire. The beginning of the range is a function of the engine design. In the discussion below, data is presented for lean burn conditions based on an engine that was designed to operate at stoichiometric conditions and not at lean burn conditions. For that engine, the lean burn condition range is shown to begin at lambda values of about 1.1 to about 1.2 extending until misfire.

"Fuel Trim" means a drift adjustment of any sensor which detects lambda at AFR conditions about or near stoichiometric, or a drift adjustment of any sensor which detects lambda under lean burn conditions whereat unstable combustion occurs. Fuel trim is not conventionally used in lean burn applications, but the definition is expressly expanded in this patent to include lean burn because of the abilities of the inventive system to detect unstable combustion conditions.

It should also be noted that the invention is described consistently in terms of energy while the preferred embodiment of the invention is primarily concerned with energy in the form of heat. The invention in its broader form is applicable to any form of energy measurement, i.e., chemical, electrochemical, electronic, etc. resulting from chemical reactions or transformations with or without reference to heat and "energy" is used in its broader sense to cover all such reactions. At the same time, it is also recognized that the specific application of the invention to a mechanism sensing heat liberation, specifically heat liberation in the environment of an internal combustion engine, has its own set of specific parameters making the "species" inventive in its own right. For example, the quantity of system heat which calorimetric sensor 50 is exposed to masks the almost insignificant change to the system heat attributed to minor emission quantities and presents a unique problem. When that problem is mated with an intrusion technique affecting exhaust gas composition a further set of parameters is introduced without considering any of the problems related to the reactive areas of the sensor, all of which make the inventive embodiments disclosed herein patentably unique in their own right.

Reference is now had to FIG. 5A which is reproduced from parent U.S. patent application Ser. No. 09/019,085, filed Feb. 6, 1998. FIG. 5A is a plot of a signal from calorimetric sensor 50 as engine 10 is cyclically switched between two operating conditions. The first operating condition is represented by the relatively flat upper signal portion of the trace designated by reference numeral 110 and the second condition is represented by the generally flat lower portion of the trace indicated by reference numeral 111. Energy flux attributed to system heat is represented by the solid undulating line designated by reference numeral 112. In the parent patent application, the sensor signal was detrended and analyzed by taking the difference between the steady state conditions represented by upper and lower dash lines 113a, 113b respectively. In the parent patent application, the cycles are relatively slow, so steady state measurements can be made at each of two operating conditions i.e., 113a, 113b. In this invention, the change in the signal between the two operating conditions 113a, 113b, represented by that portion of signal trace indicated by reference numeral 115, is analyzed. This is shown by the calorimetric sensor signal trace 116 shown in FIG. 5B which in the preferred embodiment, takes the form of a sine wave (although the invention is not limited in its broader form to a sinusoidal type wave signal form). Preferably the sinusoidal signal output is generated from calorimetric sensor 50 by cycling, oscillating or "switching" the engine operating conditions between extreme conditions shown by reference numerals 117 and 118 at the "peak" and "trough" of the signal to produce an oscillating signal. Unlike the parent application, in the preferred embodiment of this invention, steady state is never reached at the extreme conditions 117, 118. As will be explained below, a sine wave is produced in the preferred embodiment by controlling or modulating the fuel injector pulse width. Specifically, the pulse width is continuously controlled throughout the entire cycle to produce the preferred sinusoidal output signal but the cycle itself is characterized by the extreme conditions 117, 118 whereat the cycle is reversed. Irrespective of the actual cycle, the change in the signal between the extreme conditions 117, 118 in FIG. 5B or the change in the signal shown by line 115 in FIG. 5A is analyzed. It should be appreciated that to some extent, this invention is based on the recognition of a problem. In this case, the problem of how to distinguish small energy attributed to trace emission concentrations from large system energy fluxes is recognized by focusing on the changing signal. Once this is done, some surprising results occur.

Accordingly, a discussion with respect to what is believed to be occurring during the time immediately after engine 10 switches from one operating condition to the other is necessary to understand how the present invention works.

Generally speaking, chemical energy evolution on the reactor surface, i.e., active region 97, is controlled by reactions occurring on the surface. The thermodynamic energy release is different for different reactions. The rates for each specific reaction will also vary because these rates will depend on a number of factors which include at least:

a) the partial pressure of reactant(s), depending upon mechanism b) the adsorptive and desorptive properties of reactant(s) on the catalyzed surface c) diffusion of gases to the surface d) gas turbulence and mixing in and around the sensor housing e) rates of migration of reactants) across the catalyzed surface f) temperature g) surface coverage for reactant(s)

h) the number of "active sites" for reaction to occur i) the nature of catalyst selectivity and specificity In an effort to conceptually understand the rates of reactions occurring on the catalyzed surface, one may oversimplify and describe the reaction of a reductant (RED) and an oxidant (OX) on the surface invoking a Langmuir-Hinshelwood mechanism. Reaction between RED and OX occurs when RED and OX are adsorbed on neighboring sites. The rate is proportional to the probability that RED and OX are adsorbed on neighboring sites, and this is proportional to the fractions of the surface $\theta_{RED}$ and $\theta_{OX}$ covered by each. The surface coverages of RED and OX will be dependent upon their ability to compete with other gas species in the mixture. Again, oversimplifying to only consider RED and OX, the surface coverages for each are expressed by considering the relative rates of adsorption and desorption for each. The rate of adsorption for RED ($V_{+RED}$) is given by:

$$v_{+RED} = k_{+RED} p_{RED} (1 - \theta_{RED} - \theta_{OX}) \quad (1)$$

where $p_{RED}$ is the partial pressure of RED and $k_{+RED}$ is a rate constant for adsorption. The rate of desorption of RED ($v_{-RED}$) is given by:

$$v_{-RED} = k_{-RED} \theta_{RED} \quad (2)$$

where $k_{-RED}$ is a rate constant for desorption. At equilibrium these rates are equal and therefore:

$$K_{RED} p_{RED} = \theta_{RED} / (1 - \theta_{RED} - \theta_{OX}) \quad (3)$$

where $K_{RED} = k_{+RED}/k_{-RED}$ and likewise $$K_{OX} p_{OX} = \theta_{OX}/(1 - \theta_{RED} - \theta_{OX}) \quad (4)$$

where $K_{OX} = k_{+OX}/k_{-OX}$.

Equations 3 and 4 are simultaneous equations, the solution for which gives the fractions covered by RED and OX according to equations 5 and 6.

$$\theta_{RED} = K_{RED} p_{RED} (1 + K_{RED} p_{RED} + K_{OX} p_{OX}) \quad (5)$$

$$\theta_{OX} = K_{OX} p_{OX} (1 + K_{RED} p_{RED} + K_{OX} p_{OX}) \quad (6)$$

The rate of reaction between RED and OX on the catalyzed surface following the Langmuir-Hinshelwood mechanism is thus $$\text{rate} = k \theta_{RED} \theta_{OX} \quad (7)$$

where k is a rate constant; and substituting equations 5 and 6 into equation 7 gives $$\text{rate} = k K_{RED} p_{RED} K_{OX} (1 + K_{RED} p_{RED} + K_{OX} p_{OX}) \quad (8)$$

The partial pressures of RED and OX change dramatically and dynamically in the exhaust of a combustion engine operated around stoichiometric AFRs, i.e., near $\lambda = 1$ where $\lambda = $ (AFR actual)/(AFR @ stoichiometry).

Furthermore, downstream of a catalytic converter the concentrations of RED and OX can fluctuate from 0 to 10,000 ppm or more in less than a second depending upon the magnitude of change in $\lambda$. Under rich conditions, there is insufficient oxygen to fully combust the fuel and $p_{RED} \gg p_{OX}$. Under lean conditions excess oxygen is present and $p_{RED} \ll p_{OX}$. Thus, upon switching between rich and lean conditions the relative partial pressures of RED and OX alternate and for very brief periods of time upon crossing over conditions nears $\lambda = 1$, the rate for reactions will be accelerated upon approaching $\lambda = 1$ owing to the increasing probability of RED and OX residing on adjacent sites, and will be decelerated upon moving away from $\lambda = 1$ owing to the decreasing probability of RED and OX residing on adjacent sites as is determined from equation 8.

Again, the reactions leading to energy release on the catalyzed surface have been simplified in discussing RED reacting with OX. In reality, a separate rate expression is required for each particular RED-OX reaction and the energy release is dictated by both the rate of the reaction and the thermodynamic heat of reaction for the particular reaction. Furthermore, the competitive adsorption for sites involves many more species than just RED and OX. Hydrocarbon oxidation is more exothermic than CO or $H_2$ oxidations, and even if hydrocarbon oxidation is slower, the net energy release may be greater than the other two reactions. Without attempting to fully model the complex mixture of gases present in the exhaust of a combustion engine at conditions close to $\lambda = 1$, it may be simply stated that the energy release per unit time is proportional to the rate of reaction of RED and OX times the thermodynamic molar energy release. Thus, for a given reaction of RED and OX, the energy release is proportional to rate. Specifically, the calorimetric sensor measures energy released upon reaction and not rates. However, because of the proportional relationship of energy release and rate, the relative expected energy release on a calorimetric sensor in engine exhaust upon switching between a lean condition and a rich condition can be estimated using equation 8. This relationship between energy flux attributed to reactions between gaseous compounds and the rate at which the reactions occur are an important underpinning of the invention.

Figure 6:
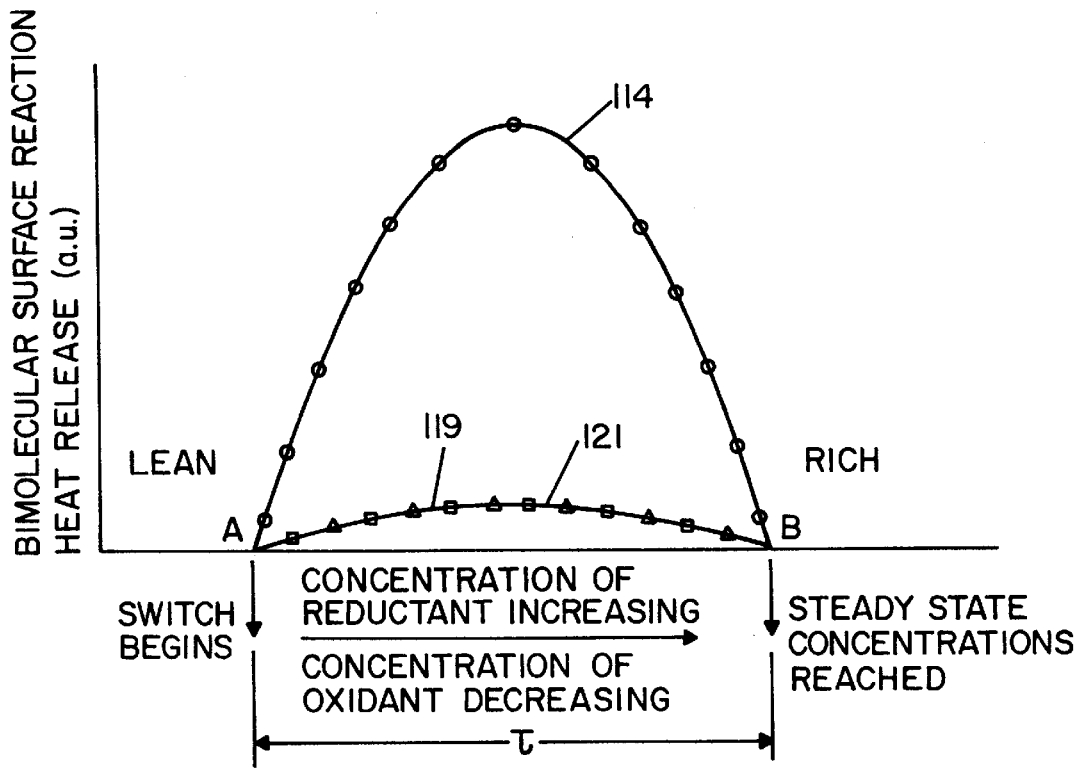
FIG. 6 is a constructed graph showing energy release as a function of oxidant/reductant concentrations.

The mathematical relationship derived above is graphically illustrated in FIG. 6 for the data set forth in Table 1. In FIG. 6, the energy released or flux generated by reaction on surface 80 upon switching between a lean condition as specified in Table 1 and a rich condition as specified in Table 1 is plotted on the y-axis. The time required to fully switch between lean and rich specified conditions is designated as $\tau$ on the x-axis. More particularly, the engine is cycling from a lean condition designated at point A to a rich condition designated at point B and then back from rich condition point B to lean condition point A. At each switch point, a steady state condition has established itself. When the engine switches from a lean condition, point A, to a rich condition, point B, the concentration of reductants is increasing while the concentration of oxidants is decreasing. Similarly, when the engine switches from a rich condition to a lean condition, the concentration of reductants is decreasing while the concentration of oxidants is increasing. Three curves for gas compositions having oxidant/reductant concentrations set forth in Table 1 are plotted. Specifically, a first curve passing through circles designated by reference numeral 114, a second curve passing through triangles is designated by reference numeral 119, and a third curve passing through squares is designated by reference numeral 121.

TABLE 1

| | FIGURE 6 Concentrations in ppm | | | |
|---|---|---|---|---|
| | LEAN | | RICH | |
| PLOT | OX | RED | OX | RED |
| 114 | 2700 | 0 | 0 | 2700 |
| 119 | 2700 | 0 | 0 | 300 |
| 121 | 300 | 0 | 0 | 2700 |

Referring back to equation 8, the values for $K_{RED}$ and $K_{OX}$ are assumed to be equal to 1. It will be noted from Table 1 that the concentrations of OX from the steady state side is 0 and thus $P_{OX}$ equals 0 in equation 8 making the rate 0. Thus no energy release is detected under steady state rich conditions. Similarly, Table 1 shows that the concentration of reductants from the steady state lean side is 0 and thus $P_{RED}$ equals 0 making the rate equal 0 in equation 8. Thus no energy release is detected under steady state lean conditions. However, during the transition from one state to the other, i.e., the transient energy will be released according to the parabolic curves 114, 119, and 121 as shown and the height of the curve is dependent upon the concentrations of OX under lean condition and RED under rich conditions. Relating FIG. 6 to the preferred embodiment of the engine exhaust, the energy release detected by calorimetric sensor 50 will be proportional to the size of the lambda switch. That is to say, a more substantial exotherm will be detected upon switching between lambda equals 0.98 and 1.02 (an amplitude of 0.04) then upon switching between lambda equals 0.995 and 1.005 (an amplitude of 0.01). The time required to go from one steady state condition to the other is finite and dependent upon many parameters. As indicated, this time is designated "τ" in FIG. 6. Those skilled in the art will readily recognize that the reaction rates depicted in FIG. 6 can change very rapidly for the temperatures and gas compounds under discussion. When applied to the vehicular application of the preferred embodiment, τ will be dependent upon the porosity of diffusion membrane 81 and the diffusivity of the gaseous reactant compounds and other gases within the exhaust gas stream. Importantly, so long as the conditions can be reproduced, the value of τ is essentially constant. Because τ is constant, relative measurements can be made. That is, system heat as discussed in FIG. 5 will not adversely affect the measurements occurring between the switch points. This is because the time τ required to switch or cycle between the steady-state points is short. Changes attributed to system energy flux (i.e., radiation, conduction, convection, attributed to gas stream mass, engine and exhaust pipe heat, etc.) will occur at random frequency and not substantially interfere with sensor signals occurring at the forcing function frequency or multiples thereof.

Figure 7:
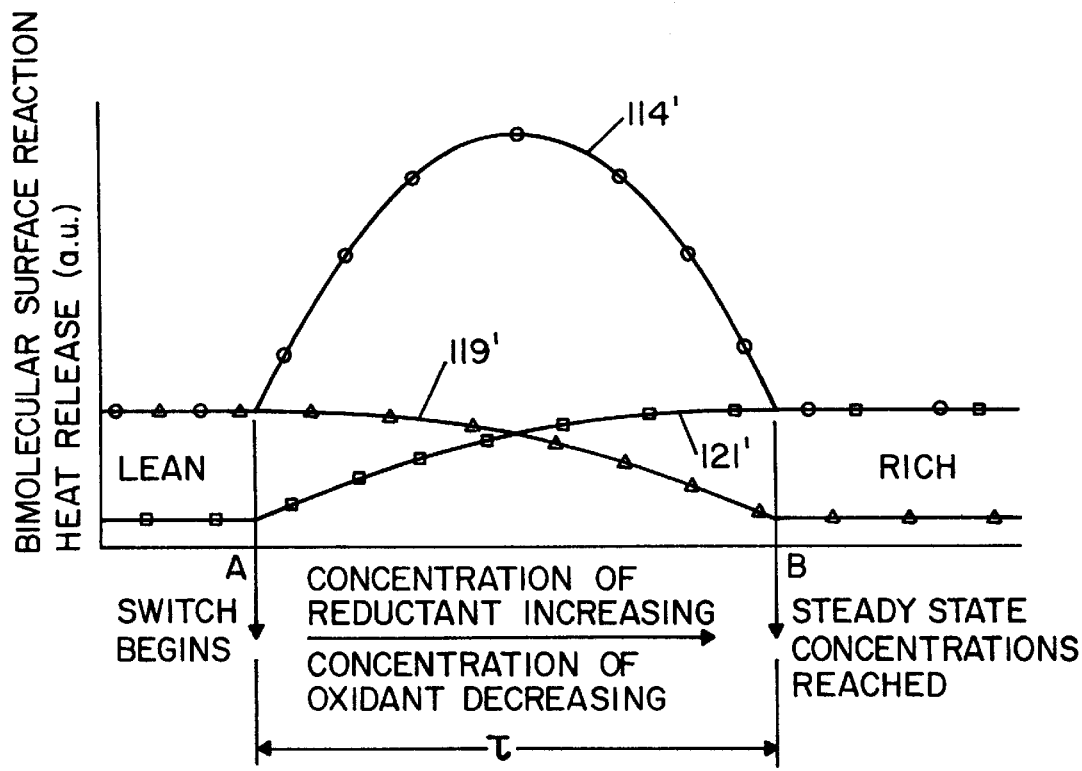
FIG. 7 is a graph similar to FIG. 6 but for different concentrations of oxidants and reductants.

Referring now to FIG. 7 there is shown a graph similar to FIG. 6 except that the concentrations of RED and OX never reach 0. That is the catalyst has aged. The concentrations of the reductants and oxidants at the lean and rich steady state switch points is set forth below in Table 2. Three plots are again shown in FIG. 7. More particularly, a curve passing through circles is designated as plot 114'. A curve passing through triangles is designated as plot 119' and a curve passing through rectangles is designated as plot 121'. It can be seen that the result of the switch between the steady state rich and lean conditions depends again upon the concentration of reactants. When the concentration of RED on the rich side and OX on the lean side are both high, then a "bump" will be realized upon the switch as shown by plot 122. However, when either the concentration of RED on the rich side or OX on the lean side is low, then a "bump" may not result. Instead, a gradual steady change to the other steady state condition is realized as shown by plots 123, 124. With the invention applied in the engine exhaust of the preferred embodiment, this means that a bump may not be realized when switching between lambda=0.998 and 1.02 or between lambda=0.98 and 1.002. Obtaining a maximum during the switch depends upon the concentrations of reductants on the rich and lean sides and oxidants on the rich and lean sides.

TABLE 2

FIGURE 7
Concentrations in ppm

| PLOT | LEAN | | RICH | |
|------|------|-----|------|-----|
|      | OX   | RED | OX   | RED |
| 114' | 3000 | 300 | 300  | 3000 |
| 119' | 3000 | 300 | 300  | 600  |
| 121' | 600  | 300 | 300  | 3000 |

Mechanisms other than Langmuir-Hinshelwood mechanisms are possible as well. In general, reaction rates will be affected by adsorption, desorption, disassociation of molecules on a surface, concentrations of gas phase reactants, competitive processes such as competitive adsorption and inhibition and the nature of the reactive material coating the sensor surfaces. Mechanisms involving reactions of a gas phase molecule with either a surface adsorbed molecule or disassociated molecule on the catalyst surface are not only possible, but likely in the complicated gaseous mixtures of the engine exhaust. In fact, several mechanisms may facilitate the same reaction depending upon how the gases are introduced to the surface.

This invention is not limited to a specific heat reaction mechanism nor is the invention limited to a reaction which follows a specific mechanism or mathematical formula. The mechanistic discussion in this section of the Detailed Description is only intended to provide a conceptual understanding of the signals obtained from calorimetric sensor 50 under specific operating conditions of engine 10. Reference can be had to *Chemical Kinetics,* Second Edition, Keith J. Laidler, McGraw-Hill, New York, for a further discussion of Langmuir-Hinshelwood mechanism as well as other possible mechanisms which can be used in the invention.

In summary of several concepts discussed above, the reaction rates change upon switching from one extreme operating condition to the other. These changes are the result of changes in the exhaust gas composition and surface coverages on the surface reactive coatings. Importantly, upon switching or cycling reproducibly, the change in reaction rates are repeatable. This means that the fact that the rate of reaction is proportional to the energy release can be utilized to analyze the changing sensor signal to obtain information attributed to the differences of emission concentrations present in the exhaust gases which differences are intentionally caused to occur under cyclic engine conditions.

Experiment

Figure 17A:
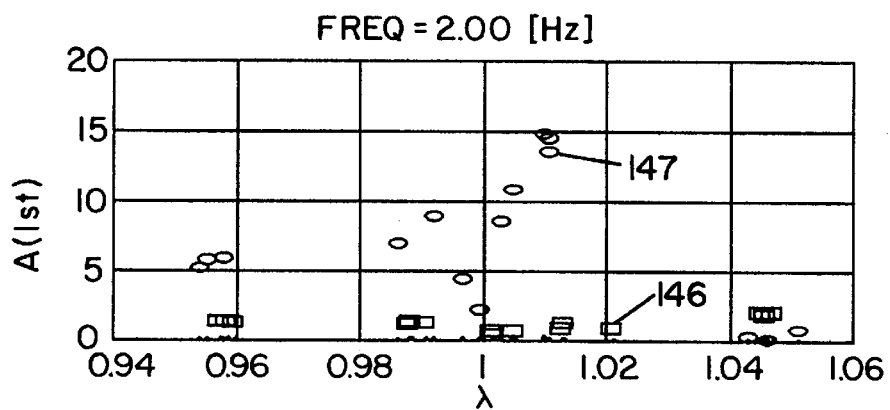
FIG. 17A is a data plot of the amplitude of the first order Fast Fourier Transform of calorimetric sensor signals taken for an aged catalytic converter exposed to exhaust gases when the engine is cycled at various AFRs.
Figure 17B:
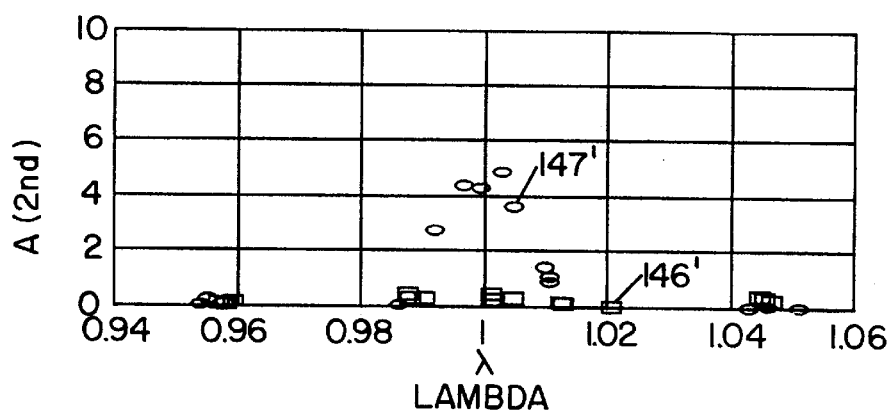
FIG. 17B is a data plot similar to FIG. 17A but showing the amplitude of the second order Fast Fourier Transform of the calorimetric sensor signal.

The theoretical discussion in the preceding section of the detailed description has been verified by models and experiments using calorimetric sensors described herein to collect sensor signals. Because the selected experiments can better graphically depict the inventive concepts, they are discussed herein. The experiments discussed herein do not include engine exhaust measurements. Experiments performed using actual engine exhaust have been carried out and are consistent with the teachings herein. The results from the actual engine exhaust experiments are depicted in FIGS. 17A and 17B and will be discussed later.

In the experiments, a reactor was equipped with a multitude of mass flow controllers for delivering gases which mimic the engine exhaust. A frequency generator was used to provide square wave voltage signal perturbations at desired frequencies (known precisely through the use of an oscilloscope). The voltage signals were used to operate a solid state relay to drive a four-way solenoid valve which controlled gas selection leading to air-to-fuel (AFR) perturbations. Back pressure control valves were used to avoid pressure surges upon gas pulsing which might lead to noise signals. The reactor thus simulated exhaust gases produced by an engine cycled between two (2) AFR ratios with the fuel injectors actuated at a constant pulse width. If the fuel injectors were modulated to simulate various fuel injector pulse widths the results would not change. Calorimetric sensor 50 and a UEGO sensor were positioned in the gas stream to force all flow to pass through the sensor shrouds and used to sample and monitor the test gases respectively. Six (6) tests were conducted at various AFRs as set forth in Table 3 below. In the series of experiments, both the rich side and lean side concentrations of propylene and CO were constants and for each test run, the frequency or AFR perturbation was adjusted to 3 Hz using the oscilloscope. At high voltage output, the frequency generator signal set a relay to activate the four-way solenoid valve to deliver lean gas and at a low voltage, the frequency generator signal set a relay to activate the four-way solenoid valve to deliver rich gas. A timed delay between solenoid actuation and gas detection by both sensors existed and was manually corrected for. The results of the six tests are plotted in FIGS. 8A, 8B, and 8C.

TABLE 3

Frequency 3Hz

| | Set Values | | Detected Values |
|---|---|---|---|
| Test/Curve | λ Rich | λ Lean | λ Bias |
| 1 | 0.995 | 1.000 | 0.9945 |
| 2 | 0.995 | 1.005 | 0.9964 |
| 3 | 0.995 | 1.010 | 0.9984 |
| 4 | 0.995 | 1.015 | 1.0010 |
| 5 | 0.995 | 1.020 | 1.0031 |
| 6 | 0.995 | 1.025 | 1.0056 |

Figure 8A:
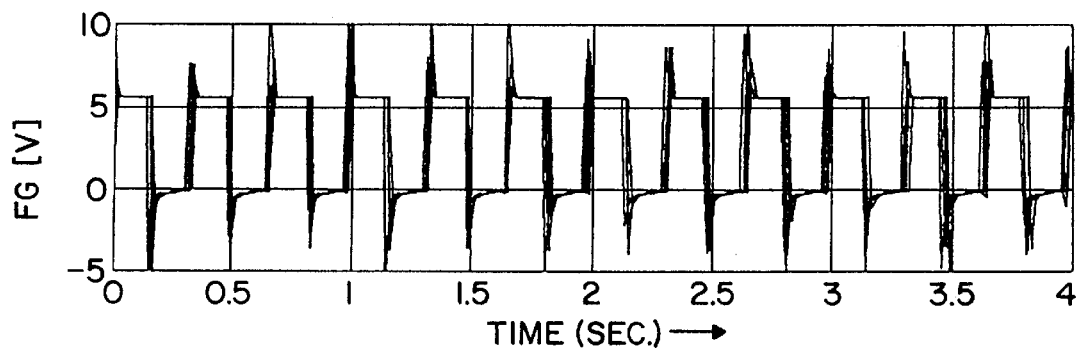
FIG. 8A shows plots of output signal voltages from a frequency generator adjusted to 3 Hz indicative of the induced operating conditions imposed on the engine pursuant to the invention.

In FIG. 8A, the cycling frequency generator signals at 3 Hz for all six tests are shown. Essentially, the frequency generator generated identical cycles for all six tests as shown by essentially the superposition of each test frequency generator signal overlying the other.

Figure 8B:
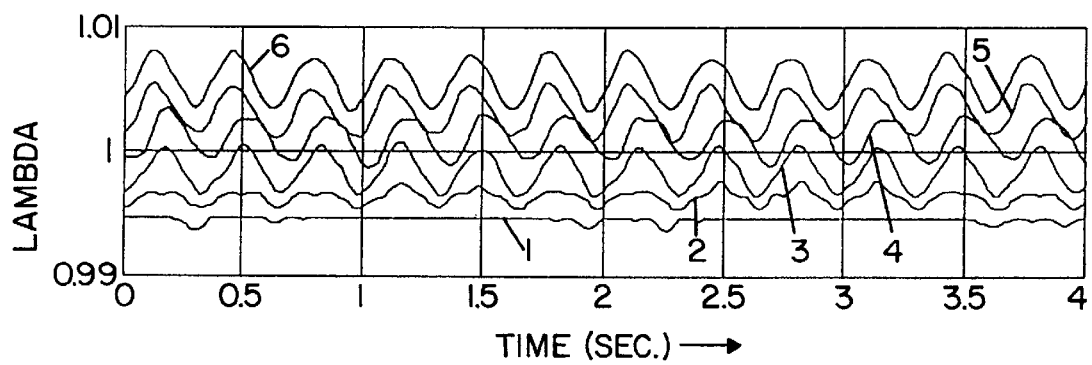
FIG. 8B is a trace of output signals generated by a UEGO sensor indicative of lambda values for the various cycles depicted in FIG. 8A.

In FIG. 8B, the UEGO output signal for all six tests is plotted. This is lambda which, as noted, the UEGO typically detects. At this point, reference should be had to FIG. 9A which resembles the graphs constructed in FIGS. 6 and 7 used to explain the transient energy conditions. In accordance with the theory, experiment one generating the lambda cycle indicated by the curve designated by reference numeral 1 has a rich lambda bias with a small lambda delta and the transient energy reaction would fall between the two reference numerals 1 shown in FIG. 9. In experiment two, the lambda bias is still rich but the lambda delta is increased and the transient energy release when the engine was cycled between these conditions would fall between reference numerals 2—2 in FIG. 9. The transient energy release for the remaining experiments 3, 4, 5, and 6 at the lambda condition set would fall between their respective points shown in FIG. 9. Specific attention should be directed to lines 4—4 at FIG. 9 at which lambda bias and lambda delta the peak of the curve's amplitude is traversed.

Figure 8C:
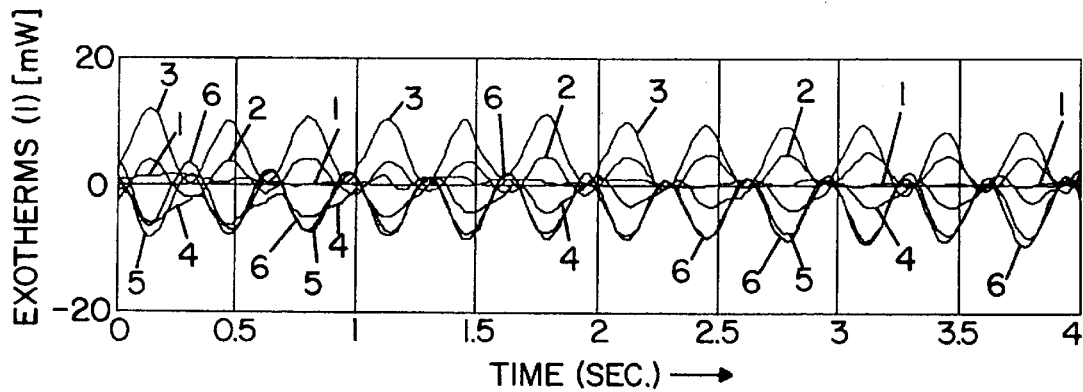
FIG. 8C shows traces of calorimetric sensor signals for the generator cycles shown in FIG. 8A.
Figure 9A:
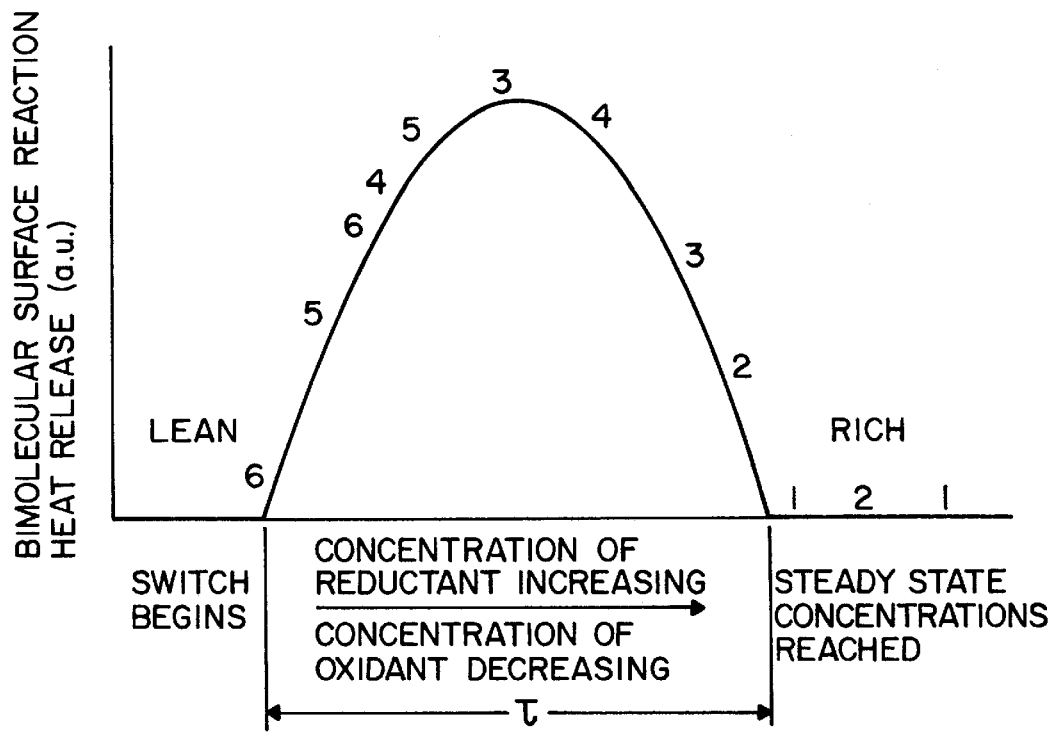
FIG. 9A is a constructed graph similar to that shown for FIGS. 6 and 7 but with the various cycles shown in FIG. 8C designated by numerals on the graph.

The calorimetric sensor signals obtained for experiments 1–6 are plotted in FIG. 8C respectively as curves identified by reference numerals 1–6 respectively. The signals of FIG. 8(c) were band-pass filtered to eliminate noise. Plots 1–6 in FIG. 8C corresponds respectively to plots 1–6 in FIG. 8B and the energy releases shown as exotherms on the y-axis of FIG. 8C should correspond to the reference numerals corresponding to the plot numerals on the theoretical model depicted in FIG. 9A. With respect to FIG. 8C, it is observed that for experiment 1 represented by curve trace 1, very little perturbation is observed either in the UEGO signal of FIG. 8B or the calorimetric sensor signal shown as reference numeral 1 in FIG. 8C. (For the test shown in FIG. 8C, calorimetric sensor 50 had a total combustibles catalyst coating 80 such that the sensor sensed all combustion reactions simultaneously) This is because the AFR perturbation is minimal for experiment No. 1 as can be seen by the lambda delta of Table 3. For experiment No. 2, calorimetric signal plot 2 of medium intensity relative to the most intense signals is observed and calorimetric signal trace 2 is in phase with lambda signal 2 shown in FIG. 8B. For experiment No. 3, calorimetric signal trace 3 is observed characterized by an apparent frequency that matches both the frequency of the square wave generated by the frequency generator shown in FIG. 8A and the lambda signal generated by trace 3 in FIG. 8B. Again, calorimetric signal 3 is in phase with lambda signal 3 generated by the UEGO sensor. Referring to FIG. 9, the expected maximum and minimum points for experiment No. 3 cover a larger portion of the peak height relative to experiment No. 2. That is, the surface reaction heat release plotted on the y-axis of FIG. 9A is less between the points 2—2 (corresponding to experiment No. 2) than that between points 3—3 (corresponding to experiment No. 3). FIG. 8C is consistent with the expected results of the theoretical model plotted for FIG. 9.

Referring still to FIG. 9A, experiment No. 4 indicated by that portion of the curve between reference numerals 4—4, predicts that the peak of the curve, hereinafter the "bump", will be traversed twice in one cycle. A cycle as shown in FIG. 8A is defined as the engine being at one condition, say lean, switching to a rich condition and then from the rich condition back to a lean condition. As shown in FIG. 8A, three cycles occur in each second. For experiment No. 4, the UEGO signal shown in FIG. 8B shows that lambda=1 is also crossed twice per cycle. With respect to the calorimetric sensor signal for experiment No. 4 shown by the plot numbered 4 in FIG. 8C, there is a decreased amplitude relative to experiments 3 and 5 and a more complex sinusoidal wave pattern resulting from the double crossing of the bump in a single cycle. Further, the more intense portion of the double bump or the peak portion of the calorimetric sensor signal for plot 4 is "out of phase" with the UEGO signal plot 4 shown in FIG. 8B. It is out of phase by 180°.

Calorimetric sensor signals shown in FIG. 8C, for experiments 5 and 6, are similar to one another. The lambda signals generated by the UEGO sensor shown by traces 5 and 6 in FIG. 8B shows that a slightly different AFR as present but in both cases the mixture is always lean. It is difficult to discern a difference between sensor signal plots 5 and 6 in FIG. 8C. As will be shown below, lambda can be deduced from the calorimetric sensor signal. The calorimetric sensor signals for experiments 5 and 6 (i.e., traces 5 and 6) are both clearly "out of phase" (180°) with the lambda signals generated by UEGO and also with the frequency generator signals of FIG. 8A. Considering all 6 experiments, when the engine cycles rich, the calorimetric sensor signal is "in phase" and when the engine cycles lean, the signal is "out of phase". Based upon the theory discussed above, this is logical because energy release will be increasing when the AFR is changing towards lambda=1. That is, when the AFR is rich and moving in a lean direction towards lambda=1, the point of maximum probability of adjacent site coverage of reactants should generate an increasing energy release. Similarly, energy release will be decreasing when moving away from lambda=1. That is, when the engine has cycled from a lean condition but at lambda=1 towards a rich, energy flux should be decreasing.

Figure 10A:
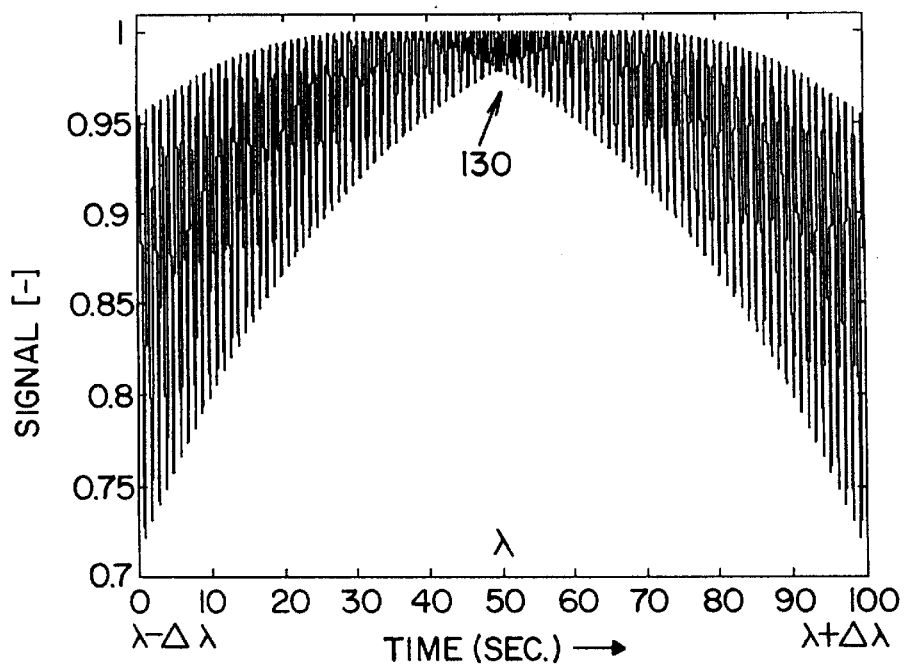
FIG. 10A is a constructed graph showing hypothetical sensor signals generated for a lambda "sweep" over time.
Figure 10B:
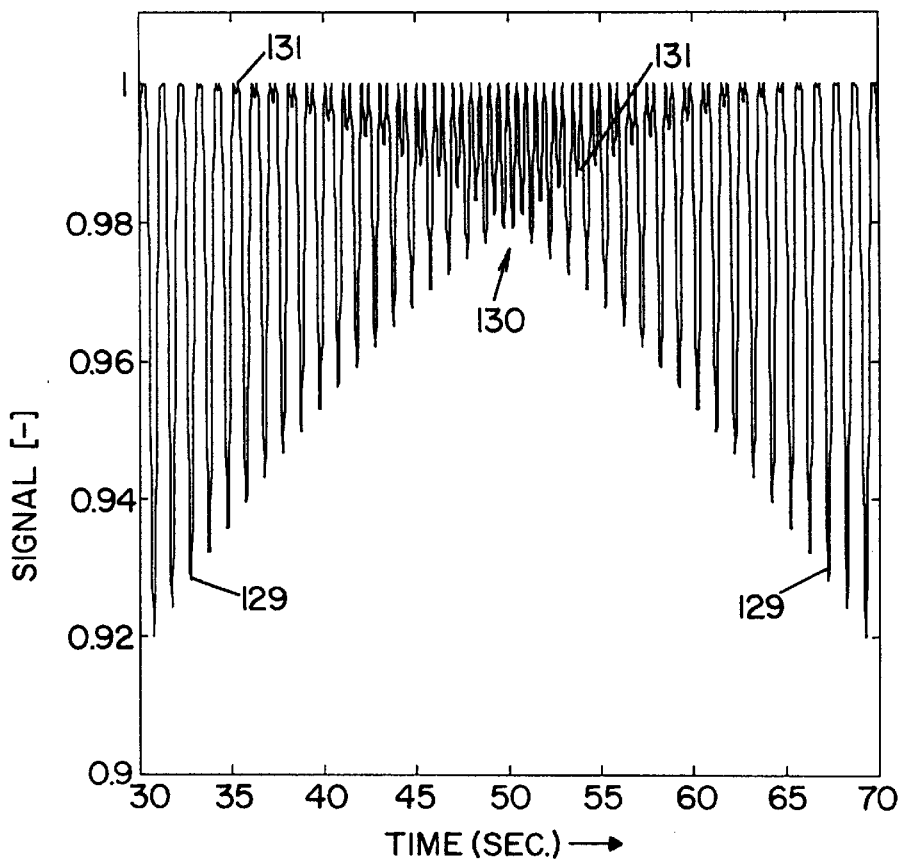
FIG. 10B is an expanded view of a portion of FIG. 10A.

An important point to make based on the experiment discussed in this section is that if the AFR perturbation was centered at lambda=1, the calorimetric sensor signal would have been characterized by a frequency exactly double the frequency signal resulting from the frequency generator. This results from crossing the bump of FIG. 9A twice in one cycle and is plotted in FIGS. 10A and 10B. FIG. 10A is a hypothetically constructed plot of a lambda sweep occurring over 100 seconds and FIG. 10B is simply a blow-up of the plot illustrated in FIG. 10A to better illustrate the double bump crossing. In FIGS. 10A and 10B, time is plotted on the x-axis and the calorimetric sensor signal is plotted on the y-axis. The lines drawn in FIGS. 10A, 10B represent the change in the calorimetric sensor signal during each cycle. Thus, the amplitude of each cycle is indicative of the intensity of the calorimetric sensor signal generated for that cycle. The cycle time for the lambda sweep was set at 1 Hz and the lambda bias is changed from $-1$ ($\lambda-\Delta\lambda$ shown at time=0 on the x-axis) through 0 ($\lambda-0.32\lambda$ shown at time=50 seconds on the x-axis) to $+1$ ($\lambda+\Delta\lambda$ shown at time=100 seconds on the x-axis). Thus, during the time of 100 seconds, there were 100 cycles of varying lambda values in which stoichiometric combustion producing a lambda value of 1 occurred at 50 seconds.

Referring to FIG. 10B the sensor signal for cycles 33 (and 68) designated by reference numeral 129 extending from an amplitude of 1 to an amplitude of about 0.93 and back to 1 appear to be comprised almost completely of a 1 Hz component. Beginning at about cycle 35 (and 65) a second component 131 begins to appear at the portion of first signal 129 near an amplitude of 1. This second component indicates the existence of a second higher frequency component and produces a "shaded" section designated by reference numeral 130 in FIGS. 10A and 10B.

The shaded section starts with a slight transversal of the bump described with reference to FIG. 9A which produces a signal comprised of 1 Hz and 2 Hz components in each cycle. The 2 Hz component grows in intensity as the sweep approaches a λ of 1 and fully replaces the 1 Hz component at lambda=1. Importantly, this frequency relationship resulting when the operating conditions of the engine produce a cycling past stoichiometric affords a basis for the calorimetric sensor to generate a lambda signal in lieu of a UEGO sensor. That lambda signal can be derived through application of known mathematical analysis techniques such as Fast Fourier Transforms. Again, FIGS. 10A and 10B are theoretical traces constructed for the purpose of this disclosure to conceptually demonstrate signal components. Those signal concepts cannot be observed in the electrical calorimetric power signal trace. However, once the signal is digitized and transformed into a frequency domain comprising a spectrum of frequencies, it becomes possible to detect the frequency components conceptually illustrated in FIGS. 10A and 10B.

Figure 9B:
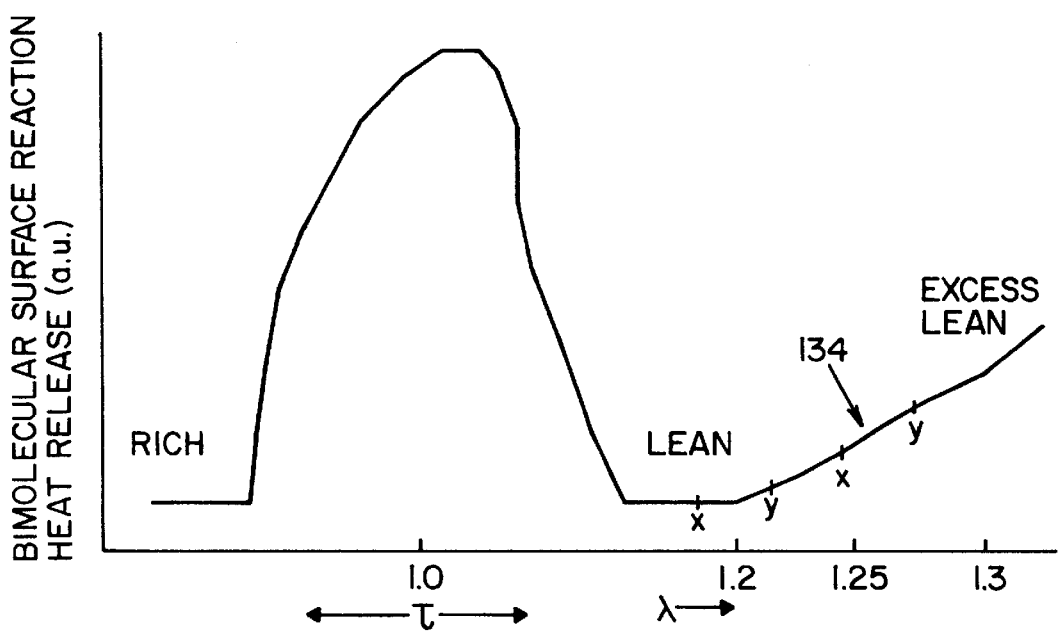
FIG. 9B is a constructed graph similar to FIG. 9A illustrating a heat release variation of that shown in FIG. 9A.

Two additional concepts are shown in FIG. 9B. FIG. 9B, like FIG. 9A, is theoretical and is included to conceptually show the reactions at the active surface region 97 of calorimetric sensor 50. The "bump" shown in FIG. 9A does not have to be symmetrical. In practice, the internal combustion engine is believed to emit emissions as it cycles about a lambda near 1 which produce somewhat equal reactions in the lean direction and the rich direction so that the "bump" is fairly symmetrical as shown in FIG. 9A. However, the "bump" as shown in FIG. 9B could be skewed for any of the reasons discussed above. Additionally, the flat portions of the curves shown as "Rich" and "Lean" did not have changes in reactants. Since there are no changes, there can be no sensor signal based on the changes. At the flat curve conditions, the calorimetric sensor signal does not change and cycling the engine at the flat portions of the curves simply does not produce a changing calorimetric signal which can be analyzed either in a time domain or a frequency domain. However, at very lean conditions and continuing to the point of engine misfire, a bimolecular reaction is observed to occur on the sensor surface and is indicated by reference numeral 134 in FIG. 9B. Cycling the engine at very lean conditions such as between points x—x or points y—y will produce changing energy liberations although a "bump" is not transversed. Because a change can be repeatedly produced, the calorimetric signal can be processed, although certain correlations, possible when the cycling conditions are at or near lambda equals 1, do not exist at lean burn conditions.

In summary of experiments 1 to 6 shown in FIGS. 8A, 8B, and 8C, it is demonstrated that by cycling the engine in a repeatable manner, changing energy fluxes can be detected by calorimetric sensor 50 to yield the following relationships:

A) The phase of the sensor signal relative to the phase of the perturbation cycle can be utilized to determine whether the gas mixture is rich or lean. FIG. 8C clearly shows a phase change of 180° as the cycle is changed from a rich lambda bias to a lean lambda bias.

B) When perturbing the AFR at appropriate frequencies around lambda =1, the signal will contain both first order and second order sinusoidal components. These components can be deciphered (using Fast Fourier Transform signal processing, for example) to determine the ratio of amplitudes of the first to second order sinusoidal components which can then be used to determine the magnitude of bias from lambda =1. This is clearly shown in FIG. 10B when a higher frequency component 131 began to appear from first wave 129 during the lambda sweep and grew to completely account for the signal at lambda =1.

C) When the perturbations are done at known conditions, the amplitude of the sinusoidal signals will be related to the concentration of gaseous components of the gas stream that, with calibration, can produce emission concentrations. More specifically, emission concentration corresponds to the amplitude of the calorimetric sensor signal change and was discussed at some length for steady state conditions in parent application Ser. No. 09/019,085 and reference should be had to the parent application for a discussion thereof. It must be noted though that the cycling necessary to produce an emission concentration signal in accordance with this invention does not have to encompass steady state. In fact, the cycle frequency in accordance with this invention is preferably set at a sufficiently high frequency so that steady state conditions do not occur. Again, it must be noted that the change in energy flux is being measured. The limits of the cycle are not especially critical so long as the change in the signal can be recorded in a repeatable manner which change can then be correlated to the emissions content.

Figure 5B:
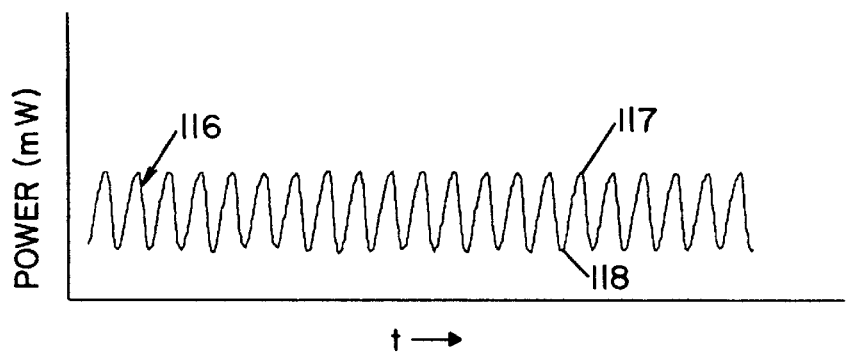
FIG. 5B is a second trace of a preferred output signal of the calorimetric sensor of FIG. 2.

The experiments discussed above used a square wave generator as shown in FIG. 8A. In the preferred embodiment of the internal combustion engine application of the invention, and as is well known to those skilled in the art, ECM 34 controls the timing of and the duration (or pulse width) at which fuel from injector 25 is injected into combustion chamber 15. The width of the pulse sets the AFR and the AFR determines the concentrations of emissions present in the exhaust gas. Each combustion chamber produces a discrete volume of exhaust gas during a cycle. In theory, the pulse width for all cylinders could be instantaneously changed resulting in the sensor being exposed to an entirely different gaseous mixture. For signal processing considerations, it is desired that the gaseous composition change consistently from one extreme condition to the other extreme condition and in practice, ECM 34modulates the fuel pulse widths for this occur. That is, as the engine changes from one AFR at one extreme condition to a second AFR at the other extreme condition, the pulse widths of the various cylinders sequentially or modulate in change so that the sensor sees a change in exhaust gas composition and preferably the change produces a sinusoidal signal output as shown in FIG. 5B. However, the invention will function no matter what fuel pulse width or switching pattern is used and whether the changing signal takes the form of a pure sinusoidal wave or some other form such as square, triangular, saw tooth, asymmetrical, polynomial or higher order etc wave form.

The Model

In order to better explain the concepts discussed above and provide a method for analyzing calorimetric sensor signals, a mathematical model is developed. The mathematical model is particularly useful for determining lambda As explained above, when the cycling conditions are chosen such that AFR perturbations pass through a lambda of 1 (e.g., experiment No. 4), the calorimetric sensor signal, in the time domain, is a composite comprising at least two components. Accordingly, the use of a Fourier transform, (specifically the Fast Fourier transfer) will decompose a separate the sensor signal into sinusoids of different frequencies which can be summed to produce the original composite and complex signal. More specifically, the calorimetric sensor signal, thus far discussed in the time domain is processed by being transformed through the Fast Fourier Transform into a frequency domain to identify or distinguish the different frequency sinusoidals and their respective amplitudes which make up the original signal. Specifically, the ratio of the transformed waveforms of the first order signal relative to the second order signal (discussed above with respect to FIG. 10A and 10B) provides a basis for determining the AFR at which the engine is operating at.

The Fast Fourier Transforms (FFT) were computed by software using a programming language know as MATLAB developed by The Math Works, Inc. Specifically, the Signal Processing Toolbox (version 4.0) software provided by the Math Works was utilized to not only perform the FFT calculations but also to filter the signal by "band-pass" and/or "band-width-passing" the signal. A description of the software and related text used in performing the computation is described in *Matlab Signal Processing toolbox User'Guide*, Copyright by Mathworks (December 1996), The Mathworks, Inc. 24 Prime Parkway, Natlick, Mass. 01760-1500 incorporated by reference herein. Reference can also be had to *Digital Filters and Signal Processing* (Third Edition) by L. B. Johnson, Kluwer Academic Publishers, Boston, 1989 to *Discrete-Time Signal Processing* by A. Oppenheimer and R. Schafer, Prentice-Hall, N.J., 1989 and other conventional works for a description of similar techniques, i.e., band-pass filtering as well as FFT.

In the preferred embodiment, A Fourier transform, specifically a discrete Fourier transform using an algorithm developed by Turkey and Coolely in 1965, conventionally referred to as a Fast Fourier Transform is used to analyze the signal. The computation as well as the signal filtering is digitally performed by ECM 34 or alternatively in an ASIC (Application Specific Integrated Circuit) incorporated within ECM 34 or located externally of ECM 34. Those skilled in the art will recognize that other mathematical techniques for analyzing the signal can by employed. For example, Laplace transforms or Z transforms based on algebra can be used. While specific advantages are obtained in using FFT calculations, the invention is not limited in its broader sense to any specific mathematical technique to analyze the signal. Any technique capable of resolving the sensor signal into component parts in order to distinguish its components can be utilized. At the same time the invention is well suited to processing, as a Fourier Transform in a frequency domain having a spectrum of frequency components. Certain frequency components can be correlated to the driving function frequency (lambda cycling in the preferred embodiment) to produce meaningful signals.

Reference can now be had to hypothetical FIGS. 11A, 11B, 11C and 11D which shows several, assumed transformation functions that describe the expected calorimetric sensor signal output based upon lambda. In the transformation functions graph of FIGS. 11A–D, the x-axis is plotted as "delta from lambda=1". Thus, at the 0 point plotted on the x-axis, there is no change in lambda and at that position, lambda=1. At the point designated −1 on the x-axis, lambda has been reduced by a delta amount, $\Delta$, so that at the −1x position $\lambda=1-\Delta\lambda$. Similarly at the +1x position, $\lambda=1+\Delta\lambda$. Thus the amplitude of the FFT signal derived from the calorimetric signal is plotted (on the y-axis in arbitrary units) for a range or sweep of lambda values from stoichiometric. In fact, delta lambda for the FIG. 11 graphs includes only those cycles that pass over the bump or peak portion of the hypothetical curve discussed with reference of FIG. 9. Thus, the transformation functions plotted in FIGS. 11A–11D do not cover experiments 1 and 2 discussed with reference to FIGS. 8 and 9. Also, the transformation function graphs of FIGS. 11A–D were plotted at steady state (non-cycling) conditions. That is, the frequency at which the AFR was cycled is calculated as approaching infinity, $v\rightarrow\infty$. Thus, a single line (and not a spectrum of frequencies at each lambda value) is drawn. In application, the plotted transformation function will mimic the bimolecular activity of the catalyst coating 80 applied to active region 97 of the calorimetric sensor. Accordingly and as a general concept, by studying the particular chemical transformation and by making an appropriate selection of active region size and coating, the transformation functions can be controlled or optimized to produce signals which can be meaningfully interpolated. Four different transformation functions have been used to plot FIGS. 11A–D. This is done not so much for the purpose of illustrating how the FFT signals will change as a function of bimolecular activity, but to illustrate that no matter what the specific reactivity of the active region 97, lambda can be ascertained so long as the cycle passes through stoichiometric conditions.

Figure 11A:
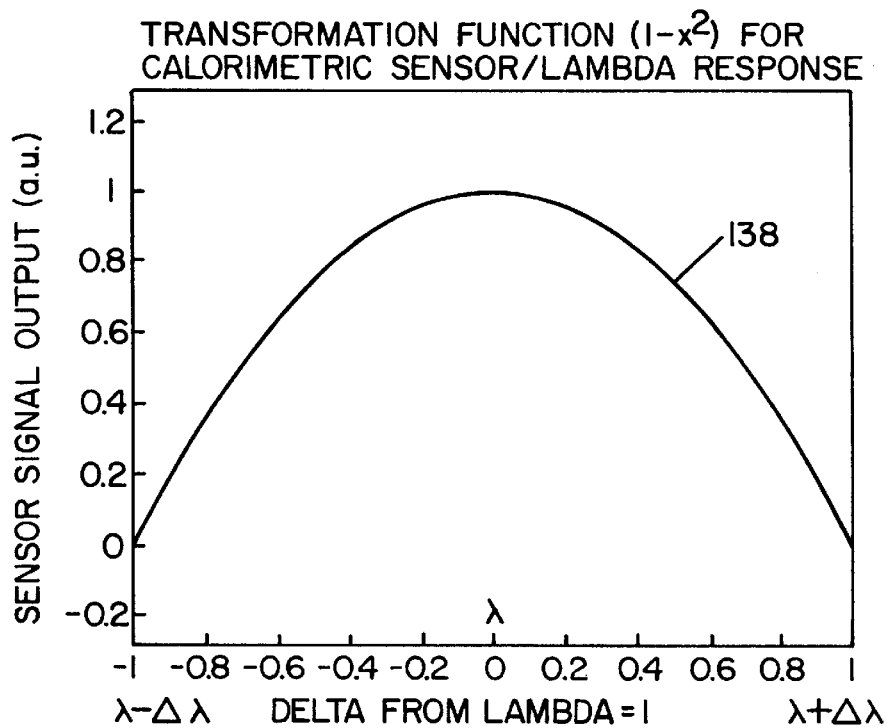
FIGS. 11A, 11B, 11C and 11D are constructed plots of various transformation functions showing the hypothetical absolute energy release (for an exothermic reaction between an oxidant and reductant) on the catalyzed surface of the sensor as a function of lambda near lambda=1.
Figure 11B:
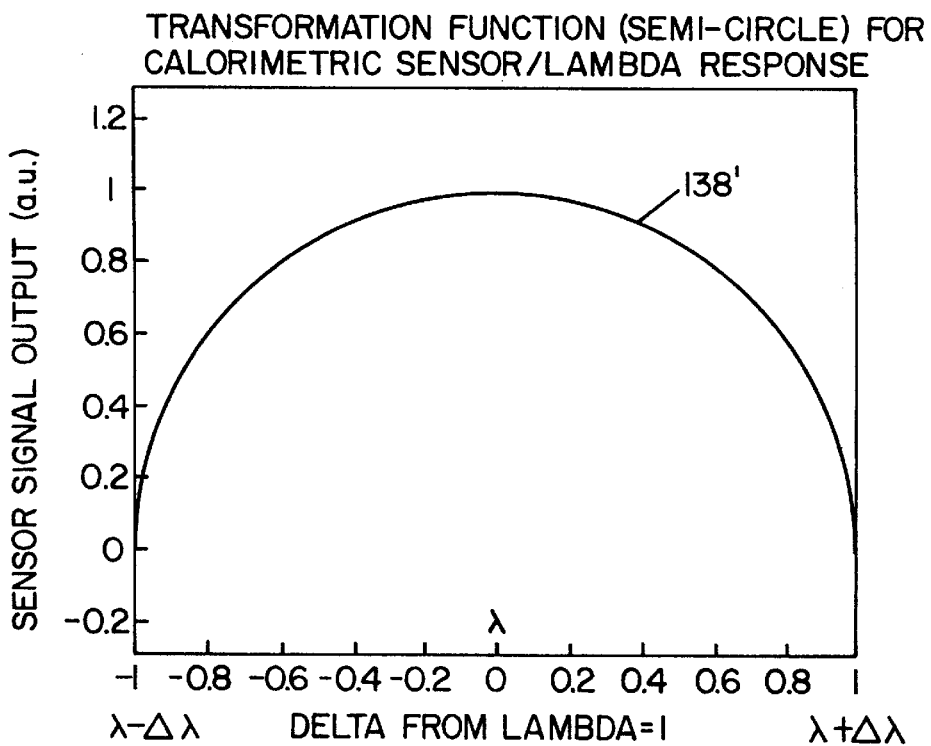
Figure 11C:
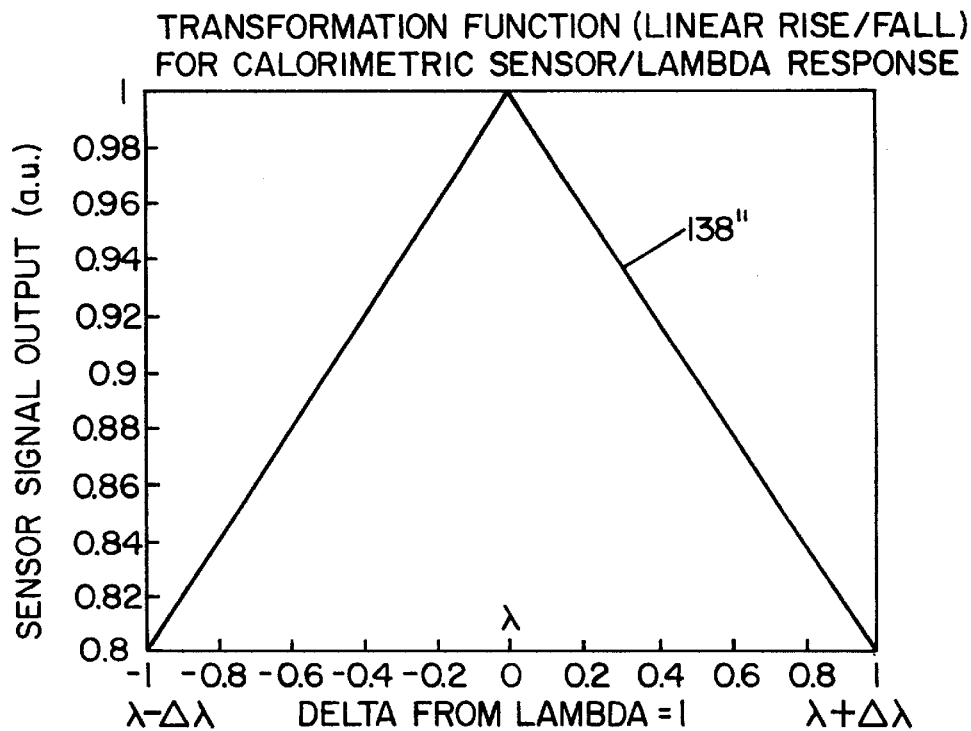
Figure 11D:
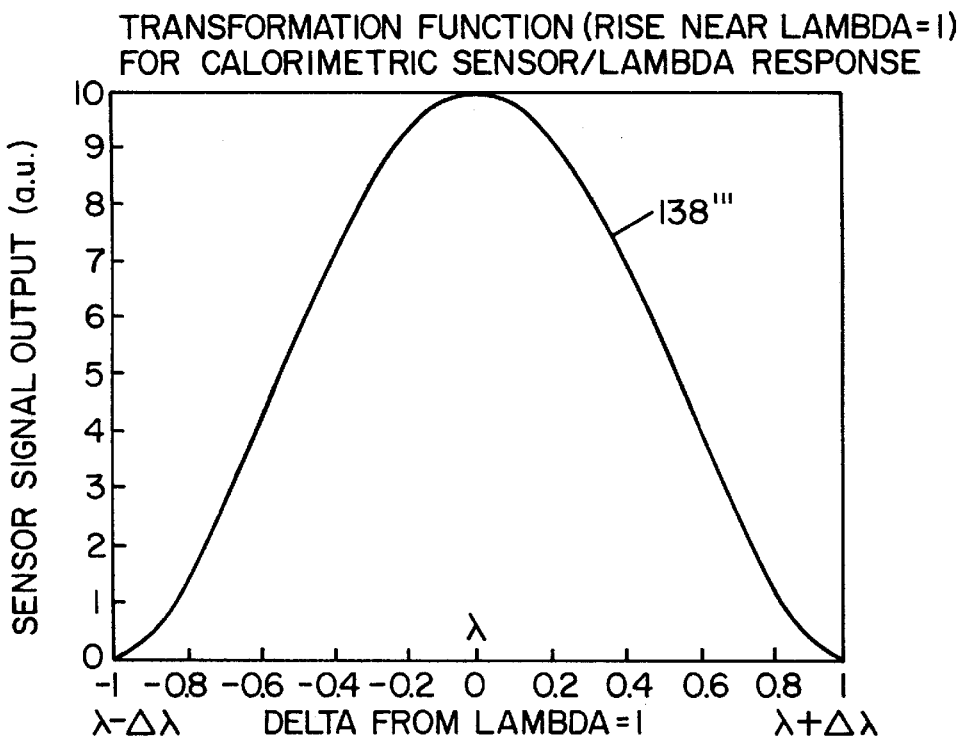

In FIG. 11A, the transformation curve 138 is based on a transformation function expressed as $1-x^2$ and mimics the theoretical "bump" of FIG. 9A. In FIG. 11B, the transformation curve 138' is simply taken as a semi-circular function. In FIG. 11C, the transformation curve 138" is assumed to take the form of a linear rise and fall and is believed to be similar to that which would result in several industrial applications of the invention. In FIG. 11D, the transformation curve 138''' takes the form of a sinusoidal curve and is similar to that which has been observed when controlling the AFR of the preferred embodiment. Again, all four curves shown in FIGS. 11A–D are theoretical models based on expected reactions occurring on the reactive region of calorimetric sensor 50.

Referring now to the hypothetical graphs shown in FIGS. 12A1 through 12D4, FIGS. 12A1 through 12A4 are plots of the actual calorimetric sensor signal (before transformation) for a lambda sweep over a 500 second time period at a perturbation rate of 1 Hz and an amplitude of lambda perturbation at an arbitrary fixed value. More particularly, each second lambda cycles a fixed lambda perturbation amplitude at a lambda bias and the lambda minus delta lambda or $1-\Delta\lambda$) to a lean condition (i.e., lambda plus delta lambda or $1\Delta\lambda$) over a 500 second time increment which equates to 500 cycles. FIGS. 12A1 corresponds to FIG. 11A. In fact, if one were to draw constant amplitude sinusoidal curves (cycles) with amplitude midpoints centered on curve 138, a plot similar to FIG. 12A1 would be produced. Similarly FIG. 12A2 corresponds to FIG. 11B. FIG. 12A3 corresponds to FIG. 11C and FIGS. 12A4 corresponds to FIG. 11D. Thus the calorimetric signal plots for FIGS. 12A1–12A4 are based on the transformation models discussed in FIGS. 11A–D which in turn assume certain bimolecular activity patterns resulting from the chemical transformation of the emissions in the exhaust stream detected by calorimetric sensor 50.

FIG. 12B1 is a plot of the first and second order Fast Fourier Transform signal amplitudes shown in FIG. 12A1 for the lambda sweep depicted. The first order amplitudes are plotted as line 132 passing through circles and the second order amplitudes are plotted as line 133 passing through squares. Similarly first order amplitudes for FFT signals are plotted as line 132' passing through circles and second order amplitudes for FFT are plotted as line 133' passing through squares in FIG 12B2 for the lambda sweep depicted in FIG 12A2. In like manner 1st order FFT amplitudes 133'',132''' and 2nd order FFT amplitudes 133'', 133''' are shown for the lambda sweeps depicted in FIGS 12A3 and 12A4, respectively. As expected, the first and second FFT amplitude curves are different transformations models. However, each first order FFT amplitude curve, 132, 132', 132'' and 132''' has zero amplitude at cycle 250 which is the cycle or the time in the lambda sweep where lambda bias is 1. FIGS 12B1 through 12B4 thus show that the system of the invention can detect lambda provided the cycle pass through stoichiometric. The relationship is independent of modeling.

This point is made clear in FIGS 12C1 through 12C4. In FIG. 12C1 there is shown a trace 135 which if simply the ratio of the first order FFT amplitude trace 132 to the second order FFT amplitude trace 133. The ratio of the amplitudes is clearly zero when lambda bias is 1. Similarly, ratio traces 135',135'' and 135''' for FIGS. 12C2, 12C3 and 12C4, respectively, show zero ratio amplitude when lambda is 1 and a definitive correlation for determining lambda bias at values other then 1.

Referring now to FIG 12D1 there is shown a plot of the phase angle designated by reference number 136 for the first order FFT transform of the sensor signal shown in FIG 12A1. Consistent with the results discussed above for experiments 1–6, when the AFR is rich, the sensor signal is at one phase angle. When the AFR is lean, the sensor signal is shifted out of phase by 180°. Identical phase angle plots are shown by reference numerals 136', 136'' and 136''' for FIGS. 12D2, 12D3 and 12D4, respectively. Cumulatively, FIGS. 12D1–12D4 show the system inherently detects whether the engine is running rich or lean and is independent of model transformation parameters provided that the cycle between the extreme operating conditions passes through stoichiometric.

Figure 15A:
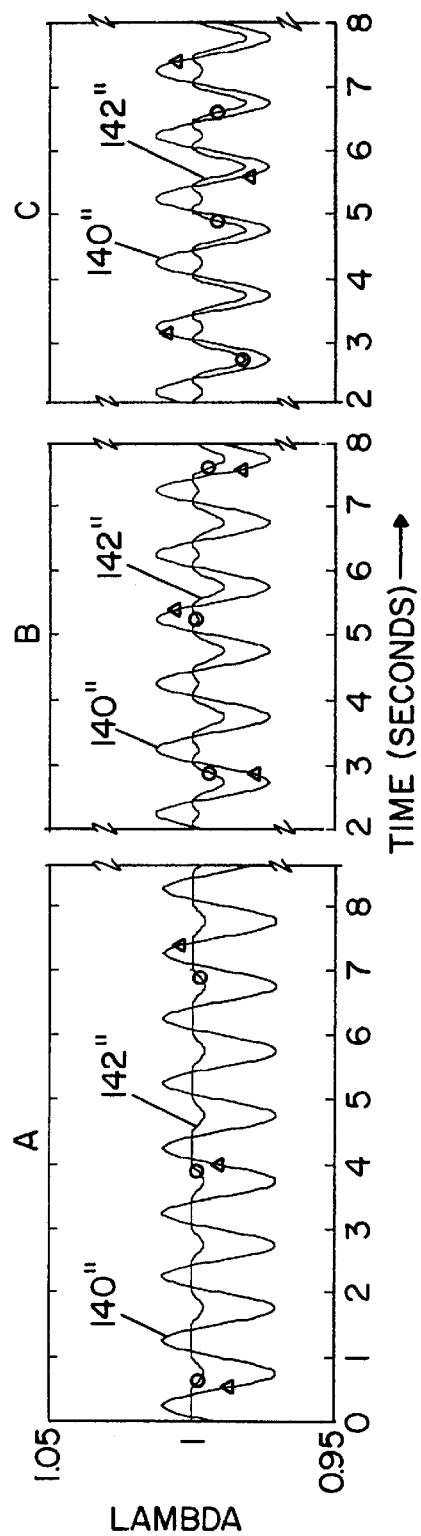

FIGS. 13A, 14A and 15A are hypothetical constructions of plots of lambda and corresponding calorimetric signals. These figures illustrate how the invention can be used to evaluate engine emissions. Each graph in FIGS. 13, 14 and 15 is divided into segments A, B and C, indicating progressive aging of the catalytic converter. In each of FIGS. 13, 14 and 15, the amplitude of lambda was set at 0.4 lambda and the frequency of lambda or the AFR perturbations was set at 1 Hz. Table 4 below establishes the relationship between the graphs plotted in FIGS. 13, 14 and 15.

Figure 15B:
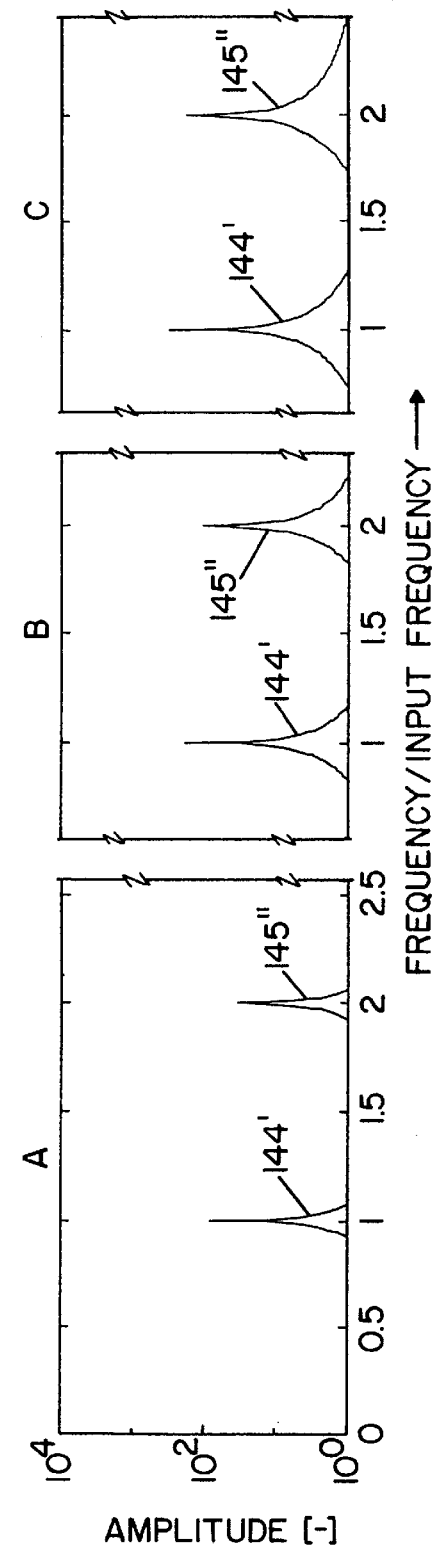

FIGS. 13B, 14B and 15B are plots of frequency component amplitude versus frequency component generated from Fast Fourier Transform analysis of the calorimetric signals of FIGS. 13A, 14A and 15A respectively.

TABLE 4

| λ bias | New Fig. Section "A" | Aged Fig. Section "B" | Severely Aged Fig. Section "C" |
|---|---|---|---|
| Centered @λ = 1 | FIG. 13 | FIG. 13 | FIG. 13 |
| Slight Rich | FIG. 14 | FIG. 14 | FIG. 14 |
| Slight Lean | FIG. 15 | FIG. 15 | FIG. 15 |

Specifically, each graph in FIGS. 13A, 13B, 14A, 14B, 15A, and 15B is broken into three sections, namely, "A" wherein the catalyst is new, "B" wherein the catalyst is aged (identically aged for FIGS 13–15) and "C" representing the catalyst severally aged to threshold failure (identically aged for FIGS. 13–15). The calorimetric signals shown in FIGS. 13A, 14A, 15A are signature signals indicative of catalyst performance and can be directly used to correlate to catalytic converter efficiency or cross-referenced to calibrated data to provide a reading indicative of the concentration of specific gaseous emissions. Reference should be had to parent applications Ser. No. 09/019,085 for a discussion of the conditions which affect the sensor signals and which have to be accounted for in use of a system employing calorimetric sensor 50. Insofar as FIGS. 13–15 are concerned, the lambda perturbation frequency and the lambda perturbation amplitude define consistent compositions of exhaust gases produced by engine 10. Temperature and space velocity of the exhaust gases is determined by vehicle sensors, available to ECM 34, and set. For example, space velocity in the exhaust gas can be correlated to mass air flow or manifold pressure detected by air flow sensor 47.

Reference can now be had to FIG. 13A whereat, from Table 4, the engine is cycled at stoichiometric, i.e., lambda equals 1. Again, all plots indicated in FIGS. 13–15 are hypothetical. FIGS. 13A, 14A and 15A are time plots (x axis) of lambda values and unprocessed calorimetric sensor signals. With reference to FIG. 13A, the lambda signal is indicated by the trace passing through triangles designated by reference numeral 140 and the calorimetric sensor signal is designated by the trace 142 passing through circles. By reviewing sections A, B & C of FIG. 13A, it is clearly apparent that the calorimetric sensor signal increases as the catalytic converter ages. Thus, the amplitude of the signal provides a correlation to catalytic converter efficiency. It is noted that for all three sections, A, B and C, the frequency of calorimetric signal 142 is consistently twice that of the frequency of lambda signal 140, i.e., two undulations for every calorimetric sensor signal versus one undulation for each lambda cycle. This relationship remains constant in all three aging sections of FIG. 13A. As noted, FIG. 13A occurs with lambda centered at one and from the discussion above, with respect to FIG. 9A, the signal transverses the bump twice and two signals appear as shown in FIG. 10B. Note that the cycle is fixed at a lambda delta of 0.4 so that the engine is sinusoidally cycling between lambdas of 1.02 and 0.98. FIG. 13B is a plot of the amplitude of the frequency components of the calorimetric sensor signal of FIG. 13A as a function of the ratio of the frequency components of the calorimetric signal 142 to the frequency of lambda signal 140, i.e., the perturbation of input frequency. The respective plots for the various aged catalysts are indicated by reference number 145. The amplitude of plot 145 or the area under plot 145 (the integral row) can be used to evaluate the catalytic converter.

Referring now to FIG. 14A, the engine is set to operate slightly lean as can be readily discerned from the lambda signal shown as the trace passing through triangles designated by reference number 140'. The uncorrected calorimetric sensor signal is shown as the trace passing through circles designated by reference numeral 142'. Recall that the "bump" in the theoretical discussion of FIG. 9A was traversed, at slightly lean conditions, but not equally. Accordingly, the calorimetric sensor signal 142' does not produce the two equal undulations of calorimetric sensor signal 142 shown in FIG. 13A. In the aged reactions B and C of FIG. 14A, the undulations making up the "composite" calorimetric sensor signal increase and the second undulation becomes more pronounced. Consistent with the discussion of FIGS. 12D1–12D4, calorimetric sensor signal 142' is 180° out of phase with lambda signal 140'. Consistent with the discussion of FIG. 13A, as the catalyst ages, the amplitude of calorimetric sensor signal 142' increases. Accordingly, the uncorrected calorimetric sensor signal gives an indication of catalyst aging and whether or not the engine is rich or lean.

The Fourier Transform will decipher the first and second order components which comprise the "composite" calorimetric sensor signal 142' resulting from lean engine conditions. This is shown by the first order component indicated by the plot designated by reference number 144 and the second order component indicated by the plot designated by reference number 145'. The amplitude of both first and second order plots 144, 145' increase as the catalyst ages and can be used, individually or collectively, to determine catalytic converter threshold failure. However, the ratio of the amplitude of first and second order plots (or the areas bounded by the plots) remains constant as the catalyst ages. This relationship establishes the mechanism for determining lambda bias from the calorimetric sensor signal. Specifically, by comparing the first order FFT 144 of the calorimetric sensor signal with the second order FFT 145 of the calorimetric sensor signal, lambda bias can be ascertained.

The relationship discussed with respect to FIGS. 14A and 14B likewise applies when the cycling condition establishes a rich condition as shown by the graph plots indicated in 15A and 15B.

As readily apparent in FIGS. 15A, lambda curve 140" is cycling the engine at the same rich condition as the catalytic converter ages. The calorimetric sensor signal 142" is the "composite" signal with two undulations for each lambda cycle. As was observed for the lean signal, the undulations increase as the catalyst ages and the second undulation becomes more apparent in the aged sections "B" and "C" of FIG 15A. Consistent with the description of the invention for FIGS. 12D1–12D4, calorimetric sensor signal 142" is in phase with lambda 140". Also, the amplitude of both undulations of the uncorrected calorimetric sensor signal 142" increases as the catalyst ages.

The first order and second order FFT's 144', 145", respectively, of rich calorimetric sensor signal 142" shown in FIG 15B, are similar to first and second order FFTs 144, 145' of lean calorimetric sensor signal 142' shown in FIG. 14B. The difference in amplitude (or areas bounded by the plots) is directly correlated to lambda bias. Thus, FIGS. 13B, 14B, 15B show that by analyzing the calorimetric sensor signal through its frequency components, a relationship between first and second order components (given the forcing function or frequency input, i.e., lambda in the examples at consistent vehicle operating conditions) will establish lambda bias by a sensor directly sensing emission concentrations and not oxygen.

FIGS. 17A and 17B are plots of actual test data which verify the constructed graphs of FIGS. 13A, B, 14A, B and 15A, B. The tests were conducted on a Ford 2.0L ZETEC engine (4 cylinder) equipped with an Engelhard HEX-1107catalyst unaged and aged at 1200° C. (i.e., thermally aged to threshold failure). The engine was operated at 1500 rpm with manifold air pressure (MAP) at 40KPa (i.e., consistent operating conditions)using 34 ppm CARB Phase II fuel. The feed gas was set so that lambda was cycled at a perturbation frequency of 2.0 Hz with an amplitude of ±0.02 lambda. Data was obtained with the engine operating at various rich, lean and stoichiometric conditions as shown by the lambda values (about which the engine was cycled) plotted on the x-axis of FIGS. 17A and 17B. Calorimetric sensor 50 was coated with a total combustibles catalyst 80 over active area 97. In FIG. 17A, the amplitude of first order frequency component of the Fourier Transform is plotted on the y-axis. Unaged catalytic converter data i plotted in FIG. 17A as rectangles 146 and aged catalyst converter data is plotted as ellipses 147. In FIG 17B, the amplitude of the second order FFT is likewise plotted as rectangle 146' for unaged catalytic converters and ellipses 147' for aged catalytic converters. A definite increase in amplitude for both first and second order FFTs of the calorimetric sensor signal occurred as the catalytic converter aged. Further, the actual data obtained showed the correlation to determine lambda bias and lambda phase as predicted in FIGS 13A, B, 14A, B and 15A, B.

It is particularly important to note that the second order FFT data for aged catalysts 147' clearly shows that a maximum second order FFT amplitude is obtained when the engine cycles at conditions which produce maximum combustion, i.e., stoichiometric conditions. Maximum combustion occurs when the "bump" of FIG. 9A is equally traversed. The second order FFT sensor signal provides a fingerprint signature indicative of maximum combustion which can be easily obtained through a lambda sweep. If calorimetric sensor 50 is positioned downstream of the catalytic converter, and once the catalytic converter began to age, a limited lambda sweep will clearly establish a maximum signal, the maximum second order FFT signal, which can be used for fuel trim or fuel control. If calorimetric sensor 50 is placed upstream of the catalytic converter, the second order FFT signal can be used at all times for fuel control. While the ratio of first and second order FFT signals will generate a specific lambda signal, the second order FFT signal can be conveniently used to cause the engine to operate at stoichiometry.

System Applications

Referring again to FIG. 18, the calorimetric sensor signal is the analog power signal for compensation heater 102 which is tapped as shown from driver 128 and sent to a power block 181 in a board designated as signal conditioner board 180. As shown by sensor signal graph 182, the power signal resembles that depicted in FIGS. 14A and 15A. The analog signal is then band passed filtered at filter block 184. Note that because the engine is modulating between two extreme conditions at a fixed frequency, filter 184 can be easily set to band widths corresponding to the cycling frequency to reduce noise. The calorimetric sensor signal shown as filtered signal graph 185, is the calorimetric sensor signal depicted in FIGS. 13A, 14A and 15A. The filtered analog signal is digitized in an analog to digital converter 186 whereat the signal is converted to a data string signal. The data signal is sent to a digital signal processor, DSP 188. Also, inputted to DSP 188 is the forcing function (the frequency generator signal) shown as frequency input signal block 189, which in the preferred embodiment under discussion, is the AFR perturbation frequency and more specifically is the fuel injector pulse width by which the AFR settings are achieve. As discussed earlier, ECM 34 modulates the width of each fuel injector pulse (thus modulating lambda for each fuel injector) between the lambda limits or extreme limits of the cycle. DSP 188 performs a Fast Fourier Transform (as well as other calculations) using the digitized calorimetric sensor signal and the frequency input signal to produce the frequency spectrum graph shown as reference number 190. Certain frequencies from that graph divided by the input frequency produce the graphs plotted in FIGS. 13B, 14B and 15B. The signal conditioner band 180 then extrapolates data from FFT graph 190 and performs calculations in data block 192. As discussed, the data generated in data block 192 is lambda bias determined from the rations of the amplitudes of the first and second order frequency components; the phase angle of the first order frequency component (relative to the input frequency) to determine whether the AFR is rich or lean, and the signal amplitude which can be either the amplitude of the first order frequency component, the second order frequency component or the digitized calorimetric sensor signal or any combination/average thereof to determine catalytic converter efficiency or actual emission concentrations. The calorimetric sensor signal is then outputted from data block 192 for use in engine control block 194 to determine lambda and diagnose the catalytic converter.

Figure 19:
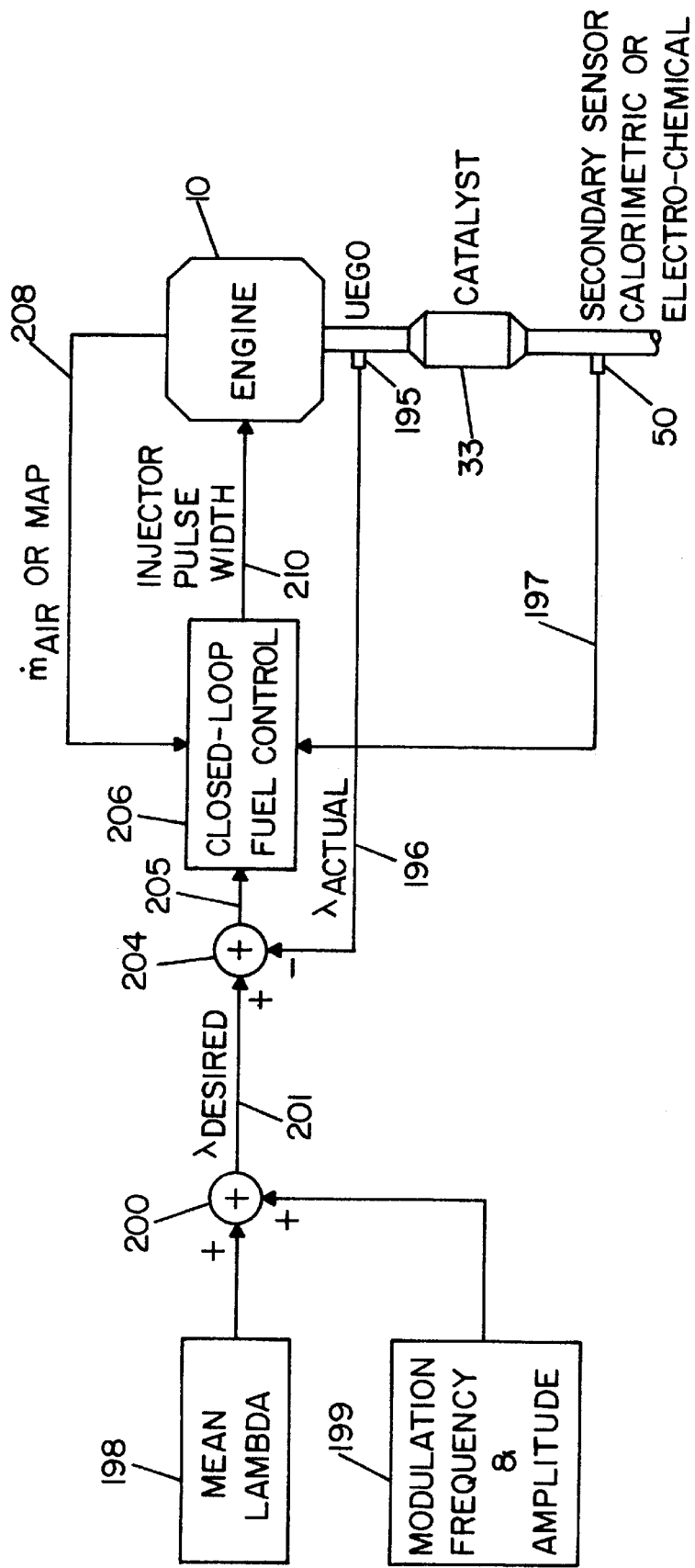
FIG. 19 is a schematic representation of a typical closed loop system for an internal combustion engine using the system of the present invention.

While there are a number of variations of closed-loop fuel control, a basic, fundamental closed-loop fuel control arrangement is disclosed in FIG. 19. In the fuel control arrangement of FIG. 19, a UEGO sensor 195 is located upstream of TWC converter 33 and calorimetric sensor 50 is downstream of TWC 33. For purposes of FIG. 19, UEGO sensor 195 determines actual lambda from oxygen in the exhaust gas and the actual lambda signal is outputted on line 196. The calorimetric sensor signal outputted on line 197 can determine catalytic converter efficiency from its amplitude signal or phase angle as in the HEGO sensor discussed above. Thus, FIG. 19 is conventional in its basic arrangement. The function blocks under the control of ECM 34 (or a DSP within or outside ECM 34) include a mean lambda block 198 which establishes whether engine 10 runs lean or rich. In accordance with the preferred embodiment of the invention, the mean lambda signal will cycle at some frequency at some limits of amplitude which is shown by modulation block 199. As discussed above, modulation block 199 is preferably programmed to provide a sinusoidal lambda output (such as shown by graphs 140, 140', 140", etc.) over time when the signals from modulation block 199 and mean lambda block 198 are summed at summing juncture 200. Thus, at any given time, a desired lambda signal is outputted from summing juncture 200 on line 201 which can be visualized as a point at time τ on any of the lambda traces shown in FIGS. 8B, 13A, 14A or 15A. The lambda desired signal on line 201 and the actual lambda signal on line 196 are summed at second summing juncture 204 to produce an error signal on line 205 inputted to closed-loop fuel control block 206. Fuel control block 206 receives a mass air flow or manifold air pressure signal on line 208 from air flow sensor 47 diagrammatically shown in FIG. 1. Assuming constant speed, fuel control block 206 will simply use the inputted error signal to adjust the pulse width on line 210 for each fuel injector 25 in engine 10 as discussed above. As is well known, when the operator changes speed, air throttle plate 26 varies to change the air flow sensor signal on line 208 and the air flow signal is read by ECM 34 and ECM 34 correspondingly changes the injector pulse width so that the engine achieves desired operator set speed. The calorimetric sensor signal on line 197 is also utilized by fuel control block 206 to control injector pulse width. As explained below, the calorimetric sensor signal can be correlated to catalytic conversion efficiency and as the efficiency drops, the operating conditions may be changed (i.e., perturbation frequency, perturbation amplitude, etc) to produce emissions capable of being converted by the less efficient catalytic converter. Additionally or alternatively, the phase angle of the calorimetric sensor signal is used to achieve fuel trim as discussed above. Still further, as discussed with reference to FIG. 17b, the calorimetric sensor signal can be used to assure maximum combustion. In the vehicular/combustion engine field, it has been shown that by employing intrusive, cyclically regulated conditions on the engine, the calorimetric sensor signal can:

A) determine concentrations of specific gaseous emissions by FFT processing of dynamic sensor signals which never reach steady state conditions. This removes adverse effects of system energy fluxes which otherwise prevent accurate measurements of small concentrations of gaseous emissions. It is an entirely different concept than that explained in the parent invention set forth in Ser. No. 09/019,085 which removes the adverse affects of system energy fluxes by cycling the engine between steady state conditions and reading the signal at the steady state condition. Both inventions rely on control of a repeatable condition to produce consistent as chemistries which are then analyzed by different methods or approaches. This invention possesses the inherent capability of allowing rapid cycling and in fact prefers rapid cycling before steady state conditions are realized. The parent invention, as noted, relies on steady state.

B) Analysis of the phase angle of the calorimetric sensor signal and comparison to the phase angle of the forcing function (lambda or modulation of fuel injection pulse widths) indicates whether the gas mixture is rich or lean. Thus, when sufficient emissions to detect combustibles are present, the invention can be substituted for an EGO sensor as well as a sensor showing emission concentrations C) By choosing the cyclic operating conditions to cause an AFR perturbation at or near stoichiometric conditions, the sensor signal (by comparing first order and second order FFT transforms of the sensor signal)

can determine lambda bias and can substitute for a UEGO sensor when sufficient emissions to detect combustion are present.

Generally speaking, the system as disclosed can:

1) Function as an EGO or UEGO sensor when sufficient emissions are present to enable detection of combustion at the active regional of the calorimetric sensor;
2) Develop feedback signals for engine control;
3) Monitor emissions for compliance; and
4) Any combination of items 1–3.

The system of the present invention can be used in several vehicular applications. Referring now to FIG. 20, there is schematically shown in rows designated A, B, C, and D four different applications of the calorimetric sensor system of the present invention. Row D corresponds to the arrangement illustrated in FIG. 1. Each row contains a configuration using calorimetric sensor 50 and for the configuration illustrated the functions performed by calorimetric sensor 50 are succinctly summarized. The text which follows discusses some of the listed functions in greater detail.

1) The ability of the system to measure lambda can be utilized for engine fuel control by placing the sensor into the exhaust of an internal combustion engine to provide a feedback control signal to ECM 34. Calorimetric sensor 50 can essentially be used to replace oxygen sensors currently used to control the fueling of an internal combustion engine operated at stoichiometry. The sensor signals can be used to determine if the AFR mixture is rich or lean and within the limitations discussed above the magnitude of deviation from lambda=1.

2) As already mentioned several times, so long as the perturbations vary the AFR to pass the lambda values of "1", the calorimetric sensor can distinguish lambda bias while also sensing concentrations of combustibles which is not possible with a UEGO or an HEGO sensor. Because of this characteristic, calorimetric sensor can be used to better control the engine if placed simply upstream of light-off catalytic converter 32. If positioned downstream of light-off catalytic converter 32 as shown in FIG. 1, it is now possible to control the gas composition sent to TWC 33. More specifically, light-off catalytic converter 32 is provided as defined above without intentionally added OSC. As noted, this enhances the sintering resistance of the light-off catalyst. The light-off catalytic converter hydrocarbons and calorimetric sensor 50 determines the AFR and the hydrocarbon concentration of the gas mixture leaving light-off catalytic converter 32. As light-off catalytic converter 32 ages, its ability to convert hydrocarbons diminishes. The calorimetric sensor signal is used by ECM to increase the perturbation frequency to improve efficiency of light-off catalytic converter 32 resulting in a hydrocarbon content downstream of catalytic converter 32 sensed by calorimetric sensor 50 at a concentration that TWC 33 can efficiently convert. Thus, as light-off catalytic converter 32 ages, the desired sine wave perturbation to the under floor catalyst, TWC 33, would be increased. The automatic adjustment continues until light-off catalytic converter 32 fails. With this concept, the OSC built into TWC 33 can be significantly diminished yielding a lower cost TWC.

In accordance with this concept, other methods of controlling the engine to maintain a desired sine wave perturbation to TWC 33 includes besides the perturbation frequency, modulating EGR or adjusting any form of timing. The methods of control are discussed in more detail in parent application Ser. No. 09/019,085 and reference should be had to that application, specifically for the discussion of controlling EGR, to regulate the composition of exhaust gases produced by engine 10. In fact, all methods of modulating the engine to control the combustibles reaching a catalyst are intended to be covered by this invention. Specifically, this aspect of the invention uses a feedback control method employing a calorimetric sensor to provide rapid feedback control of lambda and concentrations of gaseous emissions, particularly HCs, CO and $NO_x$ which are regulated emissions.

Figure 16:
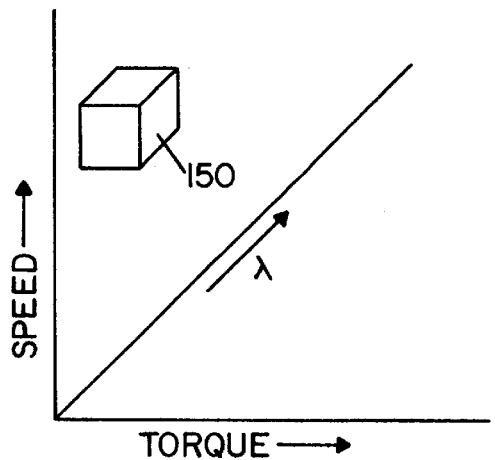
FIG. 16 is a 3-dimensional map grid.

3) As already mentioned, the calorimetric sensor can be used to obtain signals which will enable OBD evaluation of catalysts, particularly a catalyst void of intentionally added OSC which is not possible with EGO sensors. Significantly, the diagnosis can be done very rapidly because of the simultaneous measurement of air-to-fuel ratio and combustibles. With cycling at known frequencies, the use of band-pass filtering the sensor signals at frequencies related to the frequency of the inputted engine AFR perturbations leads to exchanged signal/noise. Because the calorimetric signals are evaluated through use of FFT, signals occurring at frequencies not related to the engine perturbation frequency can be discarded as noise, further enhancing the sensitivity of the sensor. Many methods for carrying out a catalyst performance evaluation are contemplated and only several will be discussed here. As previously discussed, calorimetric sensor 50 can be used to measure energy releases, particularly energy releases upon cycling the AFR near lambda=1.

a) The first method for measuring catalytic converter performance simply involves calibrating sensor signals under known vehicular operating conditions (space velocity, temperature, and other vehicular conditions controlling exhaust gas composition) and a direct measure of gas component concentrations can be had. If the AFR perturbation is carefully controlled at lambda equals 1, as previously discussed, the calorimetric sensor output is double the frequency of the input modulation frequency. Thus, the sensor signal amplitude can be measured and correlated with other required operating condition parameters to determine catalyst performance and make an evaluation. Particular benefit comes from band-pass filtering the signal at a frequency double that of the modulation frequency. This filtering will eliminate most noise and significantly enhance the signal-to-noise ratio for the calorimetric sensor output signal. Again, reference should be had to parent application Ser. No 09/019,085 for a more detailed discussion of operating parameters, catalyst coatings, etc. which can be used to directly correlate the amplitude of the sensor signal to an emission concentration.

b) The second method for carrying out catalyst performance evaluation is simply to make the correlations as described immediately above under many operating conditions (not necessarily with lambda=1) and map out catalyst performance. An example of such a map is diagrammatically illustrated in FIG. 16 in which engine speed is plotted on the y-axis, engine torque is plotted on the x-axis and the lambda at which engine 10 is cycled about is plotted on the z-axis. For a set perturbation at a set lambda delta, the sensor readings are calibrated at set increments indicated for example by block 150 until the cubic map is formed. That is, the cubic map is formed for signals all at a fixed frequency and λ amplitude. Lambda can be determined by comparing or correlating the signals with respect to signals obtained by an UEGO sensor. In operating, any FTP can be replicated by assembling a series of blocks in which sensor signals are accumulated as the vehicle is randomly driven. The signals are compared against set thresholds stored in each block 150 to determine whether the vehicle satisfies any FTP cycle.

In summary, some of the advantages of the system of the present invention when used for emission monitoring includes:

i) The catalyst diagnosis can be done very quickly which will result in less signal drift owing to changing conditions with time during the measurement;

ii) Nearly any operating condition can be used to evaluate catalyst performance owing to the short time required to make a measurement;

iii) The system allows band-pass filtering the data to eliminate noise outside the target frequency;

iv) Through the use of many diagnoses under many operating conditions the true dynamics of catalyst performance can be evaluated which is not possible in many other methods, particularly OSC methods based upon EGO signals which merely measure the performance of rare-earth oxygen storage components of the catalysts which are known to poorly correlate with HC emissions; and, v) The correlation of lambda with a combustibles measurement from the same sensor signal eliminates the difficulties of trying to correlate such signals between sensors located upstream and downstream of the catalyst.

4) The system of the present invention lends itself well to performing a diagnostic of the engine system and components to determine which system or engine component failed should the sensor indicate a failure to comply with emission regulatory standards. In the diagnostic system discussed, calorimetric sensor 50 may be located either before all the catalysts or after light-off catalytic converter 32 without intentionally added OSC as shown in FIG. 1 to accomplish evaluation of engine function or components. If located in the position shown in FIG. 1, the performance characteristics of light-off catalytic converter 32 has to be correlated or calibrated with calorimetric sensor readings so that the readings of the sensor downstream of the light-off catalytic converter 32 can be adjusted for the expected HC conversion of light-off catalytic converter 32. That is, if calorimetric sensor 50 senses a failure, the engine would be cycled at different conditions such as differing AFRs to verify that the failure was caused or contributed to by light-off catalytic converter 32. However, such information is not necessarily required for diagnosis of engine functions and components. It is intended that this invention cover the uses of the calorimetric sensor to diagnose engine components and functions through modulation of those components to yield predictable changes in emission to determine whether or not the component is or is not functioning correctly. Two examples are described below but more will be obvious to those skilled in the art.

A) As discussed in some detail in parent patent application Ser. No 09/019,085, modulation of EGR changes the level of $NO_x$ emissions from an engine. EGR modulation was shown to reduce $NO_x$ without adversely affecting HC emissions under particular operating conditions. Using calorimetric sensor 50 to determine if changes in measured emissions correlate with the expected emissions resulting from modulation of the EGR system provides a method for on-board monitoring of the EGR system. Very simply, if the percentage of EGR gas recirculated to the engine is changed to a condition whereat HC concentration would increase, then calorimetric sensor signal would detect the increase, if the EGR system was functioning correctly.

B) Typically the pulse widths of all fuel injectors are uniformly changed by ECM 34. Because of the ability of the system to detect emissions, the fuel injectors may be monitored individually by selectively changing their pulse widths to alter the AFR. For example, if the engine is a four cylinder engine, three of the cylinders can be operated to control the AFR at lambda=1 and the fourth cylinder which is the one being monitored, is modulated to alter the AFR. If the expected AFR alteration produced the expected calorimetric sensor response, then that particular injector is operating properly. Obviously each injector can be monitored independently by this method and that when so monitored, the fuel injector is in fact calibrated. Thus the invention achieves on board calibration of the fuel injectors.

B-1) The ability of the system of the present invention to directly monitor emissions from individual combustion chambers for engine control can be implemented in an engine control strategy in which the operating condition can be the engine speed (so that control of the operating condition is not required) with improved FFT analysis. An engine control strategy can be implemented in which half the injectors are set at one bias and half the injectors are set at another bias with lambda perturbation amplitude constant for all injectors. By presetting the bias, and inherent cyclic condition is introduced at a frequency which is the speed of the engine. Adjustments are made by varying injector pulse width in accordance with normal practice. Calorimetric sensor signals cycle in accordance with the emissions the sensor "sees" which varies in accordance with the firing order and directly ties to engine speed. In fact, the engine speed will produce the first order frequency component of the FFT. Within ECM 34 is a clock circuit directly tied to the engine crank to directly control engine functions dependent on engine speed. That clock circuit will directly produce the first order FFT component. Thus an engine control strategy can be implemented based on the system of the present invention which i) achieves an intrusive effect of causing a cyclic operating condition to occur without adding any additional sensors or ECM calculations and ii) produces an improved FFT sensor signal using existing ECM clock circuitry which inherently detects the frequency of the forcing function used in the FFT calculations.

Figure 26:
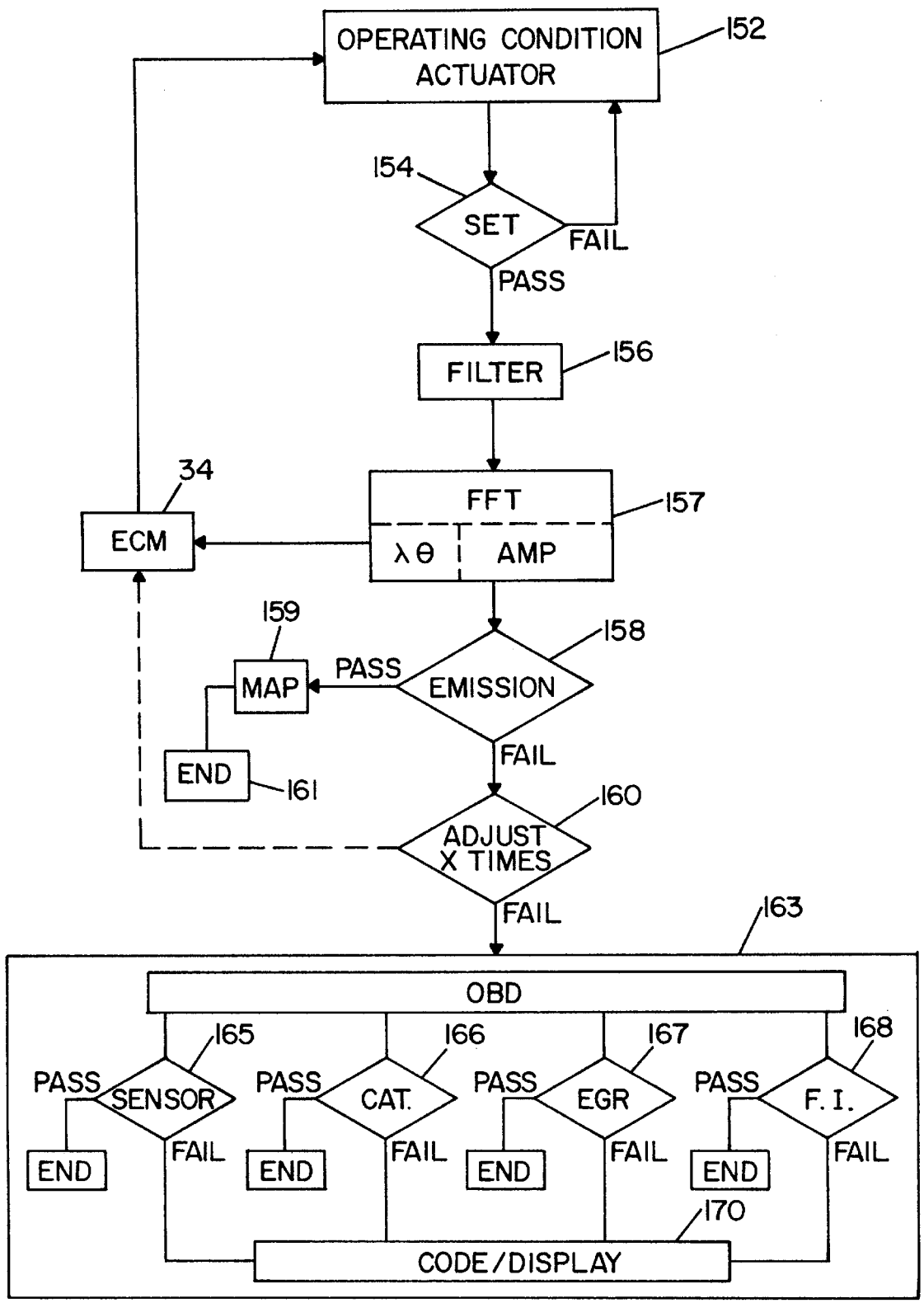

Referring now to FIG. 26, there is illustrated a flow chart encompassing several features of the invention. At block 152 there is an engine operating condition actuator 152 which is under the control of electronic control module (ECM) 34. Operating condition actuator cycles engine 10 between any of the two operating conditions discussed above. For purposes of discussion, in FIG. 26 the operating condition controlled by ECM 34 is the AFR. Before the exhaust gases arising from block 152 are checked, the engine is first checked to determine if set engine conditions are met at block 154. In accordance with the discussions above, the set conditions are space velocity of the exhaust gases and temperature of the exhaust gases. For ease in explanation it can simply be assumed that the process will not start unless the vehicle is at operating temperature. As already discussed, engine speed (and engine torque) is not a limiting factor since calorimetric sensor 50 can be calibrated for various speeds and torque as discussed with reference to FIG. 16. Further, the inventive system and concept can be used in cold start applications provided that some provision be implemented in the system to allow time for calorimetric sensor to be heated to a level at which calorimetric sensor 50 can function. Again, for purposes of flow chart, FIG. 26, the set condition will simply be deemed to be at a stabilized calorimetric RTD resistance value. After the set conditions have been met, calorimetric sensor 50 generates the signals which are band-pass filtered at step 156. As discussed above, the filtering is band-pass or band-width-pass at frequencies equal to or greater than the frequency inputted at the operating condition cycle shown in block 152. This filtering step, which is easily accomplished by known techniques, significantly eliminates noise. The signal is then computed by the Fast Fourier Transform step set forth at block 157. The signal provides lambda, delta and amplitude data, all of which, as shown by the dash line in block 157, is inputted back to ECM 34 as a feedback signal. This permits ECM 34 to adjust the operating conditions at step 152 to account for the gaseous emissions present as well as, for example, checking whether or not the fuel mixture is rich or lean or at a specific lambda bias value. That information is not available to ECM 34 from one sensor in current system.

The amplitude signal derived in FFT step 157 is then analyzed in an emission analyzer block 158 whereat the specific emission sensed as determined by the signal amplitude is correlated to a concentration and with a knowledge of lambda compared to a regulatory standard. If the standard is met, the signal is optionally stored at block 159. The data can be stored as an expression of the catalytic converter efficiency or the data can actually be mapped as in FIG. 16 for replication of an FTP cycle as discussed above. On storage, the emission check is ended at block 161. If the regulatory standard is not met, the signal is further processed in a readjust operating condition block 160. Readjust operating condition block 160 calculates a different perturbation frequency shown as a dotted line sent back to ECM 34 through OC actuator block 152. This will result in a different exhaust gas composition stream as discussed above to compensate for aging of light-off catalytic converter 32. The signal will again be processed to see if it meets regulatory standards at block 158. If it does, then the vehicle is simply operated at the new perturbation frequency by block 160. If not, there may be a limited number of retries before a failed condition is sensed.

Upon sensing a non-correctable failed condition the diagnostic system block 163 is entered. Diagnostic system block 163 contains any number of pass/fail engine component or engine system checks. Several are diagrammatically illustrated as calorimetric sensor check block 165, catalytic converter check block 166, EGR system check block 167, and fuel injector check block 168. Failures of any one or more of the system checks is stored in a code/light display block 170. As discussed above, the OBD system checks simply involve a variation at different limits of the OC actuator step 152. Thus, the EGR content would be cycled at different limits and if the amplitude signal developed at block 157 failed to similarly respond, then the EGR system would be identified as having failed. Each of the fuel injectors could be checked as discussed above. Varying the AFR at certain limit is used to perform a diagnostic of calorimetric sensor signal at block 165 and also to determine whether or not the catalytic converter had failed as at block 166.

5) The system described in the preferred embodiment thus far has been directed to systems that cycled about or near lambda. As noted with respect to FIG. 9B, energy liberation at the active catalyst area occurs when the engine is operated at excess air or at "lean burn" conditions. Thus, the system of the invention is applicable to an engine operated at excessively lean conditions up to misfire.

Figure 21A:
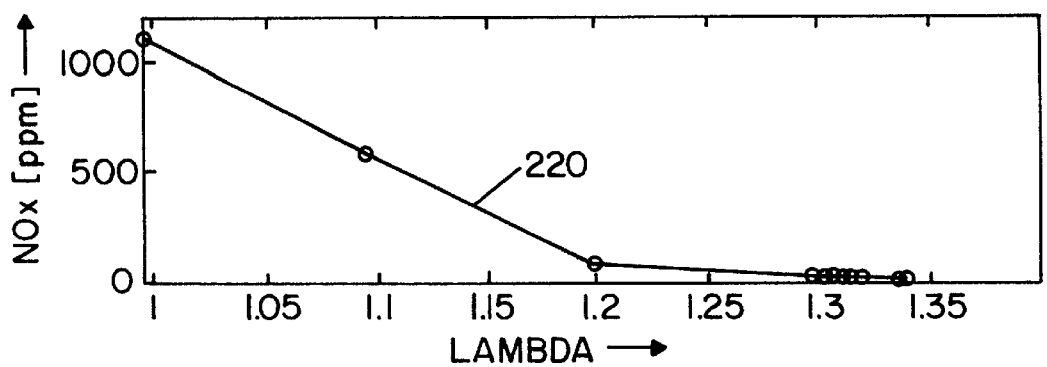
FIG. 21A is a graph of $NO_x$ emissions emitted by an internal combustion engine when the engine is operated at various Air/Fuel ratios.
Figure 21B:
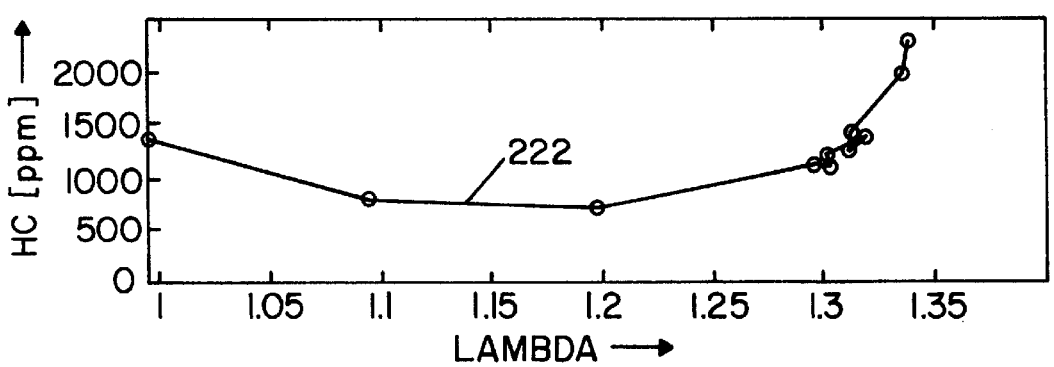
FIG. 21B is a graph of HC emissions emitted by an internal combustion engine when the engine is operated at various Air/Fuel ratios.
Figure 21C:
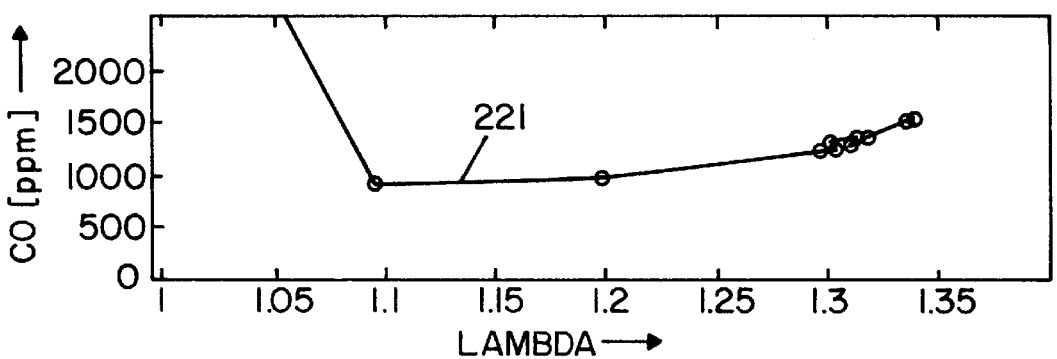
FIG. 21C is a graph of CO emissions emitted by an internal combustion engine when the engine is operated at various Air/Fuel ratios.

When engine 10 is operated at excess lean conditions or lean burn (defined for that particular engine under which test data was obtained as extending from a lambda of about 1.20 to misfire), certain relationships between exhaust emissions occur. In particular, nitrous oxide emissions significantly decrease when lambda values are equal or greater than about 1.2. This is shown in the graph illustrated in FIG. 21A and depicted by reference number 220. CO emissions as shown in the graph indicated in FIG. 21C and designated by reference number 221 drop to a constant level at lambda values of about 1.1 and then gradually increase as lambda is increased. HC emissions, shown in the graph of FIG. 21B and designated by reference numeral 222 significantly drop at lambda values of about 1.1 and remain fairly constant until lambda is increased beyond about 1.3 whereat HC concentrations rapidly increase. Although not plotted, it is known that engine torque decreases as lambda increased beyond values of 1.0. The graphs of FIGS. 21A, 21B and 21C show emission concentrations from the engine prior to passing through the catalytic converter.

It is generally recognized that operating the engine at lean burn increase fuel economy as throttled pumping losses decrease. The graphs show that $NO_x$ levels significantly decrease at "lean burn". However, there is a limit, a "lean limit", whereat HC concentrations will significantly increase due to incomplete combustion.

The system of the present invention is ideally suited to control the engine if operated at lean burn conditions. As already discussed above, an EGO sensor, cannot directly measure HC (and CO). This causes a conservative approach to control the engine, because if the engine approaches misfire there is not significant change in the UEGO signal (which is only capable of detecting AFR) to indicate that such event is likely to occur. Calorimetric sensor 50 detects HC (and CO) and allows the engine to be controlled at more advanced lean conditions than what is otherwise possible.

Figure 22:
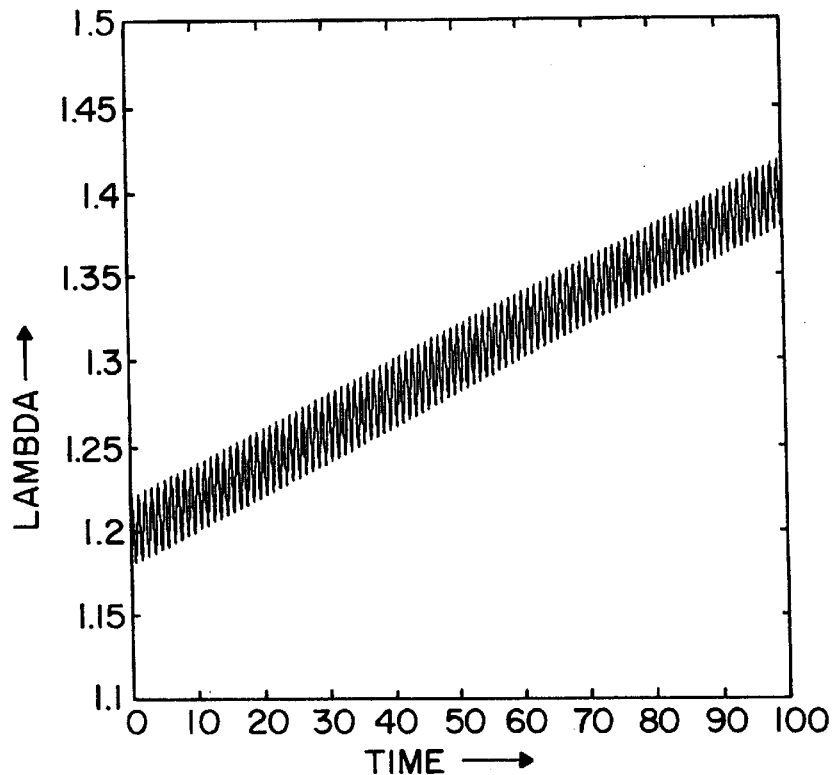
FIG. 22 is a constructed plot of lambda cyclic signals on the y-axis occurring over a time period on the x-axis indicative of a lambda sweep at lean burn engine operating conditions.
Figure 23:
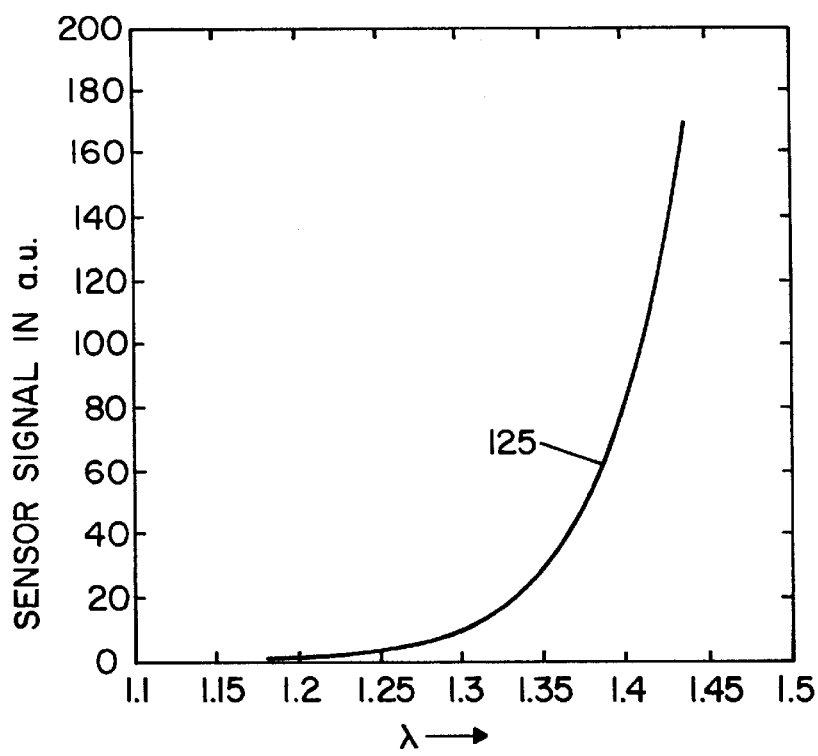
FIG. 23 is a constructed plot of the transformation function showing the hypothetical absolute energy release (for an exothermic reaction between an oxidant and reductant) on the catalyzed surface of the sensor as a function of lambda at lean burn engine conditions.
Figure 24:
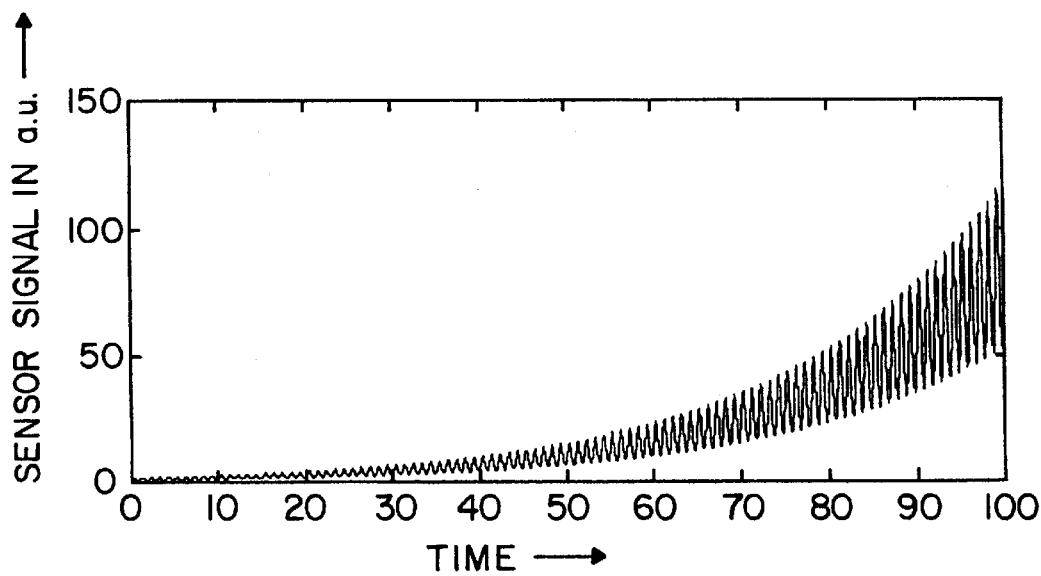
FIG. 24 is a constructed plot of the calorimetric sensor signal (plotted on the y-axis) generated while the engine is cycled over the time (plotted on the x-axis) in the lambda sweep depicted in FIG. 22.
Figure 25:
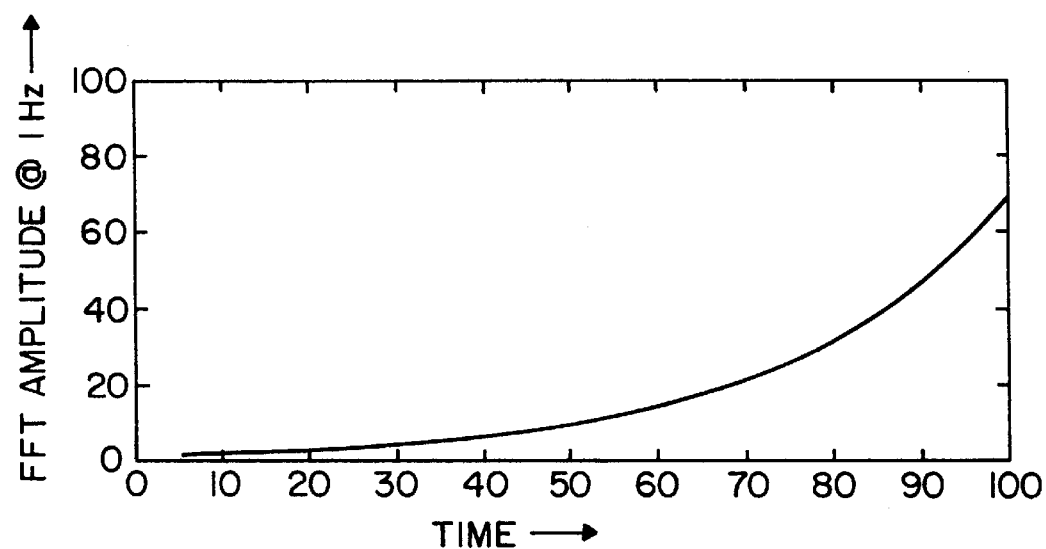
FIG. 25 is a constructed plot of the amplitude of the first order frequency component of a Fast Fourier Transform by the sensor signals of FIG. 24 occurring over the time (plotted on the x-axis) of the lambda sweep; and, FIG. 26 is a flow chart of the invention used in an automotive OBD application.

Application of the system to lean burn condition is demonstrated in hypothetical graphs shown in FIGS. 22, 23, 24 and 25. (Sensor signals are given in customary arbitrary unit values, i.e., a.u., as are sensor values indicated for a number of the graphs discussed above). FIG. 22 is a graph of a lambda sweep whereat lambda is cycled at perturbations of 1 Hz for 100 seconds between lambda limits which gradually change as the sweep progresses through the lean burn range. Note that the lower limits of each lambda cycle have lambda values less than 1.20 until the time exceeds about ten seconds, i.e., the first ten perturbations. FIG. 23 is a transformation function showing the expected theoretical heat release as the emissions rise with increasing lambda near the misfire limit. FIG. 23 is thus constructed similar to the graphs shown in FIGS. 11A–D. The graphs are different since, as shown in FIG. 9B, the bump in FIG. 9A is not present. FIG. 24 is a theoretical plot of the actual sensor output signal for the lambda sweep shown in FIG. 22 using the transformation function of FIG. 23. FIG. 24 corresponds to the lambda sweep of FIGS. 12A1–12A4. FIG. 25 is a hypothetical plot of the first order calorimetric sensor signal amplitudes determined by the Fast Fourier Transform of FIG. 24. As discussed with reference to FIG. 9B, the reactions are not increasing and decreasing as a bump is transversed because there is no bump. The sensor signal (depending on the catalytic coating of the active region), for the most part, will be comprised of a first order frequency component corresponding to the frequency of the forcing function, i.e., lambda perturbation frequency.

Thus, the FFT amplitude of the first order frequency component directly correlates to the HC emission concentrations and the calorimetric sensor can be used to provide a more aggressive approach to engine control to permit the engine to be operated at more lean conditions in the "lean burn" mode. It should also be noted that as lambda increases (as the engine runs more lean) the first order FFT amplitude signals increases in phase with lambda. It should also be recalled from FIGS. 14A and 14B, that when the engine was cycled lean near stoichiometry the sensor signal was out of phase with lambda. This can be explained by reference to FIG. 9B and referring to the discussion with respect to FIG. 9A. As shown in FIG. 9B, as the engine cycles from a lean to a more lean condition on the skewed bump the reactions or energy releases are decreasing resulting in the sensor signal being out of phase with the lambda signal. However, when operating the engine at the lean burn conditions of x—x or y—y in FIG. 9B, the reactions or energy releases are increasing and the signals will be in phase with lambda. Stated another way, the "lean" bump curve is decreasing resulting in decreasing energy liberation while the "lean burn" curve is increasing resulting in increasing energy liberation. Because of the significant differences in lambda between operating the engine at learn burn from operating the engine lean stoichiometry, there should not be a problem in fuel control or fuel trim resulting from the fact that a stoichiometric lean signal is out of phase with lambda while a lean burn sensor signal is in phase with lambda.

6) There are additional applications for the inventive calorimetric sensor system when used to monitor exhaust gases produced by internal combustion engine 10.

A) The calorimetric sensor can be used to evaluate HC or CO performance of the catalyst operated under lean conditions through the use of AFR perturbations at a fixed high frequency. A since wave signal from the sensor at a frequency which matches the perturbation frequency of the engine can be collected, band-pass filtered to enhance signal noise and the amplitude determined to evaluate the performance of the catalyst. For diesel and/or GDI (gasoline direct injection) engines, the engine out gases can be considerably cooler than SI (standard injection) engines operated at stoichiometry. Thus, cold engine operation performance adversely affecting HC and CO concentrations can be a problem which can be monitored using calorimetric sensor 50 in the system disclosed, particularly under lean conditions where a HEGO or UEGO sensor is of no value for measuring HC or CO levels. The detected signals could also be used to control engine operation to raise engine temperature.

B) Calorimetric sensor 50 can also be used to measure when the rate of reaction on the sensor catalyst is maximum. This occurs when the surface coverage of RED and OX on adjacent sites of the catalyst have maximized. This occurs at lambda=1 or at least very close to lambda=1. The ability to measure this value can be used to calibrate the voltage of an oxygen sensor to adjust the voltage to compensate for drift in an EGO (exhaust gas oxygen) sensor voltage output resulting from aging of the sensor. Such adjustment is typically referred to as fuel trim, and is currently one function of an oxygen sensor placed downstream of a TWC. This is distinguished from current art in that the catalyst after which the calorimetric sensor is placed can be free of intentionally added OSC, and yet with the calorimetric sensor both fuel trim and OBS evaluation of the catalyst can be accomplished. With current art, the OBD function cannot be fulfilled on a catalyst void of OSC.

C) On vehicles equipped today with two oxygen sensors, the rear oxygen sensor serves two functions, namely, OBD and fuel trim. The fuel trim capabilities of the calorimetric sensor 50 used in the system disclosed herein coupled with OBD strategy such as that used to monitor a light-off catalytic converter during cold start (briefly discussed above) could be used together to enable replacement of the rear oxygen sensor with a calorimetric sensor.

D) In applications where the calorimetric sensor is positioned downstream of a TWC which contains OSC, the calorimetric sensor could be used not only as described above for fuel trim and catalyst light-off detection, but also as a fuel controller regulating the AFR under cold conditions before OSC starts to function for the catalyst. The bulk of emissions for vehicles classified as ULEV or LEV occur during the period known as cold start. The calorimetric sensor could be operated at a fairly low temperature, say 400° C., that would enable rapid heat-up to operating temperature and used for fuel control to help reduce emissions more than that currently available using current, open loop, cold start control methods.

E) At this point, it should be apparent to those skilled in the art that the lambda bias value obtained from the signal of the calorimetric sensor is limited to AFR cycles which touch or pass through stoichiometric conditions and involve more extensive calculations covering first and second order FFT transforms than that required to determine the phase relationship, i.e., rich or lean, or signal amplitude, both of which can be ascertained from the first order of the FFT or by using other well known mathematical, signal analyzing techniques. The invention contemplates that only one or more of the signals capable of being ascertained by calorimetric sensor 50 will be utilized in the vehicle. Specifically, only the amplitude signal of calorimetric sensor 50 can be used to ascertain emission concentrations. In this use the invention parallels the invention of parent application Ser. No. 09/019,085. However, the inventions are patentably unique from one another since the parent application uses a different signal at steady state conditions to determine emission concentration while the present invention uses the actual changing signal at perturbations which can be very fast to sense the emission concentrations. In such an application, it contemplated that an EGO, an HEGO, or a UEGO sensor would simply be packaged within threaded housing 63 of calorimetric sensor 50. The additional sensors would then provide the rich/lean determination or the lambda bias as desired. Additionally, calorimetric sensor 50 could be modified as described with reference to FIG. 3 to provide a continuously lean environment for enhancing CO, H2 and HC combustion at the reaction surfaces of the calorimetric sensor. With such modification the sensor would be unable to perform EGO type measurements but its ability to detect HC may be enhanced.

The unique system of the present invention has been specifically developed for use in vehicular applications with internal combustion engines producing exhaust gases which must have emission concentrations within specific limits. The environment of the preferred application has numerous problems unique to its environment such as engine control strategies, emission sensing and the combination of one or the other which had to be first recognized, then understood and finally, resolved before the inventive system could be perfected. Having applied the inventive system in the complex environment of an internal combustion engine, the inventors have recognized that the scope of the system is not necessarily limited to a vehicular application.

Broadly speaking, the scope of the inventive system can apply to any method and/or apparatus for monitoring or controlling processes which involve either energy consumption or liberation on a material coated onto the surface of a calorimeter provided that a parameter of the process producing different energy consumptions or liberations can be precisely perturbed at repeatable frequencies. Two examples are set forth below.

The first example is a sensor using photocatalysis to monitor a process stream. A photocatalyst is a material that accelerates a reaction when it is activated by light. Within limits, the amount of activation is proportional to the light intensity. These photocatalytic materials are often semiconductors, for example titania, SrTiO3 and zinc oxide. Photocatalysts have been used in a variety of processes to degrade pollutants in liquid and gas streams. For example, oxidation of volatile organic compounds, decomposition of PCBs and halogenated organic compounds, water purification, waste water treatment, cyanide removal, degradation of insecticides, herbicides, surfactants, dyes, organic acids, amines, and aromatic compounds have been accomplished by photocatalysis. These transformations typically occur at or near ambient temperatures and are associated with a characteristic heat of reaction or transformation.

In the presence of light, a calorimetric sensor upon which is deposited a photocatalyst will be able to measure the heat associated with the chemical transformation that occurs. Therefore, the system of the present invention can measure the presence and concentration of certain pollutants/compounds of interest. This has obvious applications for monitoring process streams and determining the presence or absence of pollutants.

The sensor would function as follows. A calorimetric sensor equipped with a suitable photocatalyst would be placed in the process stream of interest or in an appropriate side stream. A small beam of light of the appropriate wavelength would be focused on the photocatalyst. This beam of light could consist of wavelengths in the ultra-violet or visible or infrared regions or could be a laser of appropriate wavelength and intensity. Alternatively it could be a beam of light comprising a wide spectrum of wavelengths such as visible light. The intensity of the light can be varied in a controlled way (i.e., sine wave, square wave, etc.) such that over a discrete period of time the rate of transformation of the compound(s) of interest goes through a maximum. This is analogous to the oxidation process in the combustion engine exhaust where the oxygen content is varied in a defined way over a discrete time interval. The signal emanating from the calorimetric sensor will be a function of the transformation(s) occurring. This signal will be dynamic. Therefore, the signal handling and processing and the benefits that accrue from the system of the present invention will be realized.

The second example involves the use of a calorimetric sensor equipped with a biocatalyst to monitor a process stream. A biocatalyst consists of a cell, enzyme, microbe or other biological material or agent that accelerates a chemical transformation. Normally these materials operate near or slightly above 25–30° C., however, there are natural and genetically engineered enzymes that operate at elevated temperatures, so called "extremeophiles". Biocatalysts normally carry out very selective transformations. These transformations will be associated with a characteristic heat of reaction. The biocatalyst can be deposited on the sensor or more preferably can be immobilized on an inorganic or organic support which is deposited onto the sensor. Frequently enzymes need cofactors. Cofactors are nonproteins that activate the enzyme. Examples are Ca2+, Co2+, Fe2+ and organic molecules such as nicotinamide, and adenine dinucleotide.

Biocatalysts have been used for a number of industrial processes including waste treatment, synthesis of industrial chemicals and pharmaceuticals, sweetener synthesis, detergents, food processing and VOC (volatile organic compound) removal. A specific example is a biofilter which uses biocatalysts to oxidize VOCs from contaminated air in a moist oxygen rich environment.

At the appropriate conditions, a calorimetric sensor upon which is deposited a biocatalyst will be able to measure the heat associated with the chemical transformation that occurs. Therefore, the presence and concentration of certain compounds of interest can be measured. This has obvious applications for monitoring process streams or as a biosensor.

The sensor would function as follows for VOC monitoring. A calorimetric sensor equipped with a suitable biocatalyst would be placed in a process stream of interest or in an appropriate side stream. The oxygen content of the stream would be varied in a controlled way (i.e., sine wave, square wave, etc.) such that over a discrete period of time the rate of transformation of the VOCs of interest goes through a maximum. This is analogous to the oxidation process in the combustion engine exhaust where the oxygen content is varied in a defined way over a discrete time interval. The signal emanating from the calorimetric sensor will be a function of the transformation(s) occurring. This signal will be dynamic. Therefore, the signal handling and processing (i.e., frequency domain) and the benefits that accrue from the system of the present invention will be realized.

The invention has been described with reference to a preferred embodiment and alternative embodiments thereof. Many modifications and alterations of the invention will become apparent to those skilled in the art upon reading and understanding the Detailed Description of the Invention set forth herein. It is intended to include all such modifications and alterations insofar as they come within the scope of the present invention.

Having thus described the invention, it is claimed:

1. An on-board monitoring and/or control system for use and in combination with a vehicle having an internal combustion engine emitting, during operation, exhaust gases, said system comprising:
   a) control means causing said engine to cycle between first and second extreme operating conditions to produce an exhaust gas having generally, consistently varying concentrations of specific emissions during each cycle which are repeatedly reproduced from cycle to cycle;
   b) sensor means for producing a continuous calorimetric signal indicative of the changes in the exhaust gas composition during each cycle;
   c) means to generate a function signal by analyzing the changes in said calorimetric signal; and
   d) means to apply said function signal to a control on said vehicle for monitoring and/or controlling a function of said vehicle.

2. The system of claim 1 wherein said sensor means includes a sensor having a reactor area at temperatures higher than the exhaust gas temperature continuously receiving a slip stream of said exhaust gases, said reactor area having an active surface tending to promote processes wherein energy is liberated or consumed with said exhaust gases in contact therewith and measured by said sensing means to produce said calorimetric signal.

3. The system of claim 2 wherein said control means is effective to cycle said engine at frequencies such that said energy reactions at said reactor area do not reach steady state at said first and second operating condition.

4. The system of claim 1 wherein said control means causes said cycle to modulate the composition of said exhaust gases during each cycle such that said calorimetric signal takes a wave form selected from the group consisting of i) sine waves, ii) triangular waves, iii) saw tooth waves, iv) square waves, v) asymmetric waves, and vi) combinations thereof.

5. The system of claim 4 wherein said modulation causes a sine wave calorimetric signal.

6. The system of claim 3 wherein said control means causes said cycle to modulate the composition of said exhaust gases during each cycle such that said calorimetric signal takes a wave form selected from the group consisting of i) sine waves, ii) triangular waves, iii) saw tooth waves, iv) square waves, v) asymmetric waves, and vi) combinations thereof.

7. The system of claim 6 wherein said modulation causes a sine wave calorimetric signal.

8. The system of claim 2 wherein said reaction area has a material coating promoting reactions of said exhaust gas that liberate or consume energy.

9. The system of claim 8 wherein said material coating is one or more coatings promoting exothermic or endothermic reactions selected from the group consisting of i) base-metal compounds with various base metal oxidation states, ii) precious metals, iii) precious metal compounds with various precious metal oxidation states, iv) catalysts of the type having at least one precious metal coated or impregnated on a washcoat of alumina or ceria zirconia applied to said reaction area and v) combinations thereof.

10. The system of claim 8 wherein said coating is one or more adsorbent coatings selected from the group consisting of i) zeolites, ii) polymers, iii) super-absorptive polymers, iv) desiccants and materials that adsorb HFC's.

11. The system of claim 1 wherein said control means includes means to vary one or more operating conditions of said engine selected from the group consisting of i) valve timing, ii) spark timing, iii) speed, iv) exhaust gas recirculation, v) injection timing, vi) air to fuel ratio, vii) mass air flow viii) manifold air pressure and ix) perturbation frequency.

12. The system of claim 1 wherein said vehicular function signal is one or more signals selected from the group consisting of a) control feedback signal utilized by ECM means for controlling set ratios of air to fuel metered to the combustion chambers of said engine, or EGR gases or spark, valve or injection timing or mass air flow or pressure or perturbation frequency symmetry or wave form, b) a trim signal for calibrating control devices on said vehicle, c) an emissions monitoring signal indicative of the concentration of one or more specific gases emissions, d) a catalytic converter efficiency signal for monitoring the efficiency of the catalytic converter, e) an OBD signal indicative of a failure of a pollution control system on the vehicle and f) an emissions compliant storage signal for determining if said vehicle is in compliance with emission requirements specified during specific drive cycles.

13. The system of claim 1 wherein said means to generate includes, at least during sensing, periodic means for producing a calorimetric signal having a periodic wave form at frequencies correlated to that at which said engine is cycled and interpolating means for mathematically analyzing one or more wave characteristics of said periodic calorimetric signal selected from the group consisting of i) wave amplitude, ii) wave phase and iii) wave frequency component relationship to induced perturbations caused by said control means.

14. The system of claim 13 wherein said periodic means includes means to digitize said calorimetric signal into data signals, means to transform said data into a frequency domain having a spectrum of wave frequency components and said interpolating means selecting at least one frequency component from said spectrum at multiples of the cycle frequency for evaluation.

15. The system of claim 2 wherein said control means includes means to vary one or more operating conditions of said engine selected from the group consisting of i) valve timing, ii) spark timing, iii) speed, iv) exhaust gas recirculation, v) injection timing, vi) air to fuel ratio, vii) mass air flow viii) manifold air pressure and ix) perturbation frequency.

16. The system of claim 2 wherein said vehicular function signal is one or more signals selected from the group consisting of a) control feedback signal utilized by ECM means for controlling set ratios of air to fuel metered to the combustion chambers of said engine, or EGR gases or spark, valve or injection timing or mass air flow or pressure or perturbation frequency symmetry or wave form, b) a trim signal for calibrating control devices on said vehicle, c) an emissions monitoring signal indicative of the concentration of one or more specific gases emissions, d) a catalytic converter efficiency signal for monitoring the efficiency of the catalytic converter, e) an OBD signal indicative of a failure of a pollution control system on the vehicle and f) an emissions compliant storage signal for determining if said vehicle is in compliance with emission requirements specified during specific drive cycles.

17. The system of claim 2 wherein said means to generate includes, at least during sensing, periodic means for producing a calorimetric signal having a periodic wave form at frequencies correlated to that at which said engine is cycled and interpolating means for mathematically analyzing one or more wave characteristics of said periodic calorimetric signal selected from the group consisting of i) wave amplitude, ii) wave phase and iii) wave frequency component relationship to induced perturbations caused by said control means.

18. The system of claim 2 wherein said control means causes said cycle to modulate the composition of said exhaust gases during each cycle such that said calorimetric signal takes a wave form selected from the group consisting of i) sine waves, ii) triangular waves, iii) saw tooth waves, iv) square waves, v) asymmetric waves, and vi) combinations thereof.

19. The system of claim 11 wherein said vehicular function signal is one or more signals selected from the group consisting of a) control feedback signal utilized by ECM means for controlling set ratios of air to fuel metered to the combustion chambers of said engine, or EGR gases or spark, valve or injection timing or mass air flow or pressure or perturbation frequency symmetry or wave form, b) a trim signal for calibrating control devices on said vehicle, c) an emissions monitoring signal indicative of the concentration of one or more specific gases emissions, d) a catalytic converter efficiency signal for monitoring the efficiency of the catalytic converter, e) an OBD signal indicative of a failure of a pollution control system on the vehicle and f) an emissions compliant storage signal for determining if said vehicle is in compliance with emission requirements specified during specific drive cycles.

20. The system of claim 11 wherein said means to generate includes, at least during sensing, periodic means for producing a calorimetric signal having a periodic wave form at frequencies correlated to that at which said engine is cycled and interpolating means for mathematically analyzing one or more wave characteristics of said periodic calorimetric signal selected from the group consisting of i) wave amplitude, ii) wave phase and iii) wave frequency component relationship to induced perturbations caused by said control means.

21. The system of claim 11 wherein said control means causes said cycle to modulate the composition of said exhaust gases during each cycle such that said calorimetric signal takes a wave form selected from the group consisting of i) sine waves, ii) triangular waves, iii) saw tooth waves, iv) square waves, v) asymmetric waves, and vi) combinations thereof.

22. The system of claim 12 wherein said means to generate includes, at least during sensing, periodic means for producing a calorimetric signal having a periodic wave form at frequencies correlated to that at which said engine is cycled and interpolating means for mathematically analyzing one or more wave characteristics of said periodic calorimetric signal selected from the group consisting of i) wave amplitude, ii) wave phase and iii) wave frequency component relationship to induced perturbations caused by said control means.

23. The system of claim 12 wherein said control means causes said cycle to modulate the composition of said exhaust gases during each cycle such that said calorimetric signal takes a wave form selected from the group consisting of i) sine waves, ii) triangular waves, iii) saw tooth waves, iv) square waves, v) asymmetric waves, and vi) combinations thereof.

24. The system of claim 13 wherein said control means causes said cycle to modulate the composition of said exhaust gases during each cycle such that said calorimetric signal takes a wave form selected from the group consisting of i) sine waves, ii) triangular waves, iii) saw tooth waves, iv) square waves, v) asymmetric waves, and vi) combinations thereof.

25. The system of claim 2 further including
a light-off catalytic converter spaced closely adjacent said engine substantially lacking chemical compositions capable of storing oxygen;
an underfloor catalytic converter downstream of said light-off catalytic converter;
said sensor being positioned downstream of said light-off converter and upstream of said underfloor catalytic converter;
injection means for metering fixed quantities of fuel into the combustion chambers of said engine; and wherein said means to generate producing a first signal indicative of the concentration of at least one specific gaseous emission in said exhaust gas and a second feedback signal indicative of the quantities of air and fuel supplied to the combustion chambers of said engine;
said means to apply further including ECM means for generating an injection signal correlated to said first and second signals to produce an exhaust gas having specific gaseous emission concentrations capable of being converted by said light-off catalyst whereby the life of said underfloor catalytic converter is extended by said ECM means changing said injection signal to maintain emission concentrations in said exhaust gas at levels capable of being converted by said light-off catalyst as said light-off catalyst ages.

26. The system of claim 25 wherein said underfloor catalytic converter has a washcoat intentionally lacking ceria composition.

27. The system of claim 25 wherein said injection signal corresponds to the frequency at which said control means cycles said operating conditions, said ECM means changing said frequency as said light-off catalytic converter ages to cause said engine to produce lesser concentrations of said specific gaseous emission sensed by said sensor.

28. The system of claim 25 wherein said injection means further includes pulse width modulating means for controlling the quantities and duration of fuel supplied to said combustion chambers of said engine pursuant to said injection signal, said injection signal corresponding to an air to fuel ratio at which said fixed quantities of fuel are metered to said combustion chambers by said pulse width modulating means, said ECM means causing said injection means to change said fixed quantities of fuel as said light-off catalytic converter ages in response to said first signal to cause said engine to produce lesser concentrations of said specific gaseous emission sensed by said sensor.

29. The system of claim 25 wherein said means to generate includes said means to generate includes, at least during sensing, periodic means for producing a calorimetric signal having a periodic wave form at frequencies correlated to that at which said engine is cycled and interpolating means for mathematically analyzing one or more wave characteristics of said periodic calorimetric signal selected from the group consisting of i) wave amplitude, ii) wave phase and iii) wave frequency component relationship to induced perturbations caused by said control means.

30. The system of claim 29 wherein said periodic means includes means to digitize said calorimetric signal into data signals, means to transform said data into a frequency domain having a spectrum of wave frequency components and said interpolating means selecting at least one frequency component from said spectrum at multiples of the cycle frequency for evaluation.

31. The system of claim 29 wherein said feedback signal is said wave phase signal correlated to said frequency at which said control means cycles said operating condition.

32. The system of claim 30 wherein said interpolating means compares first and second wave frequency components of said calorimetric signal at different frequency multiples of said cycle for determining the lambda bias at which said engine operates.

33. The system of claim 25 wherein said injection means further includes exhaust gas recirculation means for metering a set portion of exhaust gas with said combustion air and said fuel into said combustion chambers of said engine pursuant to said injection signal, said ECM means producing injection signals changing the quantities of exhaust gas metered into said combustion chambers to cause said engine to produce lesser concentrations of said specific gaseous emission sensed by said senor.

34. The system of claim 25 wherein said light-off catalytic converter has a washcoat substantially lacking ceria and capable of converting HC and $H_2$ emissions in said exhaust gas to harmless emissions, said specific gaseous emissions sensed by said sensor being HC, NO, CO and $H_2$.

35. The system of claim 34 wherein said sensor has a second reactor area, said first reactor area having a catalyst coating promoting processes wherein energy is liberated or consumed with all combustibles in said exhaust gases and said second reactor having a second catalyst coating promoting selective processes with CO and $H_2$ wherein energy is liberated or consumed whereby said sensor signal is indicative of the HC concentration present in said exhaust gases.

36. The system of claim 35 wherein said injection means further including means to supply a set quantity of recirculated exhaust gases with said air to avoid significant concentrations of $NO_x$ in said exhaust gas.

37. The system of claim 34 wherein said washcoat of said light-off catalyst is substantially impregnated with Palladium only for converting regulated emissions.

38. The system of claim 2 wherein said control means cycles said operating conditions at a frequency not less than about 1 Hz and said means to generate further includes bandwidth filter means for filtering said calorimetric signal at frequencies equal to or multiples of the frequency of said cycle whereby said calorimetric signal is rapidly produced at filtered frequencies to reduce noise.

39. The system of claim 2 further including a light-off catalytic converter positioned close to said engine for converting hydrocarbon emissions produced by said engine to harmless emissions, said sensor positioned downstream of said light-off catalytic converter and wherein said operating condition is a set quantity of air to fuel mixture injected into the combustion chambers of said engine correlated to lambda where a lambda value of 1 means that precise amount of combustion air metered with a precise amount of fuel to sustain stoichiometric combustion, said control means operable to cycle at a set frequency an air to fuel mixture between first and second lambda values set at the limit of the cycle, said means to generate operable to determine the change in amplitude in said calorimetric signal between the cycle limits, said change in amplitude being said function signal and said means to apply comparing said function signal to a stored calibrated value indicative of the operation of an acceptable catalytic converter and actuating a warning mechanism if said stored value is exceeded.

40. The system of claim 39 wherein said first lambda value is set to produces a lean engine condition and said second lambda produces a more lean engine condition, said control means cycling said engine from a lean condition to a more lean condition.

41. The system of claim 39 wherein said lambda values are set close to stoichiometric.

42. The system of claim 39 wherein one of said lambda values is set less than 1 to produce a rich exhaust gas mixture and the other lambda value is set greater than 1 to produce a lean exhaust gas mixture.

43. The system of claim 39 wherein said means to generate includes bandpass filter means for filtering calorimetric signals at a frequency equal to or at integer multiples of said set frequency.

44. The system of claim 39 wherein lambda modulated in sine wave form between its first and second limits.

45. The system of claim 39 said means to apply further includes storage means for recording said function signals at various operating conditions of said vehicle specified in a drive cycle and means for comparing recorded signals to specified emission levels for specified vehicle operating conditions to determine if said vehicle is in compliance with drive cycle emission standards.

46. The system of claim 45 wherein said storage means further includes means to record engine speed and means to record engine torque, said storage means recording engine speed and engine torque at the time a function signal was generated whereby any regulated drive cycle can be replicated.

47. The system of claim 39 wherein said stored value is a value indicative of the efficiency of said catalytic converter.

48. The system of claim 2 wherein said control means includes injection means for injecting set quantities of fuel into the combustion chambers of said engine and said means to apply including ECM means causing said set quantities of fuel injected by said injection means and combustion air to said combustion chambers to cyclically vary between a first set ratio of combustion air to fuel and a second set ratio of combustion air to fuel, to produce said varying concentrations of emissions during said cycle, said function signal utilized by said ECM means to verify and adjust said first and second ratios.

49. The system of claim 48 wherein said means to generate includes, at least during sensing, periodic means for producing a calorimetric signal having a periodic wave form at frequencies correlated to that at which said engine is cycled and interpolating means for mathematically analyzing one or more wave characteristics of said periodic calorimetric signal selected from the group consisting of i) wave amplitude, ii) wave phase and iii) wave frequency component relationship to induced perturbations caused by said control means.

50. The system of claim 49 wherein said periodic means includes means to digitize said calorimetric signal into data signals, means to transform said data into a frequency domain having a spectrum of wave frequency components and said interpolating means selecting at least one frequency component from said spectrum at multiples of the cycle frequency for evaluation.

51. The system of claim 50 wherein said interpolating means compares first and second wave frequency components of said calorimetric signal at different frequency multiples of said cycle for determining the lambda bias at which said engine operates.

52. The system of claim 48 wherein said injection means includes a fuel injector for each combustion chamber of said engine, each fuel injector having pulse width modulating means for controlling the quantities and timing of fuel supplied each combustion chamber by said fuel injector in accordance with an injection signal, said ECM means supplying said injection signal to each fuel injector and further including calibration means for variably changing one of said ratios for one of said fuel injectors while said first and second ratios for the other combustion chambers remain unchanged and correlating said function signals generated to a programmed air to fuel ratio to produce said injection signal whereby each injector has a calibrated injection signal which is adjusted and/or functionally verified during vehicle operation.

53. The system of claim 48 further including EGR means causing a set portion of said exhaust gas to be recirculated back to said engine for mixing with said combustion air, said ECM means generating an EGR signal to cause said set portion of said exhaust gas to cyclically vary thereby varying said set ratios of combustion air to fuel, said function signal utilized by said ECM means to adjust said EGR signal and verify the operation of said EGR means.

54. The system of claim 53 further including
   a light-off catalytic converter spaced closely adjacent said engine substantially lacking chemical compositions capable of storing oxygen;
   an underfloor catalytic converter downstream of said light-off catalytic converter;
   said sensor being positioned downstream of said light-off converter and upstream of said underfloor catalytic converter; said sensor having a selective catalyst applied to said reactor area to promote heat reactions of selective gaseous emissions within said gas compositions;
   said means to generate additionally generating a function signal from the amplitude of said calorimetric signal which is indicative of the concentration of said selective gaseous emissions present in said exhaust gas composition;
   a warning means actuated by said means to apply when said means to apply determines from said function signal that said engine produces said selective emissions at concentrations beyond that specified by a regulatory standard.

55. The system of claim 54 wherein said means to generate a function signal produces an emission concentration signal, an air to fuel ratio signal and an EGR signal, said means to apply said function signal when actuating said warning means further including means to vary the air to fuel ratio supplied by said injection means to determine if said sensor detects a similarly varying fuel ratio signal, and means to vary said EGR means to determine if said sensor detects a corresponding varying EGR signal whereby the failure of said vehicle to meet emission standards is attributed to one or more of said injection means, said EGR means and said light-off catalytic converter.

56. The system of claim 2 wherein said reactor area is coated with a catalyst promoting reactions of HC and CO emissions within said exhaust gases, said sensor having heater means for maintaining said reactor area at a minimum elevated temperature, said first condition is a lean engine condition and said second condition is a more lean engine condition, said control means cycling between said first and second conditions at a set frequency, said means to generate a function signal determining the change in the amplitude of said calorimetric signal for each cycle, said change in amplitude indicative of HC and CO concentrations within said exhaust gases and warning means actuated by said applying means when said function signal exceeds a stored value whereby said system is able to detect HC and CO emissions produced in diesel and GDI engines having low temperature exhaust gases or engine operated at excess lean conditions.

57. The system of claim 56 wherein said control means is further effective to adjust said operating conditions of said engine to raise the temperature of said exhaust gases should said function signal be less than a set value.

58. The system of claim 2 wherein said system includes a light-off catalytic converter spaced closely adjacent said engine substantially lacking chemical compositions capable of storing oxygen; said sensor downstream of said light-off catalytic converter and including heater means for heating said reactor area to a first elevated temperature upon cold start of said engine; said operating condition being a combustion air to fuel ratio cycled between first and second values at a set frequency; said means to generate said function signal determining the phase of said calorimetric signal relative to the frequency at which said air to fuel ratio is cycled and said means to apply effective to control said air to fuel ratio supplied to the combustion engine of said vehicle during cold start to minimize said engine producing exhaust gases having objectionable emissions.

59. The system of claim 2 further including an EGO sensor downstream of said engine for sensing the presence of oxygen in said exhaust gas and regulating the ratio of combustion air to fuel supplied to the combustion chambers of said engine, said ratio of combustion air to fuel necessary to sustain stoichiometric combustion defined as a lambda value of 1, said first operating condition being an air to fuel ratio greater than a lambda value of 1 by a set amount, said second operating condition being an air to fuel ratio lesser than a lambda value of 1 by said set amount, said control means cycling said first and second operating conditions at a set frequency, said means to generate determining the relationship of selected frequency compensate of said calorimetric signal relative to the cycle frequency to develop a function signal indicative of lambda bias, said means to apply including means to adjust said EGO sensor for drift by said function signal.

60. A method for monitoring and/or controlling a function of an internal combustion engine emitting exhaust gases in a vehicle comprising the steps of:

a) cycling said engine between first and second extreme operating conditions to produce a generally consistently varying exhaust gas composition of specific emissions which is repeatedly reproduced from one cycle to the next;

b) sensing energy from specific emissions in said exhaust gases reacting at a reactor area within a calorimetric sensor continuously receiving a slip stream of said exhaust gases;

c) generating an electrical calorimetric signal indicative of said specific emission concentrations and correlated to the frequency at which said engine is cycled;

d) mathematically interpolating said calorimetric signal to determine a function signal indicative of a current operating state of said engine; and e) controlling and/or monitoring a function of said engine by said function signal.

61. The method of claim 60 wherein said operating condition is one or more operating conditions selected from the group consisting of of i) valve timing, ii) spark timing, iii) speed, iv) exhaust gas recirculation, v) injection timing, vi) air to fuel ratio, vii) mass air flow, viii) manifold air pressure and ix) perturbation frequency.

62. The method of claim 60 wherein said function of said engine monitored and/or controlled by said function signal is one or more functions selected from the group consisting of a) controlling the air to fuel ratio supplied by the fuel injectors to said engine, b) controlling set amounts of exhaust gases recirculated to the combustion chambers of said engine c) controlling engine timing, d) controlling combustion air pressure and/or flow supplied to said fuel injectors, e) controlling frequency of said cycling step, f) calibrating control devices on said vehicle when said engine is operating at set lambda values, g) monitoring concentrations of one or more specific gaseous emissions produced by said engine, h) monitoring the efficiency of the catalytic converter, i) ascertaining which pollution control system on the vehicle has failed when concentrations of specific emissions have exceeded regulatory standards, j) monitoring emissions produced during operation of said vehicle to determine if said vehicle is in compliance with emission requirements for specific drive cycles and k) controlling said operating condition of said engine so that the catalytic converter on the vehicle can convert specific gaseous emissions to harmless gases in compliance with regulatory standards.

63. The method of claim 60 wherein said step of mathematically interpolating said calorimetric signal includes the steps of digitizing said calorimetric signal a data signal, transforming said data signal into a frequency domain having a spectrum of frequency components, evaluating at least one of said frequency components in said spectrum correlated to the cycle frequency to determine said function signal.

64. The method of claim 61 further including said function of said engine monitored and/or controlled by said function signal is one or more functions selected from the group consisting of a) controlling the air to fuel ratio supplied by the fuel injectors to said engine, b) controlling set amounts of exhaust gases recirculated to the combustion chambers of said engine c) controlling engine timing, d) controlling combustion air pressure and/or flow supplied to said fuel injectors, e) controlling frequency of said cycling step, f) calibrating control devices on said vehicle when said engine is operating at set lambda values, g) monitoring concentrations of one or more specific gaseous emissions produced by said engine, h) monitoring the efficiency of the catalytic converter, i) ascertaining which pollution control system on the vehicle has failed when concentrations of specific emissions have exceeded regulatory standards, j) monitoring emissions produced during operation of said vehicle to determine if said vehicle is in compliance with emission requirements for specific drive cycles and k) controlling said operating condition of said engine so that the catalytic converter on the vehicle can convert specific gaseous emissions to harmless gases in compliance with regulatory standards.

65. The method of claim 64 further including said step of mathematically interpolating said calorimetric signal includes the steps of digitizing said calorimetric signal a data signal, transforming said data signal into a frequency domain having a spectrum of frequency components, evaluating at least one of said frequency components in said spectrum correlated to the cycle frequency to determine said function signal.

66. The method of claim 62 further including said step of mathematically interpolating said calorimetric signal includes the steps of digitizing said calorimetric signal a data signal, transforming said data signal into a frequency domain having a spectrum of frequency components, evaluating at least one of said frequency components in said spectrum correlated to the cycle frequency to determine said function signal.

67. The method of claim 61 further including said step of mathematically interpolating said calorimetric signal includes the steps of digitizing said calorimetric signal a data signal, transforming said data signal into a frequency domain having a spectrum of frequency components, evaluating at least one of said frequency components in said spectrum correlated to the cycle frequency to determine said function signal.

68. The method of claim 60 wherein said cycling step is at frequencies such that heat reactions of said exhaust gases at said reactor area of said sensor do not reach steady state at first and second conditions.

69. The method of claim 68 further including the steps of converting only HC and $H_2$ or HC, CO and $H_2$ emissions in said exhaust gases by a light-off catalytic converter closely adjacent said engine, and providing a selective catalyst on said reactor area promoting processes wherein energy is liberated or consumed for HC and $H_2$ or HC, CO and $H_2$ or CO and $H_2$ only so that said calorimetric signal is indicative of HC and $H_2$ or HC, CO and $H_2$ or CO and $H_2$ gaseous emissions in said exhaust gases.

70. The method of claim 68 wherein said step of interpolating determines from the amplitude of said calorimetric signal during said cycles the concentration of HC and $H_2$ or HC, CO and $H_2$ or CO and $H_2$ emissions present in said exhaust gases and further including the steps of e1) comparing said calculated concentrations to a stored value indicative of a regulatory emission standard or a catalytic converter efficiency value; e2) changing said operating conditions to cause said engine to produce different concentrations of specific gaseous emissions in said exhaust which can be converted by said light-off catalytic converter and e3) triggering a warning mechanism that said vehicle is not meeting emission standards should step e2 be unsuccessful.

71. The method of claim 70 wherein said step of changing said operating conditions includes one or more of the following steps: ai) changing the ratio of fuel to air supplied to the combustion chambers of said engine; aii) changing the set ratio of exhaust gas metered into said combustion chambers of said engine; aiii) changing the spark timing of said engine, aiv) changing the cycle frequency; av) changing the lambda perturbation amplitude and avi) changing mass air flow and/or manifold air pressure of the combustion air metered to the combustion chambers of said engine.

72. The method of claim 68 wherein said function signal controls the ratio of combustion air to fuel metered to the combustion chambers of said engine.

73. The method of claim 68 wherein said function signal controls the ratio of exhaust gas recirculated to the combustion chambers of said engine during each operating condition of said engine.

74. The method of claim 68 further including the steps of converting specific emissions by a catalytic converter through which said exhaust gases pass, said sensing occurring downstream of said catalytic converter; providing an oxygen sensor upstream of said catalytic converter, determining by said oxygen sensor the oxygen present in said exhaust gases, cycling said engine at various set operating conditions until said calorimetric sensor determines that said engine is operating at a combustion air to fuel ratio having a lambda value near 1 and calibrating said oxygen sensor at said operating condition whereby drift in said oxygen sensor attributed to aging is accounted for.

75. The method of claim 68 wherein said operating conditions comprise first and second ratios of combustion air to fuel and method further includes the steps of maintaining said first and second set ratios of combustion air to fuel for all combustion chambers of said engine except for one selected fuel injector, varying the fuel supplied by said selected fuel injector during said first and second conditions for a plurality of cycles and calibrating said selected fuel injector by said function signal.

76. The method of claim 68 further including the steps of providing an oxygen sensor adjacent said calorimetric sensor to produce an oxygen signal; mathematically interpolating the amplitude of i) said oxygen signal to determine the air to fuel ratio at which combustion air and fuel are supplied to the combustion chamber of said engine and ii) said calorimetric signal to determine the concentration of specific emissions in said exhaust gas; and adjusting the air to fuel ratio of the vehicle controlled by said oxygen sensor when said calorimetric signal reaches set values.

77. In a process in which a fluid having reaction characteristics affected by said process is used in said process, the improvement comprising:
  a) continuously extracting a slip stream of said fluid used in said process;
  b) cyclically varying select reaction components of said fluid, at least in said slip stream, between two set limits;
  c) contacting said slip stream with said cyclically varying reaction components at a reaction surface to cause a transformation of said reaction components whereby energy is cyclically liberated or consumed;
  d) sensing said energy resulting from step (c) to develop an electrical sensor signal indicative of said transformations; and
  e) interpolating said signal to monitor and/or control said process.

78. The process of claim 77 wherein said reaction components of said fluid are cyclically varied while said process is being performed.

79. The process of claim 77 wherein said reaction components of said fluid are cyclically varied at said reaction area.

80. The process of claim 77 wherein said interpolating step further includes the steps of digitizing said electrical signal into a data signal, transforming said data signal into a frequency domain having a spectrum of frequency components, analyzing at least one of said frequency components in said spectrum correlated to the cycle frequency to operate and/or control the system.

81. The process of claim 80 wherein said fluid is a gas, said energy reaction is a heat flux reaction, and said signal is indicative of a heat measurement.

82. The process of claim 81 wherein said process is the combustion of fuel and air in an internal combustion engine and said reaction characteristics are selected emission concentrations in the exhaust gas produced by said combustion process.

83. An on-board monitoring and/or control system for use and in combination with a vehicle having an internal combustion engine with fuel injectors emitting during operation, exhaust gases; said system comprising:

a) an electronic control module causing said engine to cycle between first and second extreme operating conditions to produce an exhaust gas having generally, consistently varying concentrations of specific emissions during each cycle which are repeatedly reproduced from cycle to cycle;

b) a calorimetric sensor producing a continuous calorimetric signal indicative of the changes in the exhaust gas composition during each cycle;

c) a digital signal processor generating a function signal by analyzing the changes in said calorimetric signal; and d) said electronic control module applying said function signal to a control on said vehicle for monitoring and/or controlling a function of said vehicle.

84. The system of claim 25 wherein said ECM means is effective to change the frequency of said cycle as said catalytic converter ages.

85. The system of claim 25 wherein said ECM means is effective to change the limits of said operating conditions as said catalytic converter ages.

86. The system of claim 48 wherein said injection means includes a plurality of fuel injectors for a like plurality of combustion chambers, each fuel injector having pulse width modulating means controlling the timing and amount of fuel supplied each combustion chamber by each combustion chamber's respective fuel injector in accordance with an injection signal, said ECM means supplying injection signals to said fuel injectors such that a first plurality of said fuel injections produce an air-to-fuel ratio at a first lambda bias and a second equal plurality of said fuel injectors produce an air-to-fuel ratio at a second lambda bias, said air-to-fuel ratios bring said operating conditions and varied by said pulse width modulating means.

87. The system of claim 86 wherein said lambda perturbation amplitude controlled by said first and second pluralities of said fuel injectors remains constant.

88. The system of claim 87 wherein said means to generate a function signal includes means to sense the speed of said engine.

89. The system of claim 50 wherein said ECM means causes said first and second set ratios to sequentially vary at fixed increments in a lambda sweep over a fixed time period encompassing a fixed number of cycles while the difference between said first and second ratios remains generally constant; and said interpolating means detecting the maximum amplitude of the second order frequency component of said spectrum and selecting the first and second air-to-fuel ratios whereat said maximum amplitude occurred in said sweep, said selected first and second air-to-fuel ratios indicative of conditions whereat maximum combustion occurs in said vehicle.

90. The system of claim 89 wherein said ECM cycles said engine about said selected air-to-fuel ratios.

91. The system of claim 90 wherein said system includes an EGO sensor for determining lambda signals, said ECM means using said lambda signals to set said first and second air-to-fuel ratios, said ECM means using said selected air-to-fuel ratios to adjust said lambda signals from said EGO sensor.

92. The system of claim 50 wherein said first and second set air-to-fuel ratios define a lean burn combustion condition of said vehicle.

93. The system of claim 92 wherein said interpolating means detects the amplitude of the first order frequency component of said spectrum and said ECM controls said air-to-fuel ratio at said lean burn condition by the amplitude of said detected first order frequency component.

* * * * *